(12) United States Patent
He

(10) Patent No.: US 10,980,372 B2
(45) Date of Patent: Apr. 20, 2021

(54) AUTOMATED STIRRING AND MIXING APPARATUS FOR COOKING

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 254 days.

(21) Appl. No.: 15/706,136

(22) Filed: Sep. 15, 2017

(65) Prior Publication Data
US 2018/0000292 A1    Jan. 4, 2018

Related U.S. Application Data

(63) Continuation of application No. 13/607,712, filed on Sep. 8, 2012, now abandoned.

(51) Int. Cl.
*A47J 44/02* (2006.01)

(52) U.S. Cl.
CPC ........................... *A47J 44/02* (2013.01)

(58) Field of Classification Search
CPC ............. A47J 37/04; A47J 37/12; A47J 44/02
USPC ............................................ 99/348, 485, 486
See application file for complete search history.

(56) References Cited

U.S. PATENT DOCUMENTS 7,485,830 B2 * 2/2009 Wang ..................... F24C 1/00
219/201

* cited by examiner

*Primary Examiner* — Brian W Jennison

(57) ABSTRACT

The present application discloses an automated cooking apparatus that includes a holder configured to hold a container of food or food ingredients, one or more first kinematic pairs, each comprising a first mating part and a second mating part, wherein the first mating part is connected to the holder; a motion mechanisms that can move the second mating parts of the one or more kinematic pairs; and a driver or controller configured to drive or control the motion mechanism to produce a movement of properly fast speed so that a center point on the internal surface of the container is displaced by properly small distance. The first kinematic pairs and the motion mechanisms in combination can move the holder and the cooking pan to produce fast enough acceleration in the container.

24 Claims, 46 Drawing Sheets

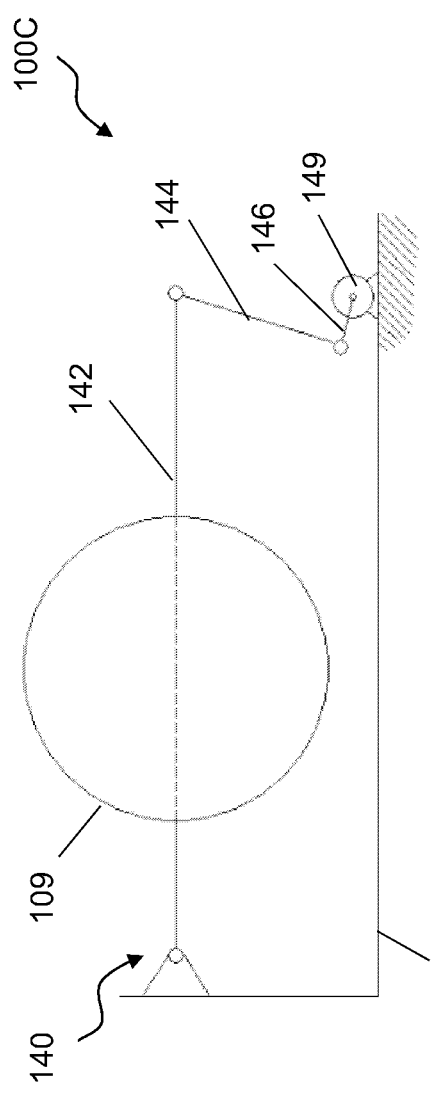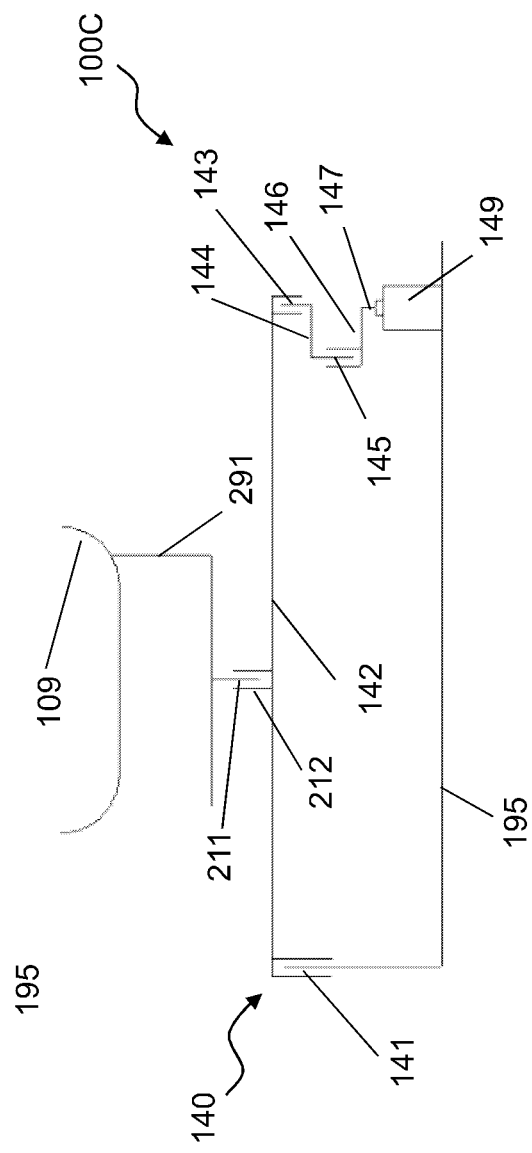
Figure 3A
Figure 3B

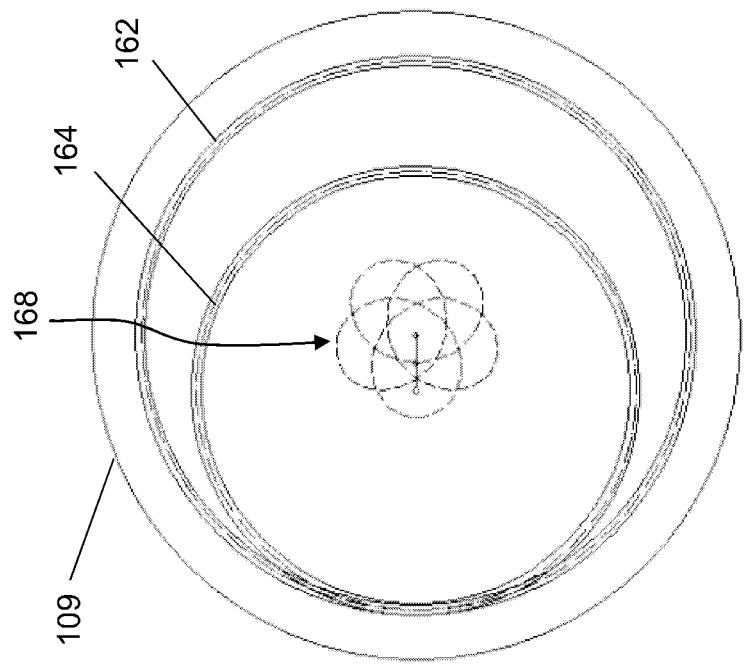
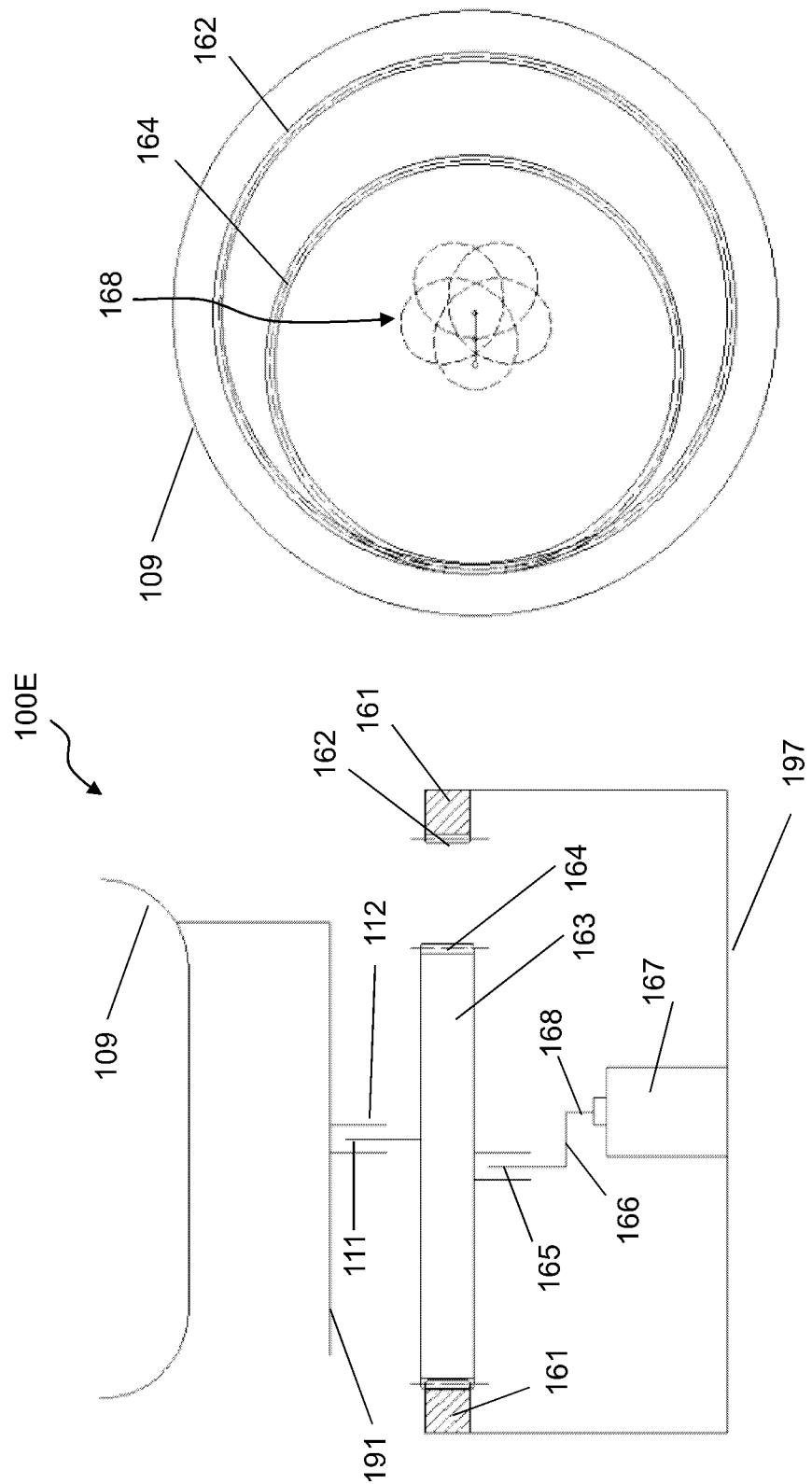
Figure 5B
Figure 5A

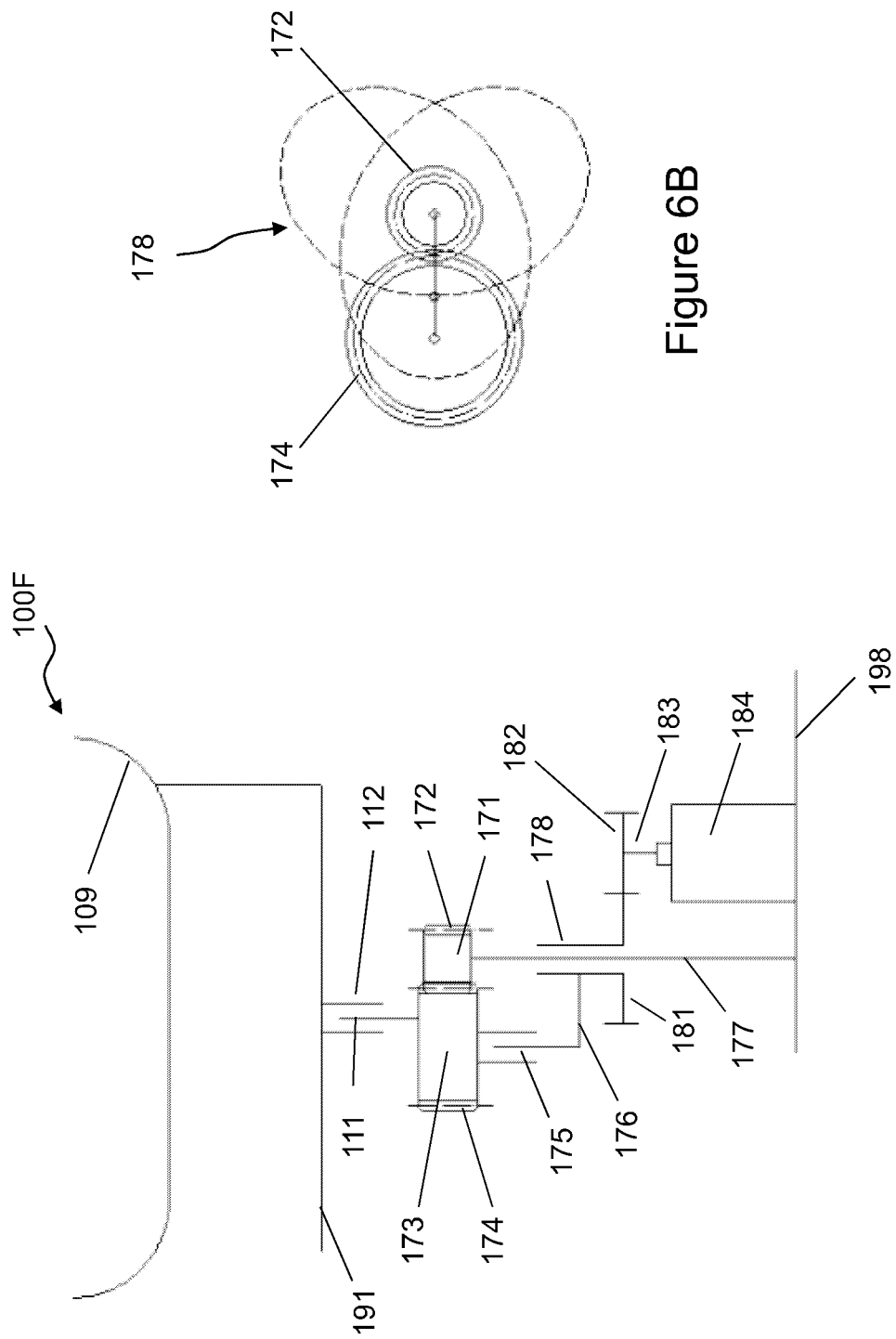

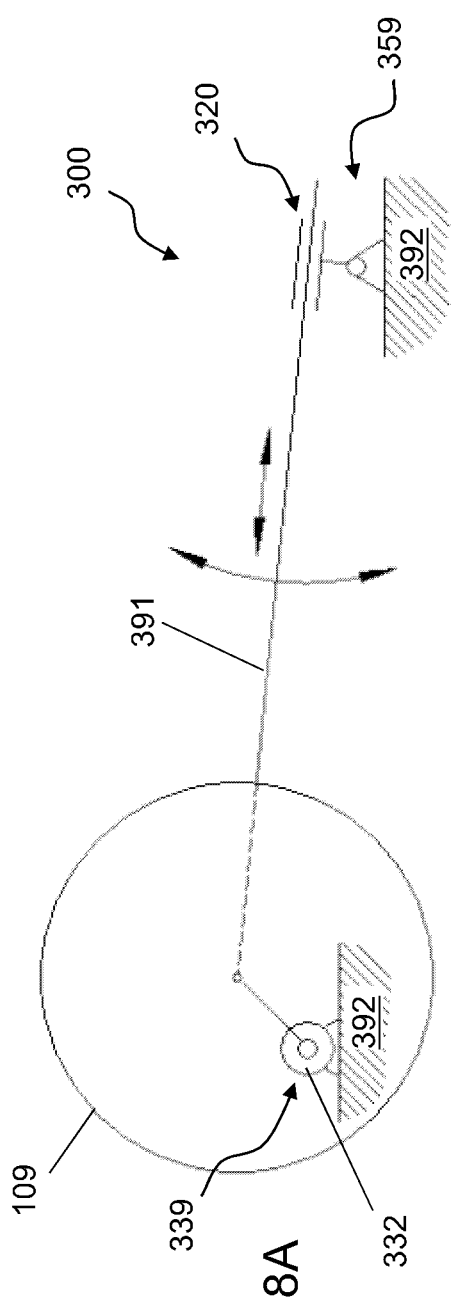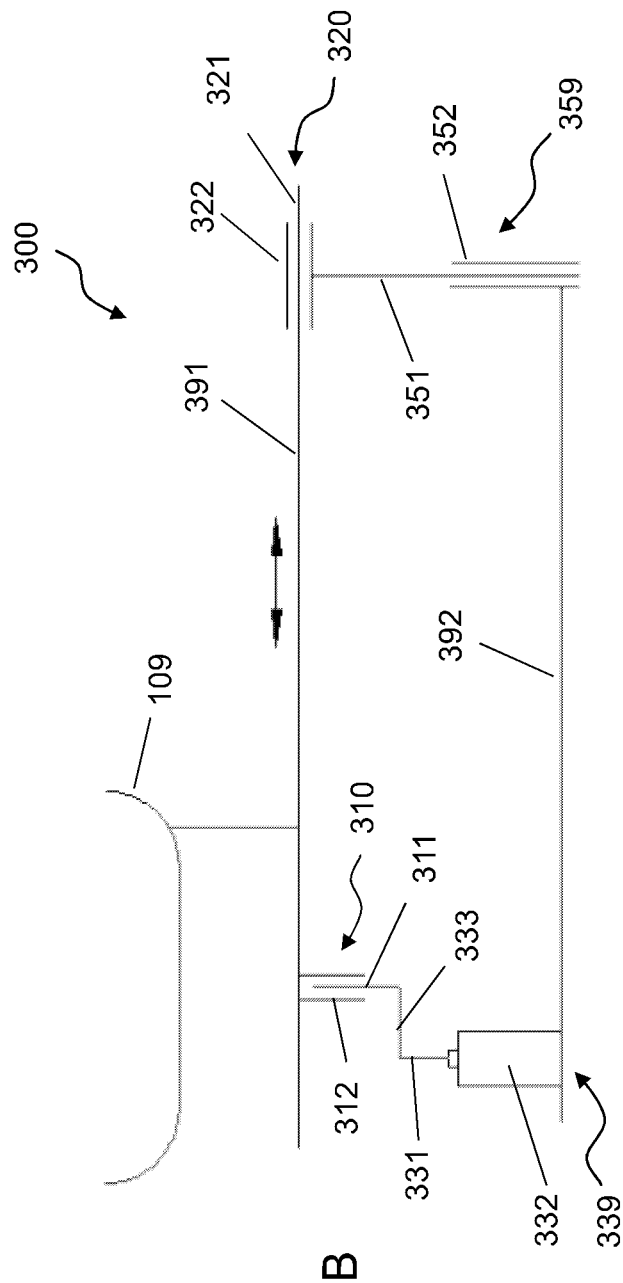

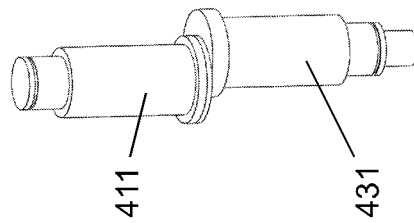
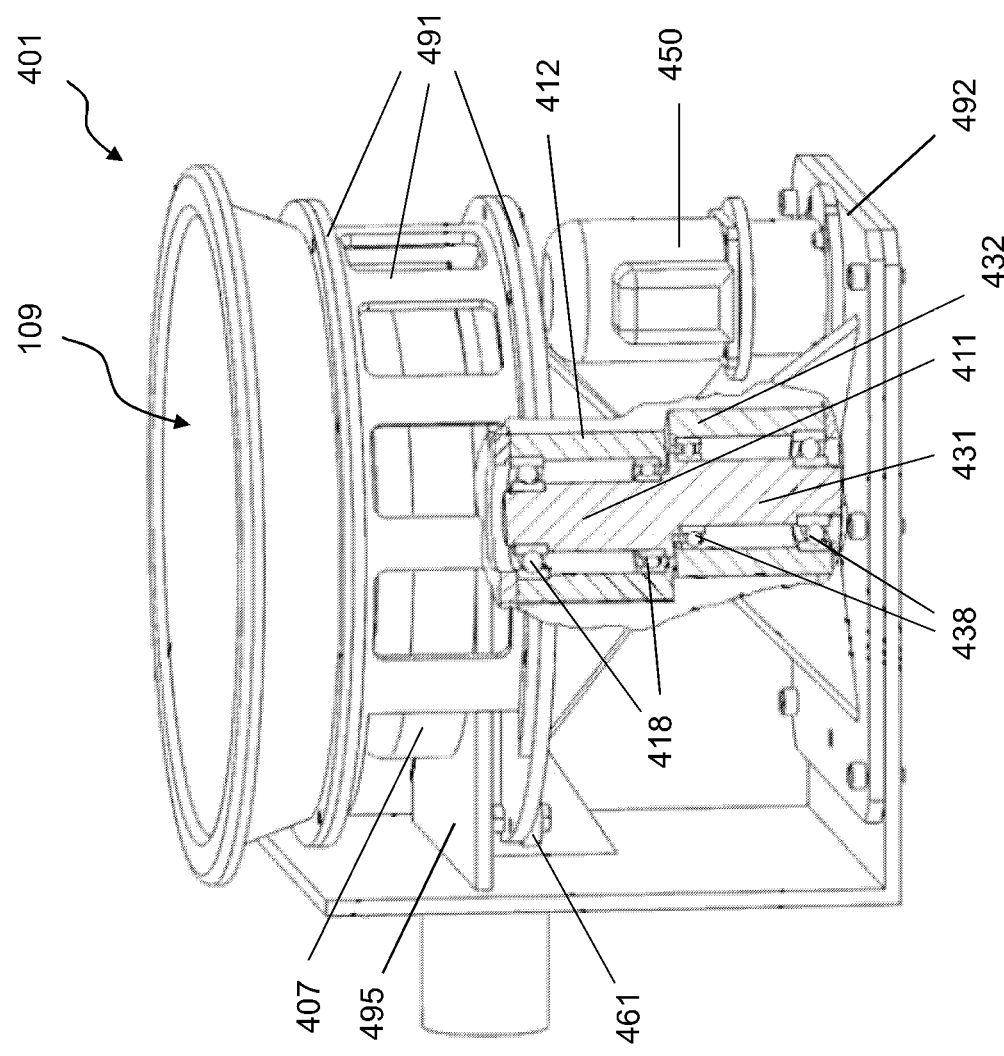

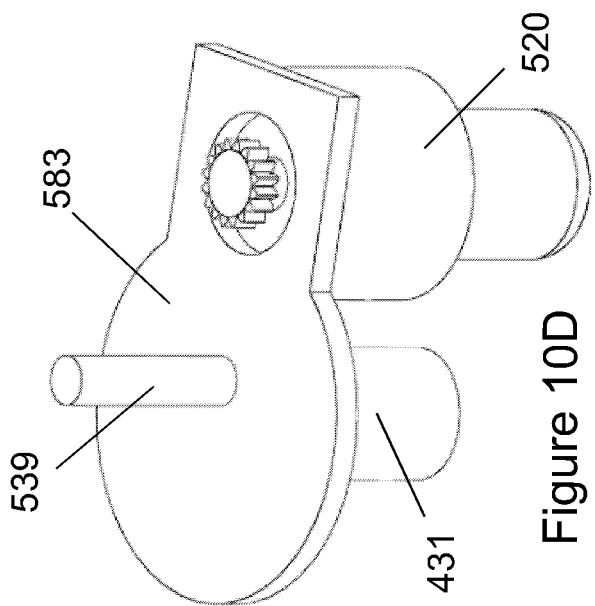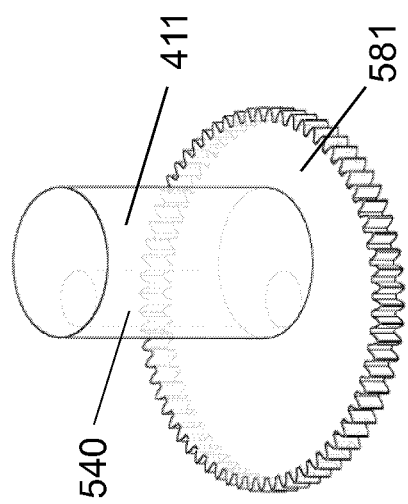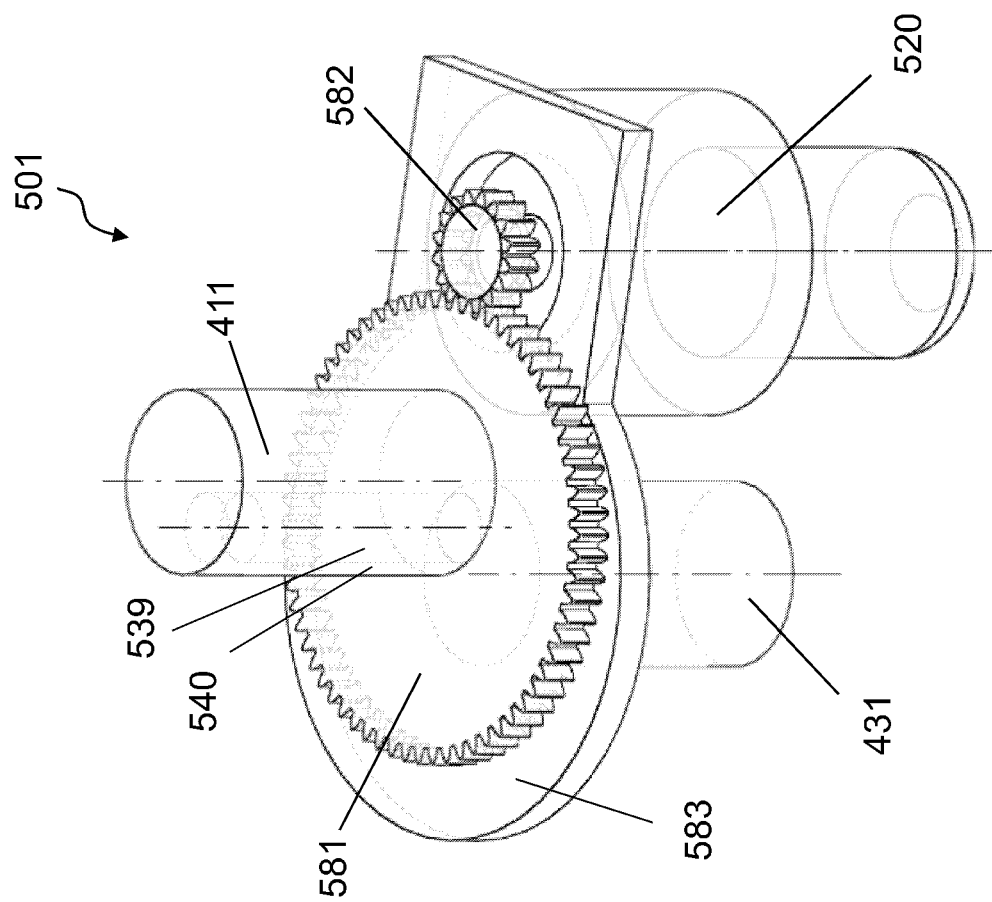
Figure 10D
Figure 10E
Figure 10C

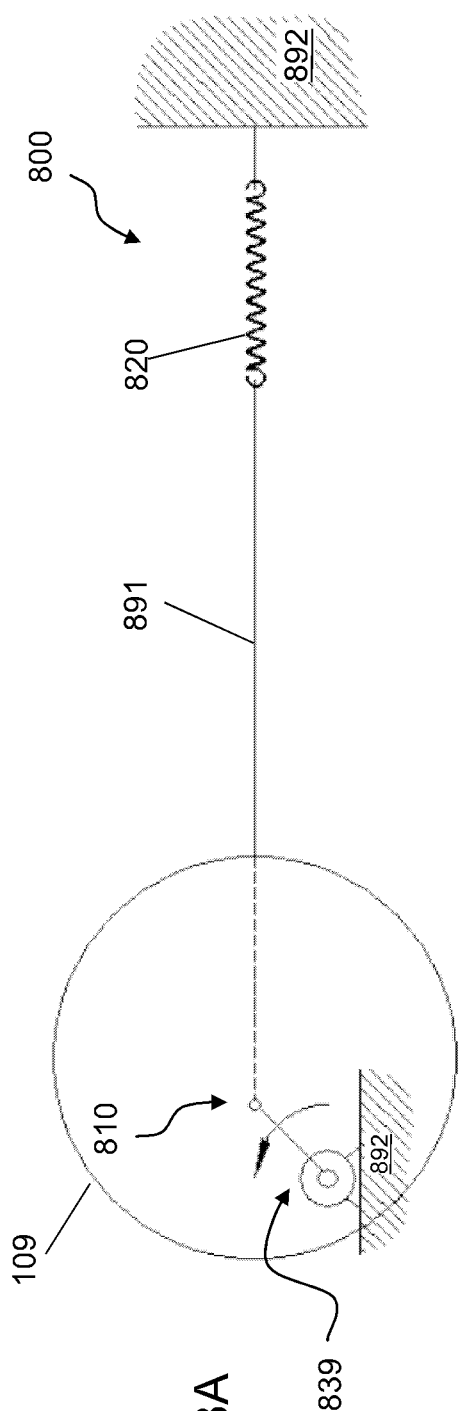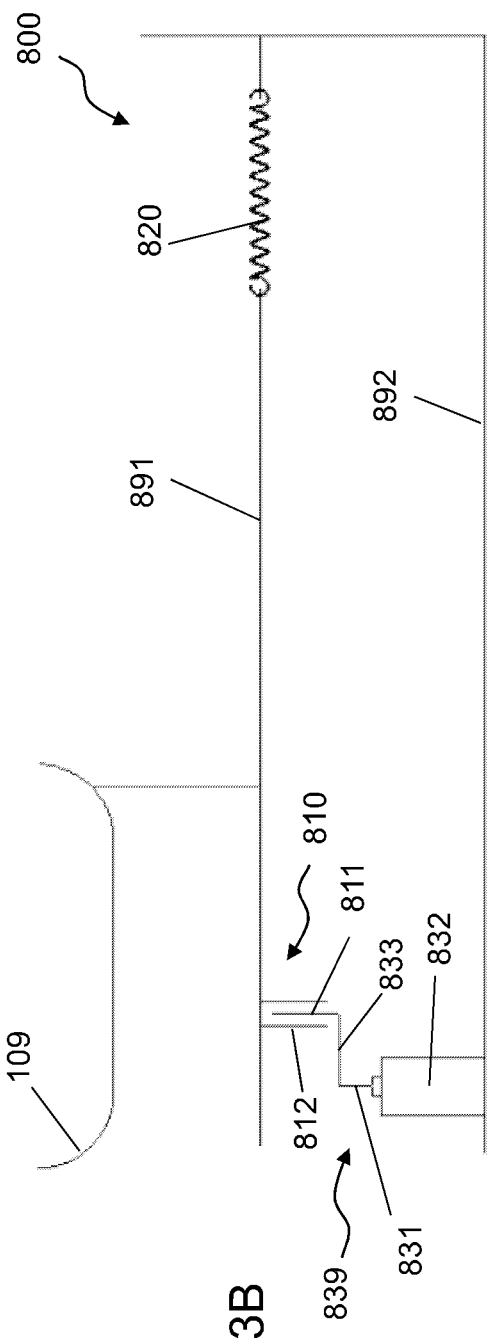

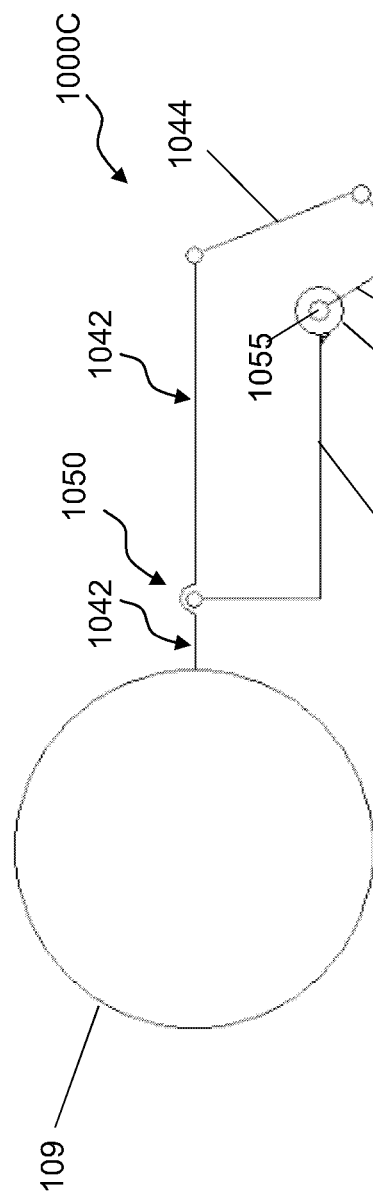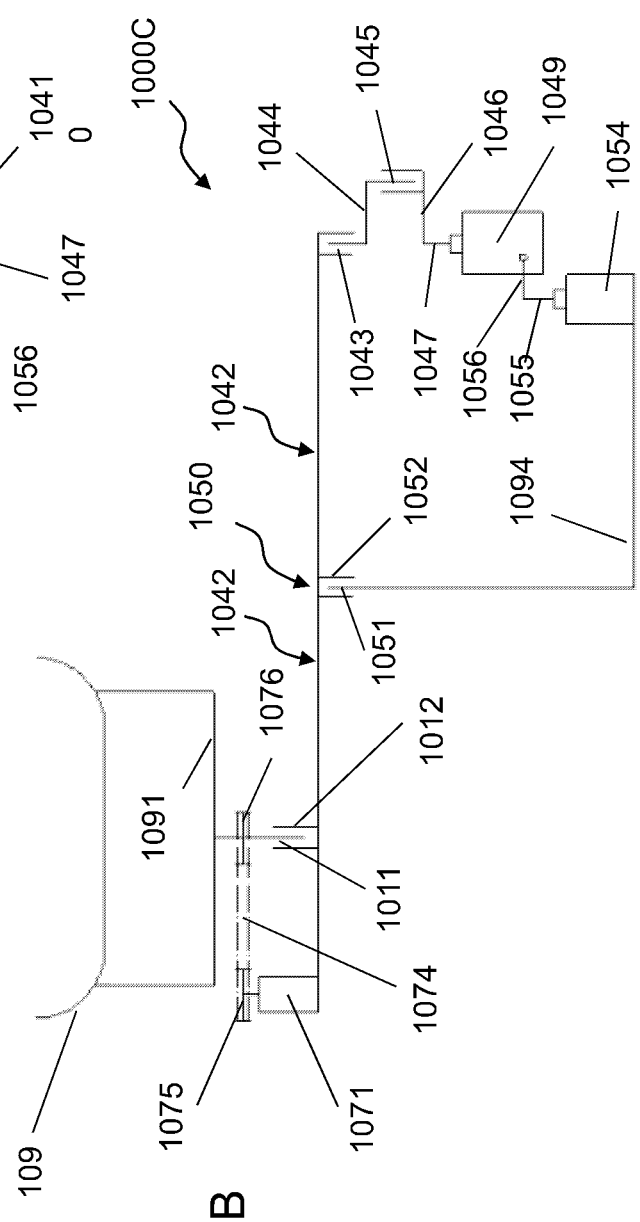
Figure 19A
Figure 19B

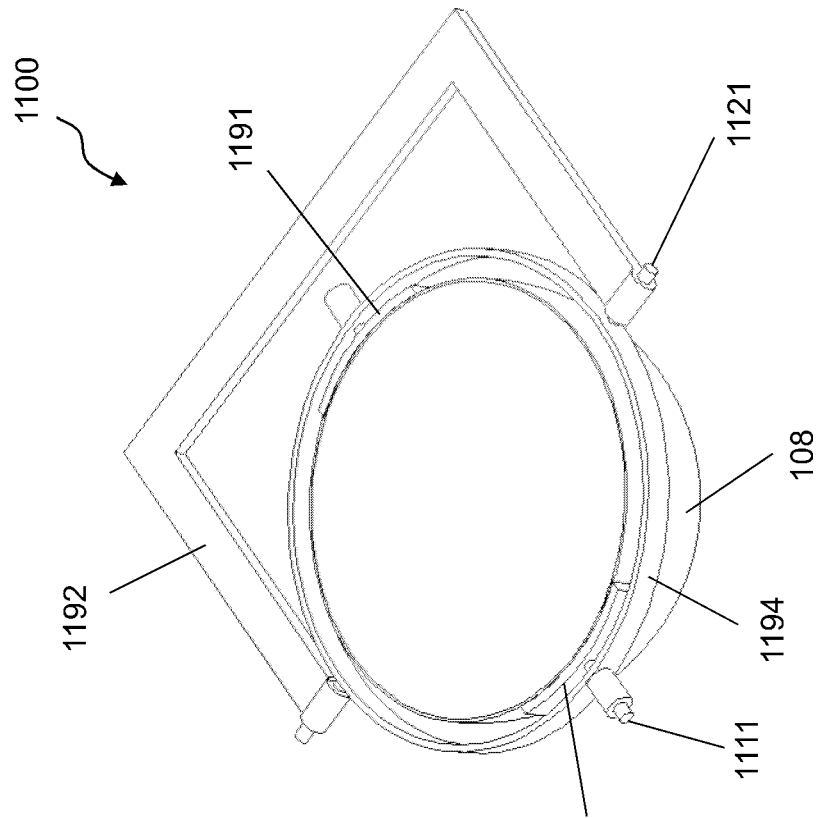
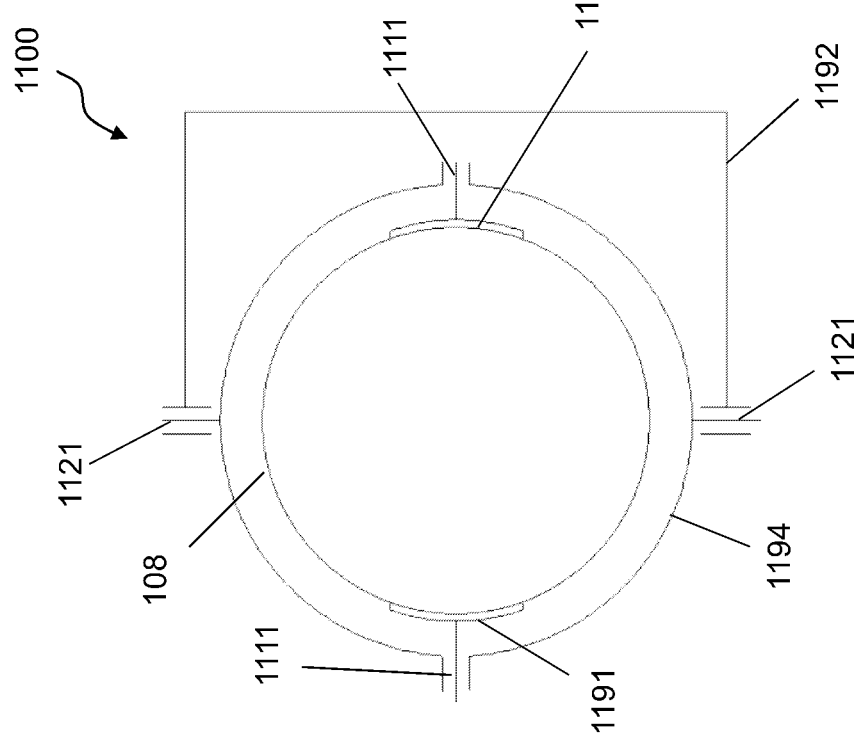
Figure 24B
Figure 24A

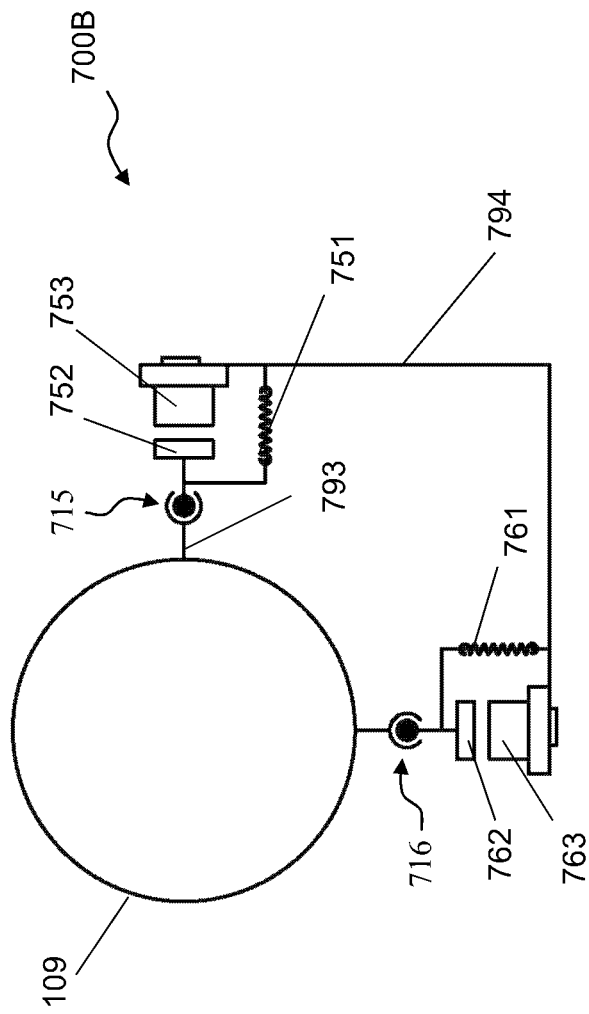
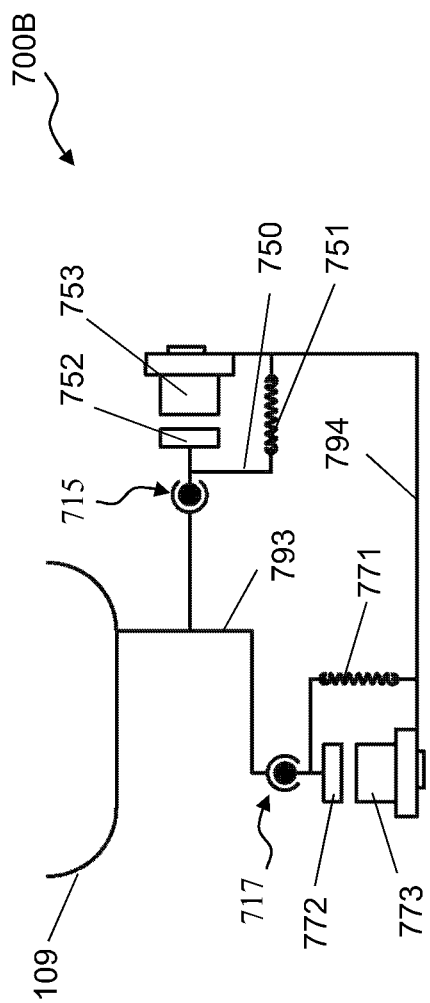
Figure 33A
Figure 33B

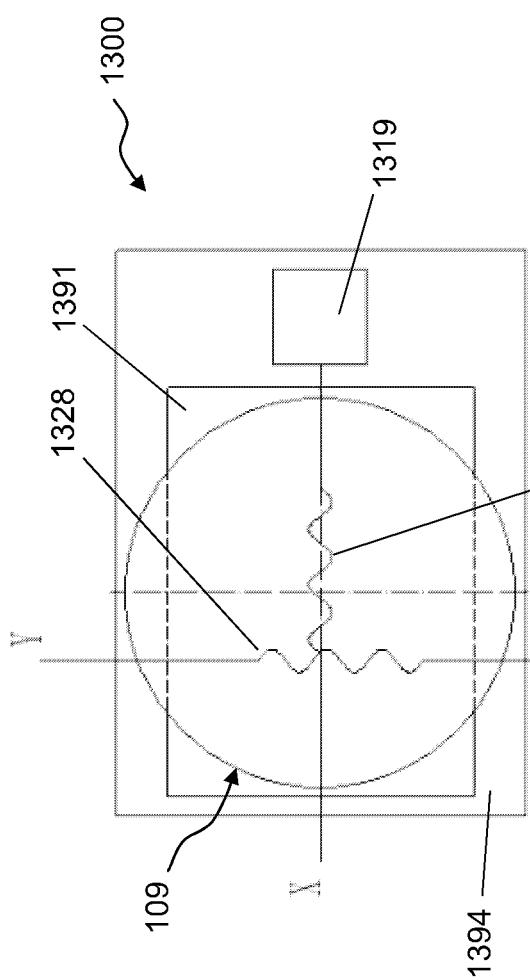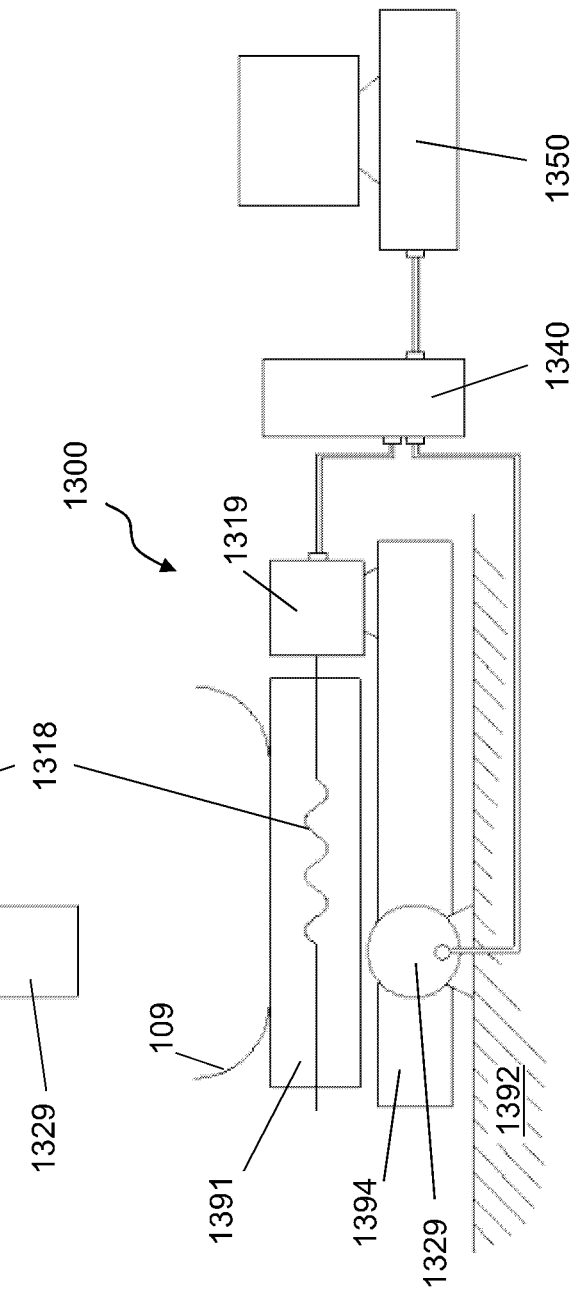
Figure 36A
Figure 36B

AUTOMATED STIRRING AND MIXING APPARATUS FOR COOKING

This application is a continuation of U.S. application Ser. No. 13/607,712 filed Sep. 8, 2012 entitled "Automated Stirring and Mixing Apparatus for Cooking," the disclosure of which are hereby incorporated herein by reference in their entireties.

CROSS-REFERENCE TO RELATED APPLICATIONS

US Patent Applications

Ser. No. 13/607,712, Filed: Sep. 8, 2012, Inventor: Zhengxu He

Ser. No. 13/490,523, Filed Jun. 7, 2012, Inventor: Zhengxu He

BACKGROUND OF THE INVENTION

The present application relates to automated kitchen equipment, and specifically to automated method and equipment for stirring, mixing, and distributing food ingredients during cooking.

Considerable amount of research and experiments have been conducted on the automation of stirring and mixing of food ingredients during cooking. The existing solutions include the following three main approaches: the first approach utilizes spatula or pedals of different shapes to stir, mix and turn food ingredients; the second approach simulates human's stirring actions during cooking; and the third approach uses cooking pans in the shapes of rolling cylinders to turn and mix food ingredients.

The first approach involves complex operations and complicated mechanisms, and thus has low reliability. Specifically, the stirring wok mechanism disclosed in Chinese Application No. 200710032699.9 teaches throwing food ingredients in the air for mixing, using a spatula. Such an approach is easily affected by air movement and sometimes throws food ingredients outside of the wok. In addition to the structural complexity, the stirring operations involve large movements, which use too much energy.

The second approach includes simpler operations and practical mechanisms but is ineffective in mixing and stirring food ingredients. This approach cannot achieve uniform stirring and mixing obtained by a human. One major reason for such poor result is that the movements of the spatula can only perform simple rotational movements. In an attempt to overcome this drawback, Chinese Application No. 200610081415.1 discloses an automatically stirring wok including rotation of the stirring spatula. The disclosed mechanism is rather complex and often breaks food ingredients.

The third approach utilizes a rolling cylinder as a cooking pan (similar to a front load cloth dryer). When the cylinder is rotated, the food ingredients are brought up, and then fall freely pulled down by gravity, which stirs, mixes and turns the food ingredients contained in the rolling cylinder. This approach is simple and mechanism reliable, but it requires a large amount of cooking oil to coat the whole surface of the cylinder to prevent food sticking to and burning at the internal surfaces. Moreover, such mechanism is also not effective in heating the food ingredients. Lots of energy is dissipated in the rotational cylinder wall. Specifically, Chinese Application No. 200720019984.3 teaches a rotating-cylinder based cook device. The axis of the cylinder is positioned horizontally. The device is energy inefficient.

Another drawback of existing mixing and stirring systems is that they tend to move food ingredients to a particular side of the cooking pan, which produces scattered and unbalanced distribution in the food ingredients. In some cases, food ingredients may be pushed out of the cooking pan. The spatula in some conventional cooking systems rotates around an axis vertical a round cooking pan. The spatula can push food ingredients into an unbalanced distribution, with some areas having thicker food ingredients accumulation than other areas.

There is therefore a need for effective and efficient automated apparatus that provide stirring and mixing food ingredients during cooking and can provide making and maintaining a balanced distribution of food ingredients in the cooking pan.

SUMMARY OF THE INVENTION

The present application discloses a cooking apparatus capable of automated stirring and mixing of food ingredients, which overcomes the drawbacks in the conventional cooking devices. The disclosed automated cooking apparatus is more effective in stirring and mixing feed ingredients and is energy efficient. The stirring mechanisms and operations of the disclosed automated cooking apparatus are simpler and more reliable. The disclosed automated cooking apparatus can achieve more effective and uniform stirring and mixing during cooking without breaking food ingredients. In addition, the present disclosed apparatus has the advantage of producing and maintaining a balanced distribution in the food ingredients in the cooking pan.

In one general aspect, the present invention relates to an automated cooking apparatus that includes a holder that can hold a cooking pan, one or more first kinematic pairs each comprising a first mating part and a second mating part, wherein the first mating part is connected to the holder, a motion mechanisms that can move the second mating parts of the one or more kinematic pairs, wherein the first kinematic pair and the motion mechanisms in combination can move the holder and the cooking pan.

Implementations of the system may include one or more of the following. the first kinematic pair comprises a turning pair. The first kinematic pair can include a sliding pair. The first kinematic pair can include a universal joint. The first mating parts of the one or more first kinematic pairs can be connected to the holder via elastic or non-rigid connectors. The motion mechanism can move the second mating part of a first kinematic pair in a circular or rotational movement. The automated cooking apparatus can further include an adjustment mechanism configured to adjust the radius of the circular movement of the second mating part of a first kinematic pair. The motion mechanism can move the second mating part of a first kinematic pair in a linear, planar, or spherical movement. The motion mechanism is configured to move the second mating part of the first kinematic pair along a hypocycloid, an epicycloid. The automated cooking apparatus can further include two or more first kinematic pairs and respective motion mechanisms; and a transmission or linkage mechanism configured to link the two or more motion mechanisms so their produced movements are mechanically linked. The automated cooking apparatus can further include a powered mechanism configured to move the first mating part of the first kinematic pair relative to the second mating part and a computer configured to control the powered mechanism. The powered mechanism can move the first mating part of the first kinematic pair by oscillations relative to the second mating part. The automated cooking apparatus can further include a transmission or linkage mechanism that can link the powered mechanism and the motion mechanism so to link their produced movements produced by the powered mechanism and the motion mechanism are mechanically linked. The automated cooking apparatus can further include a stabilization mechanism configured to constrain the movements of one or more parts of the holder or one or more objects connected with the holder, wherein the first kinematic pair and the motion mechanism are configured to move the holder while the holder is constrained by the stabilization mechanism. The automated cooking apparatus can further include a computer or an adjustment mechanism that together with the driver or controller are configured to dynamically adjust the directions, speeds and frequencies of the cyclic or oscillatory movements produced by the motion mechanism.

In another general aspect, the present invention relates to automated cooking apparatus that includes a holder configured to hold a cooking pan; a motion mechanism configured to produce a force on a part of the holder or an object rigidly or elastically or loosely connected to the holder; and a driver or controller configured to control the motion mechanism as to produce a sum of cyclic or oscillatory forces on the holder or on the object connected to the holder, wherein the forces by the motion mechanism are configured to move the holder or the object connected to the holder, to produce accelerations in the holder and the cooking pan to stir, mix, and distribute the food ingredients contained in the cooking pan.

In another general aspect, the present invention relates to automated cooking apparatus that includes a cooking pan configured to hold food ingredients; a holder configured to hold the cooking pan; and a motion mechanism that produces a combination of an oscillatory movement and another movement in the holder, as to stir, mix and distribute the food ingredients.

In another general aspect, the present invention relates to automated cooking apparatus that includes a cooking pan configured to hold food ingredients; a holder configured to hold the cooking pan; and a vibration mechanism configured to produce vibrations in the cooking pan as to move the food ingredients in a helical pattern.

The presently disclosed automated cooking apparatus includes a cooking pan that can hold food ingredients for cooking; and a motion mechanism that can produce movements in the cooking pan with a fast change of moving directions, resulting in a fast acceleration for the cooking pan. This induces a relative movement between the non-accelerated food ingredients and the accelerated cooking pan, and the cooking pan's internal surface can obstruct the relative movement of the food ingredients by friction or other forces. The movement of the food ingredients relative to the cooking pan, together with the obstruction forces by the cooking pan's internal surface and other forces, can produce stirring and mixing in the food ingredients. Moreover, the movements of the food ingredients may make and maintain a consistent, balanced pattern in the distribution of food ingredients in the cooking pan. The disclosed motion mechanism is special in that the cooking pan can only be displaced by a small distance from its original position in the movement. Thus, the cooking pan can still be heated by a stove or other heating source when the food ingredients are stirred, mixed and turned. Examples of the movements include: circular movement of relatively small radius, linear or rotational oscillations of small displacements or the composition of two oscillations of small displacements, or vibrations that are capable of producing a movement pattern.

These and other aspects, their implementations and other features are described in detail in the drawings, the description and the claims.

BRIEF DESCRIPTION OF THE DRAWINGS

FIGS. 3A-3B respectively show top and side views of an automated cooking apparatus that can produce rotational oscillatory movement in a cooking pan.

FIG. 5A shows a side view of another automated cooking apparatus that can produce hypocycloidal movements in a cooking pan. FIG. 5B shows an exemplified movement path for the cooking pan produced by the automated cooking apparatus in FIG. 5A.

FIG. 6A shows a side view of another automated cooking apparatus that can produce epicycloidal movements in a cooking pan. FIG. 6B shows an exemplified movement path for the cooking pan produced by the automated cooking apparatus in FIG. 6A.

FIGS. 8A-8B respectively show top and side views of another implementation of an automated cooking apparatus that can produce a different cyclic movement in a cooking pan.

FIGS. 9C-9G show detailed perspective views of the automated cooking apparatus in FIGS. 9A-9B.

FIG. 10C-10E are perspective views of components in the automated cooking apparatus shown in FIG. 10A-10B.

FIGS. 13A-13B respectively show top and side views of another automated cooking apparatus that can produce a different cyclic movement in a cooking pan.

FIGS. 19A-19B respectively show top and side views of another automated cooking apparatus that can produce a combination of oscillatory movements and a controlled self-rotation in a cooking pan, where the amplitude of the oscillation may be further adjusted.

FIGS. 24A-24B respectively show top and aerial views of an automated cooking apparatus that can move a cooking pan by a composition of two oscillations.

FIGS. 33A-33B respectively show top and side views of an automated cooking apparatus in where three magnetic oscillators produce a three-dimensional movement in a cooking pan.

FIGS. 36A-36B respectively show top and side views of another automated cooking apparatus that can produce a composition of two linear oscillations along X and Y axes in a cooking pan.

DETAILED DESCRIPTION OF THE INVENTION

The present application discloses a cooking apparatus that can automatically stir, mix, and distribute of food ingredients, while overcoming the drawbacks in the conventional cooking devices. The disclosed cooking apparatus includes a cooking pan and a motion mechanism that can produce particularly designed movements and accelerations in the cooking pan to stir, mix or turn the food ingredients.

Figure 1:
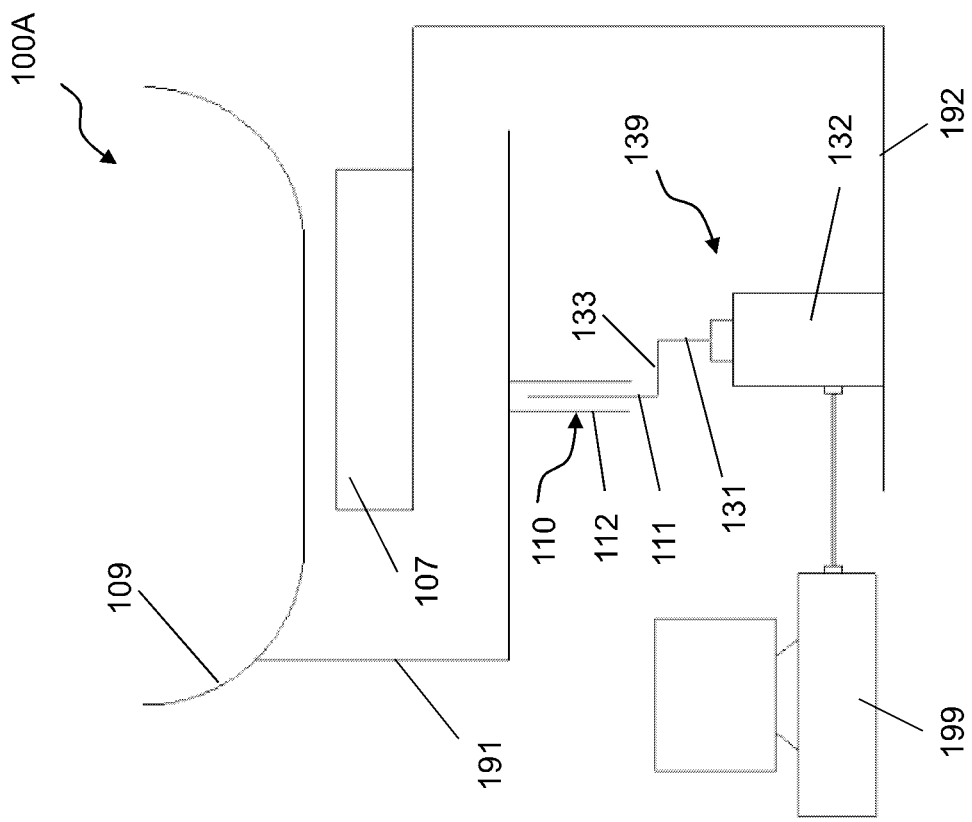
FIG. 1 shows a schematic view of an automated cooking apparatus that can produce cyclic movements in a cooking pan in accordance with the present invention.

In some embodiments, referring to FIG. 1, an automated cooking apparatus 100A includes a cooking pan 109, and a holder 191 which carries the cooking pan 109. A turning pair 110, as a first kinematic pair, includes a shaft 111 and a sleeve 112 as mating parts. The sleeve 112 is connected with the holder 191. A motion mechanism 139 includes a motor 132 with a shaft 131, and a rigid connector 133 that connects the shafts 111 and 131. The motor 132 is mounted on a support frame 192. A computer 199 controls the motor 132. The motor 132 can produce a circular movement of the shaft 111 and the sleeve 112 relative to the support frame 192. The shafts 111 and 131 are aligned parallel to each other. The radius of circular movement of the mechanism 139, equal to the distance between the axes of the shafts 111 and 131, is designed to be properly small. A heater 107 is mounted on the support frame 192 below the cooking pan 109. The heater 107 may be rotationally symmetric around the shaft 131 for the best heating result, although this is not a requirement. The circular movement of the shaft 111 together with the turning pair 110 produces movements of the cooking pan. The point of the internal surface of the cooking pan intersected with the axis of the shaft 111 can be a center point on the cooking pan. The center point is displaced by a properly small distance at all times (equal to double the distance between the axes of the shafts 111 and 131). The inclination of any axis of the cooking pan is changed by a small enough angle. In fact, (without counting the effects of vibrations) the inclination of any axis of the cooking pan does not change if the axes of the shafts 111 and 131 are designed to be vertical. Except a self-rotation around the turning pair 110, the cooking pan as a whole body is displaced relative to the support frame (or relative to the heater) by a properly small distance and by a small inclination change at all times, so the food ingredients contained in the cooking pan can be heated by the heater while the cooking pan is moved.

In the present application, the term "turning pair" refers to a rotational mechanism that includes two mating parts and a connection which constrains the relative movement of the two mating parts to a rotation. A mating part in a turning pair may consist of one or more separate pieces. Examples of turning pairs are: hinge joint with a shaft in a sleeve; hinge joint with two segmented sleeves; a shaft and a handle on the shaft, etc. The term "kinematic pair" refers to a mechanism that includes two mating parts and a connection which imposes constraints on the relative movement of the mating parts. A mating part in a kinematic pair may consist of one or more separate pieces.

Figure 2:
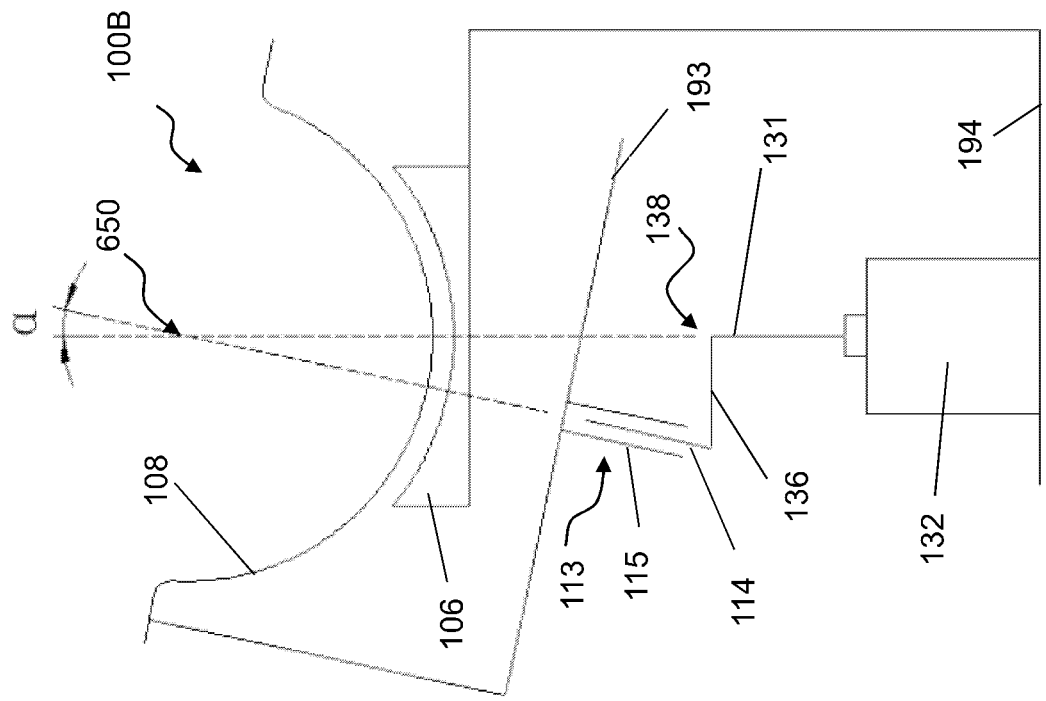
FIG. 2 shows a schematic view of an automated cooking apparatus that can produce spherical cyclic movements in a cooking pan.

In some embodiments, referring to FIG. 2, an automated cooking apparatus 100B includes a cooking pan 108, and a holder 193 which carries a spherically shaped (or partially spherically shaped) cooking pan 108. A first turning pair 113, as a first kinematic pair, includes a shaft 114 and a sleeve 115 as mating parts. The sleeve 115 is connected with the holder 193. A motion mechanism 138 includes a motor 132 with shaft 131, and a rigid connector 136 that connects the shafts 131 and 114. The motor 132 is mounted on a support frame 194. A computer (not shown) controls the motor that can produce a circular movement of the shaft 114 and the sleeve 115 relative to the support frame 194. The shaft 114 and the shaft 131 are aligned at an oblique angle α (i.e. not parallel) relative to each other. The axes of shafts 114 and 131 meet at a center point 650, which is approximately at the spherical center of the spherical shaped cooking pan. The angle of circular movement of the mechanism 138, equal to the angle α between the axes of the shafts 114 and 131, is designed to be properly small. A heater 106, mounted on the support frame 194, lies below the cooking pan 108. The point of the internal surface of the cooking pan intersected with the axis of the shaft 114 can be a center point on the cooking pan. Since the angle of the circular movement is properly small, the center point is displaced by a properly small distance at all times. The inclination of any axis of the cooking pan is changed by a small angle. Except a self-rotation around the turning pair 113, the cooking pan as a whole is only displaced by a small distance and by a small inclination change at all times, and the food ingredients contained in the cooking pan may be heated by the heater while the cooking pan is moved.

It should be noted that the holders 191, 193 in FIGS. 1 and 2 can respectively hold the cooking pan 109, 108 in different ways during cooking. For example, the cooking pan can be fixed to the holder by a mechanism (clamps, screws, etc.) or by a magnet.

In some embodiments, referring to FIGS. 3A and 3B, an automated cooking apparatus 100C includes a cooking pan 109, and a holder 291 which carries the cooking pan 109. A first turning pair, as a first kinematic pair, includes a shaft 211 and a sleeve 212 as mating parts. The shaft 211 is connected with the holder 291, and the sleeve 212 is rigidly connected to a rod 142. The rod 142 may be freely rotated around a shaft 141 of a turning pair 140, with the shaft 141 rigidly connected with a support frame 195. A rigid connector 144 joins two shafts 143 and 145 of two turning pairs where the sleeve of the shaft 143 is rigidly connected with the rod 142. Another rigid connector 146 joins the sleeve of the shaft 145 to the shaft 147 of a motor 149 which is mounted on the support frame 195. The shafts 141, 143, 145 and 147 have parallel axes; and the distance between the axes of the shafts 145 and 143 is longer than the distance between the axes of the shafts 145 and 147. The motor 149 can produce a circular movement in the shaft 145 around the shaft 147 and can result in a rotational oscillation of the shaft 143 and hence of the rod 142 around the turning pair 140. Thus, the shaft 211 makes a rotational oscillatory movement around the turning pair 140. It should be noted that the parallel shafts 141, 143, 145 and 147 may or may not be parallel to the shaft 211. The magnitudes of the rotational oscillation are designed to be properly small, by adjusting the distance between the axes of the shafts 145 and 147.

Then the point of the internal surface of the cooking pan intersected with the axis of the shaft 211 can be a center point on the cooking pan. The center point is only displaced by a properly small distance at all times. In addition, the inclination of any axis of the cooking pan is changed by a small enough angle. Except a self-rotation around the maxis of shaft 211, the cooking pan as a whole is displaced by a small distance and by a small inclination change during the movements.

Figure 4:
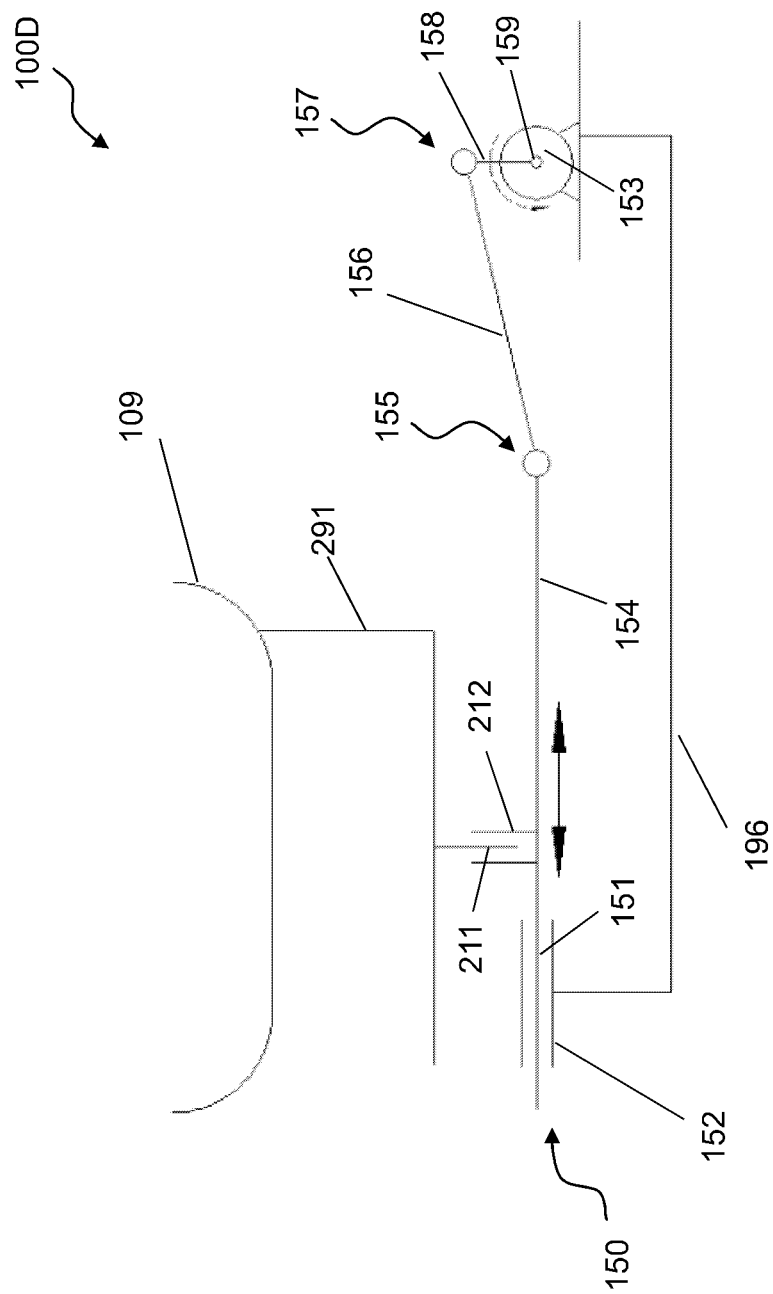
FIG. 4 shows an automated cooking apparatus that can produce linear oscillatory movement in a cooking pan.

In some embodiments, referring to FIG. 4, an automated cooking apparatus 100D includes a cooking pan 109, and a holder 291 which carries the cooking pan 109. A first turning pair, as a first kinematic pair, includes a shaft 211 and a sleeve 212 as mating parts, where the shaft 211 is connected with the holder 291. The sleeve 212 is rigidly connected with a shaft 151 of a sliding pair 150 whose sleeve 152 is rigidly connected to a support frame 196. A rigid connector 156 joins a rigid extension 154 of the shaft 151 via a turning pair 155 at one end; and joins one end of an another rigid connector 158 via a turning pair 157 at the other end; where each turning pair consists of a shaft in a sleeve (not shown). The other end of the connector 158 is rigidly joined with the shaft 159 of a motor 153 that is mounted on the support frame 196. The turning pairs 155, 157 and the shaft 159 have parallel axes that are perpendicular to the axis of the sliding shaft 151; and the distance between the axes of the turning pairs 157 and 155 is longer than the distance between the axes of the turning pair 157 and the shaft 159. A motor can produce a circular movement of the turning pair 157, resulting in a linear oscillation of the extension 154 and hence of the sleeve 212. The magnitudes of the linear oscillation are designed to be properly small, by adjusting the distance between the axes of the shafts 157 and 159. The point of the internal surface of the cooking pan intersected with the axis of the shaft 211 can be a center point of the cooking pan. The center point is only displaced by a properly small distance at all times. In addition, the inclination of any axis of the cooking pan is changed by a small enough angle. Except a self-rotation around the axis of the shaft 211, the cooking pan as a whole is displaced by a small distance and by a small inclination change during the movements.

In some embodiments, referring to FIG. 5A, an automated cooking apparatus 100E includes a cooking pan 109, and a holder 191 which carries the cooking pan 109. A first turning pair, as a first kinematic pair, includes a shaft 111 and a sleeve 112 as mating parts. The sleeve 112 is connected with the holder 191. The shaft 111 is rigidly connected with a gear 163 with cogs 164. The sleeve of a shaft 165 in a turning pair is mounted at the center below the gear 163 so the shaft 165 and the gear 163 have a same axis. A rigid connector joins the shaft 165 to the shaft 168 of a motor 167 which is mounted on a support frame 197. An internal gear 161 with cogs 162 is mounted on the support frame 197. The axis of the internal gear 161 is the same as the axis of the shaft 168; and the cogs 164 and the cogs 162 are engaged. The shafts 111, 165, 168 and both gears have parallel axes. As the motor rotates continuously, the shaft 111 moves along a hypocycloid. FIG. 5B shows an exemplified movement path 168 of the shaft 111. The magnitudes of the hypocycloidal movement of the shaft 111 can be designed to be properly small, by adjusting the distance between the axes of the shafts 165 and 168 as well as the position of the shaft 111 on the gear 163. The point of the internal surface of the cooking pan intersected with the axis of the shaft 111 can be a center point on the cooking pan. The center point is only displaced by a properly small distance at all times. In addition, the inclination of any axis of the cooking pan is changed by a small angle. Except a self-rotation around the shaft 111, the cooking pan as a whole is displaced by a small distance and by a small inclination change during the movements.

In some embodiments, referring to FIG. 6A, an automated cooking apparatus 100F includes a cooking pan 109, and a holder 191 which carries the cooking pan 109. A first turning pair, as a first kinematic pair, includes a shaft 111 and a sleeve 112 as mating parts. The sleeve 112 is connected with the holder 191. The shaft 111 is rigidly mounted on a gear 173 with cogs 174. A turning pair consisting of a shaft 175 and a sleeve is mounted at the center below the gear 173, so the sleeve of the shaft 175 is rigidly connected with the gear 173, and that the axis of the gear 173 and the axis of the shaft 175 are identical. A rigid connector 176 rigidly connects the shaft 175 and the sleeve 178 of a shaft 177 in a turning pair. A gear 181 is rigidly connected with and is concentric with the sleeve 178. The shaft 177 is mounted on a support frame 198, and a gear 172 with cogs 172 is mounted at the top end of the shaft 177 so that the gear 172 and the shaft 177 have identical axis. A motor 184 is mounted on the support frame 198, and another gear 182 is mounted at the top of the shaft 183 of the motor. The gear 182 and the shaft 183 have a same axis. The gears 171 and 173 are engaged. The gears 181 and 182 are engaged. The shafts 111, 175,177, 183 and all four gears have parallel axes. As the motor rotates the gear 182, the gear 181 and hence the sleeve 178 rotates around the shaft 177, thus producing a circular movement in the shaft 175 and in 173 around the shaft 177. Since the gear 171 is rigidly connected with the support frame 198, the gear 173 makes a self-rotation relative to the shaft 175 while in a circular movement around the axis of the shaft 177. The shaft 111 moves along an epicycloid. FIG. 6B shows an exemplified movement path 178 of the shaft 111. The magnitudes of the epicycloidal movement of the shaft 111 can be designed to be properly small, by adjusting the distance between the axes of the shafts 175 and 177 as well as the position of the shaft 111 on the gear 173. The point of the internal surface of the cooking pan intersected with the axis of the shaft 111 can be a center point on the cooking pan. The center point is only displaced by a properly small distance at all times. In addition, the inclination of any axis of the cooking pan is changed by a small angle. Except a self-rotation around the shaft 111, the cooking pan as a whole is displaced by a small distance and by a small inclination change during the movements.

The motion mechanism in FIG. 3A-3B, 5A or 6A moves the shaft 111 in a planar movement path. Each one of the three motion mechanisms can be modified so the axes of all shafts and gears point to a center point (comparable with point 650 in FIG. 2). Then the shaft 111 can move along a spherical movement path. The same comment can be applied to many of the automated cooking apparatus in the subsequent figures.

It should be noted that the motion mechanisms moving the shaft 111 or 211 in FIGS. 1-5A, 6A can be implemented by mechanisms producing other than rotational, oscillatory, hypocycloidal or epicycloidal motions. Broadly, the motion mechanism can be any motion mechanism that is capable of frequent change of moving directions. The first turning pair 110 can include a sleeve and a shaft as descried above but can also include a ball and a cap (or sleeve), as well as other kinematic pairs.

It should be noted that in the cooking apparatus shown in FIGS. 1-5A, 6A, the cooking pan can have a self-rotation, i.e., a rotation around the first turning pair. The self-rotations can pick up speed as the shaft is moved by the respective motion mechanism. The motor driving the motion mechanism needs to rotate alternatively in both directions to limit the speed of self-rotation of the cooking pan. In FIGS. 7A-16D below, different mechanisms are disclosed to either constrain or actively control the self-rotations of the cooking pan. However, the two mating parts of the first turning pair should not be rigidly connected.

It should be noted that in the cooking apparatus shown in FIG. 1-5A, or 6A, the center point of the internal surface of the cooking pan intersected with the axis of the first turning pair is a center point of the cooking pan with respect to the cooking pan's self-rotation. It is possible but not required for the axis of the first turning pair to be a central axis of the cooking pan in a geometric or other sense.

Figure 7A:
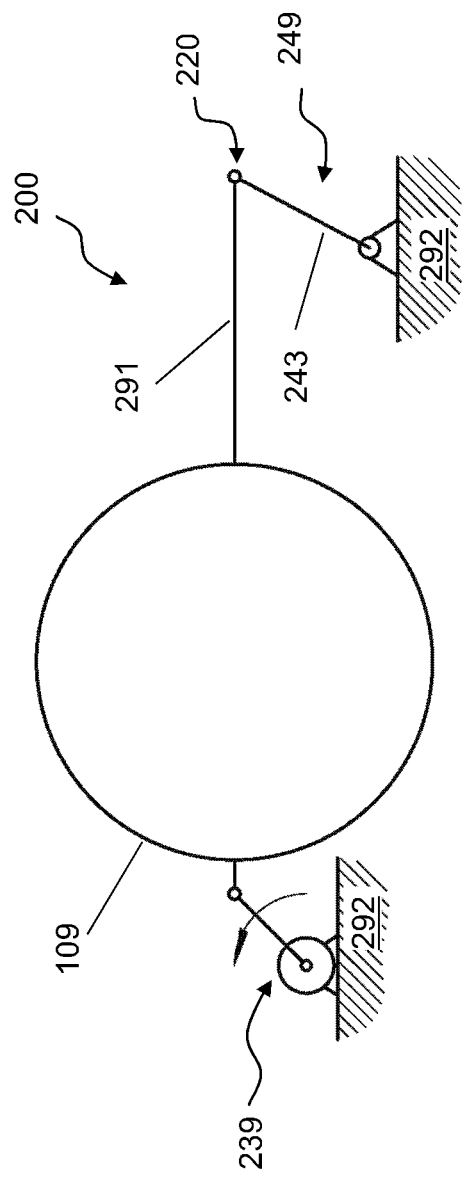
FIGS. 7A-7B respectively show top and side views of another automated cooking apparatus that can produce cyclic movements in a cooking pan.
Figure 7B:
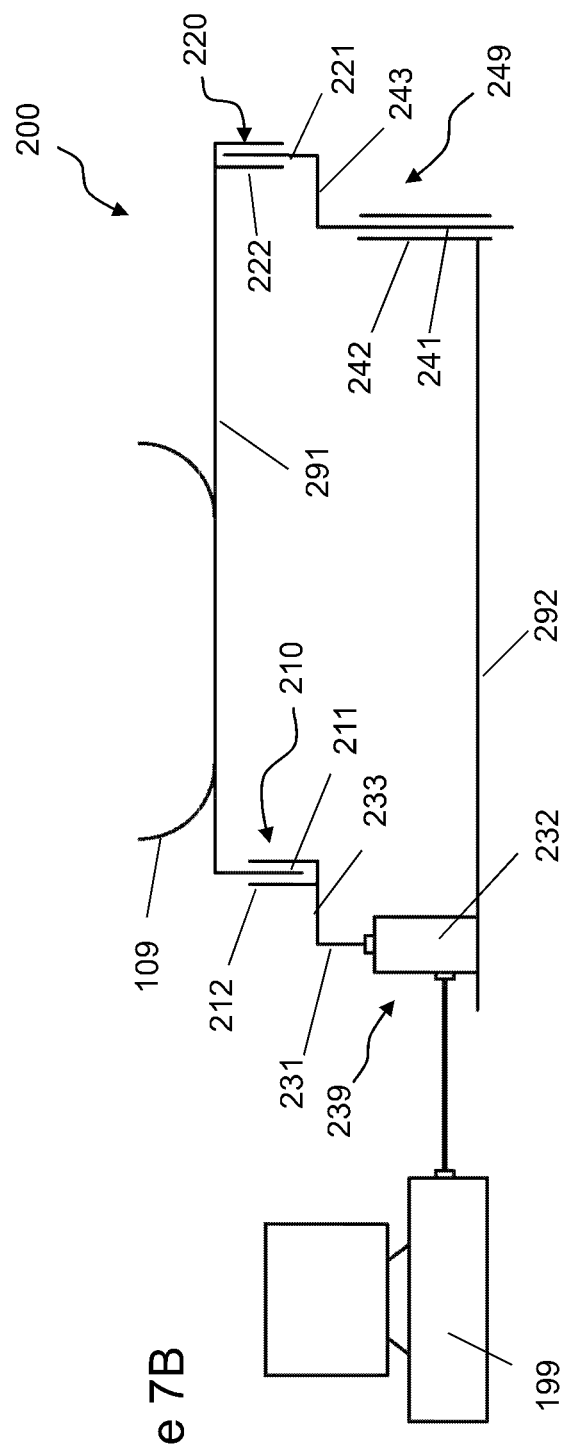

In some embodiments, referring to FIGS. 7A and 7B, an automated cooking apparatus 200 includes a cooking pan 109, and a holder 291 which carries the cooking pan 109. A first turning pair 210, as a first kinematic pair, includes a shaft 211 and a sleeve 212 as mating parts. The shaft 211 is connected with the holder 291. A motion mechanism 239 includes a motor 232 with a shaft 231, a rigid connector 233 that rigidly connects the shaft 231 and the sleeve 212. The motor 232 is mounted on a support frame 292. A computer 199 controls the motor 232. A stabilization mechanism 249 includes a second turning pair 220, as a second kinematic pair, with a shaft 221 and a sleeve 222 where the sleeve 222 is connected to the holder 291, a third turning pair (as a third kinematic pair) with a shaft 241 and a sleeve 242, and a connector 243 that connects the shafts 221 and 241. The sleeve 242 is mounted on the support frame 292. The motion mechanism 239 can produce a circular movement in the sleeve 212, along with the shaft 211, the holder 291 and the cooking pan 109. The mechanism 249 allows the shaft 221 to move in a circular movement around the shaft 241. The four shafts 211, 221, 231 and 241 are aligned substantially parallel to each other. The radius of circular movement of the motion mechanism 239 is the distance between the axes of the shafts 211 and 231. The radius of circular movement of the mechanism 249 is the distance between the axes of the shafts 221 and 241. The radius of circular movement of the motion mechanism 239 can be designed to be smaller than the radius of circular movement of the stabilization mechanism 249. The movement path of the shaft 221 is only an arc of a circle, instead of a full circle around the shaft 241. The stabilization mechanism is used to constrain the rotation of the holder and the cooking pan around the sleeve 212. The radius of circular movement of the motion mechanism 239 is designed to be properly small by adjusting the distance between the axes of the shafts 211 and 231, so any point of the cooking pan is only displaced by a properly small distance. The inclination of any axis of the cooking pan is changed by a small enough angle. (In fact, the inclination of any axis of the cooking pan does not change if the axes of the shafts 211, 231, 221 and 241 are designed to be vertical.) In particular, the cooking pan as a whole is displaced by a small distance and by a small inclination change at all times, so the food ingredients contained in the cooking pan can be heated by the heater while the cooking pan is moved. On the other hand, the rotation speed of the motor 232 can be properly large, as to produce a properly large acceleration in the movement of any point on the internal surface of the cooking pan. It should be noted that we may configure the cooking apparatus 200 so that the mating parts 211 and 212 of the first turning pair 210 are not rigidly connected to each other.

It should be noted that the apparatus 200 may be modified so that the distance between the shafts 211 and 231 is the same as the distance between the shafts 221 and 241. That is, the radii of the circular movements in the mechanisms 239 and 249 are identical. Then the circular movement of the mechanism 249 can be either synchronous with the circular movement of the motion mechanism 239, or in opposite direction to the circular movement of the motion mechanism 239. In either case, the mechanism 249 can be powered and thus becomes another motion mechanism (and the turning pair 220 becomes another first kinematic pair). The movement of 221 by the motion mechanism 249 must be strictly coordinated with the movement of 212 by the motion mechanism 239 so that the distance between the axes of the shafts 212 and 222 is kept unchanged. It should be noted that the two motion mechanisms 239 and 249 can be linked by a transmission or linkage mechanisms such as a gear transmission system or a crank rod, so both motion mechanisms are driven by a same motor.

In some embodiments, referring to FIGS. 8A and 8B, an automated cooking apparatus 300 includes a cooking pan 109 which is rigidly or otherwise connected to a holder 391. A first turning pair (as a first kinematic pair) 310 includes a shaft 311 and a sleeve 312 as mating parts. The sleeve 312 is connected with the holder 391. A motion mechanism 339 includes a motor 332 mounted on a support frame 392, and a rigid connector 333 that connects the shaft 331 of the motor 332 and the shaft 311. The motor 332 can produce a circular movement in the shaft 311 relative to the support frame 392. A stabilization mechanism 359 includes a sliding pair 320, as a second kinematic pair, with a sliding shaft 321 and a sleeve 322 where the shaft 321 is rigidly joined with the holder 391, a turning pair (as a third kinematic pair) with a shaft 351 whose sleeve 352 is mounted on the support frame 392, and a connector joining the shaft 351 with the sleeve 322. The axes of the shafts 321 and 351 are perpendicular to each other, and the axes of the shafts 331 and 351 are parallel to each other. The stabilization mechanism 359 constrains the movements of the sleeve 322 to a rotation around the shaft 351, constraining the linear direction of the shaft 321 to an oscillation, and thus limiting the rotation of the holder 391 and the sleeve 312 around the shaft 311, while the motion mechanism 339 produces a circular movement of the shaft 311 around the shaft 331. The radius of circular movement of the motion mechanism 339 is designed to be properly small by adjusting the distance between the axes of the shafts 311 and 331. The cooking pan as a whole is displaced by a small distance and by small inclination change. On the other hand, the rotation speed of the motor 332 can be properly large, as to produce a properly large acceleration in the movement of any point on the internal surface of the cooking pan. It should be noted that we may configure the cooking apparatus 300 so that the mating parts 311 and 312 of the first turning pair 310 are not rigidly connected to each other.

Figure 9A:
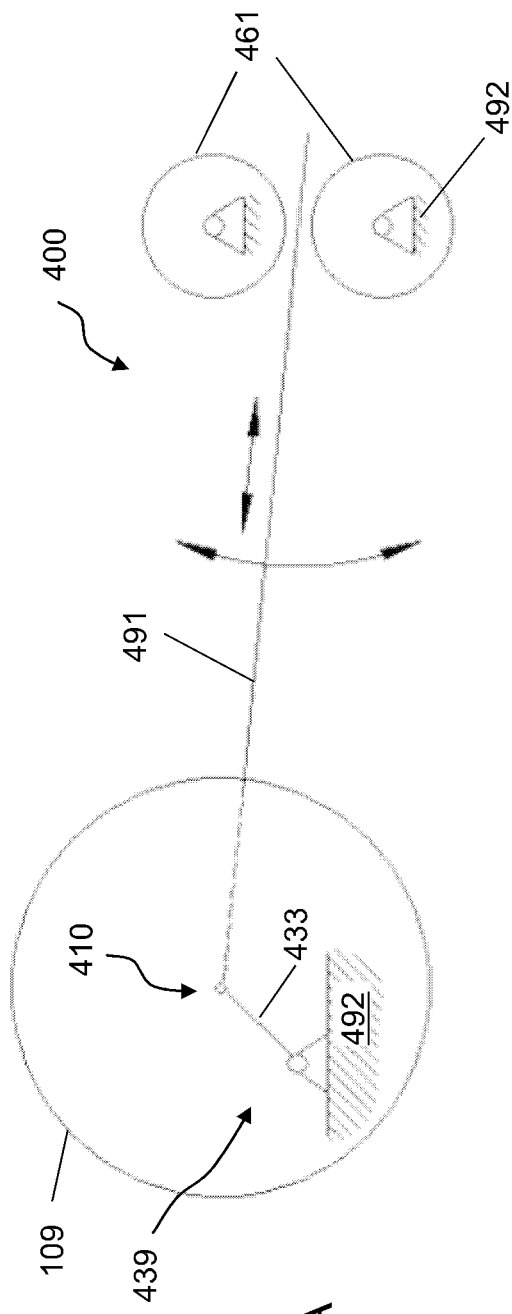
FIGS. 9A-9B respectively show top and side views of another implementation of an automated cooking apparatus that can produce a different cyclic movement in a cooking pan.
Figure 9B:
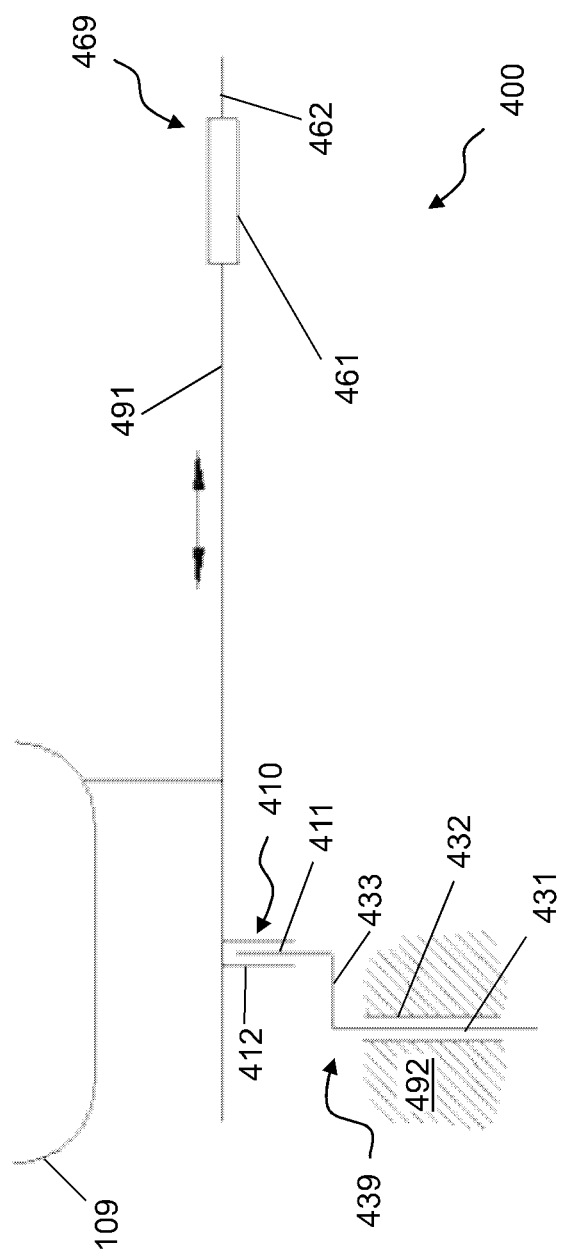

In some embodiments, referring to FIGS. 9A and 9B, an automated cooking apparatus 400 includes a cooking pan 109, a holder 491 which carries the cooking pan 109. A first turning pair 410, as a first kinematic pair, has a shaft 411 and a sleeve 412 as mating parts. The sleeve 412 is joined with the holder 491. A motion mechanism 439 includes a shaft 431 in a sleeve 432, a rigid connector 433 joining the shafts 431 and 411, and a motor (not shown in figure) which drives the rotation of shaft 431 around its axis. The sleeve 432 is mounted on a support frame 492. A stabilization mechanism 469 consists of a pair of rotatable locating bearings 461 mounted on the support frame 492. The bearings 461 loosely constrain a section 462 of the holder 491 to slide back-and-forth and between the bearings 461. The radius of circular movement of the motion mechanism 439 is designed to be properly small by adjusting the distance between the axes of the shafts 411 and 431. The cooking pan as a whole is displayed by a small distance and by a small inclination change. On the other hand, the rotation speed of the motor driving the rotation of the shaft 431 can be properly large, as to produce a properly large acceleration in the movement of any point on the internal surface of the cooking pan. It should be noted that we may configure the cooking apparatus 400 so that the mating parts 411 and 412 of the first turning pair 410 are not rigidly connected to each other.

Figure 9E:
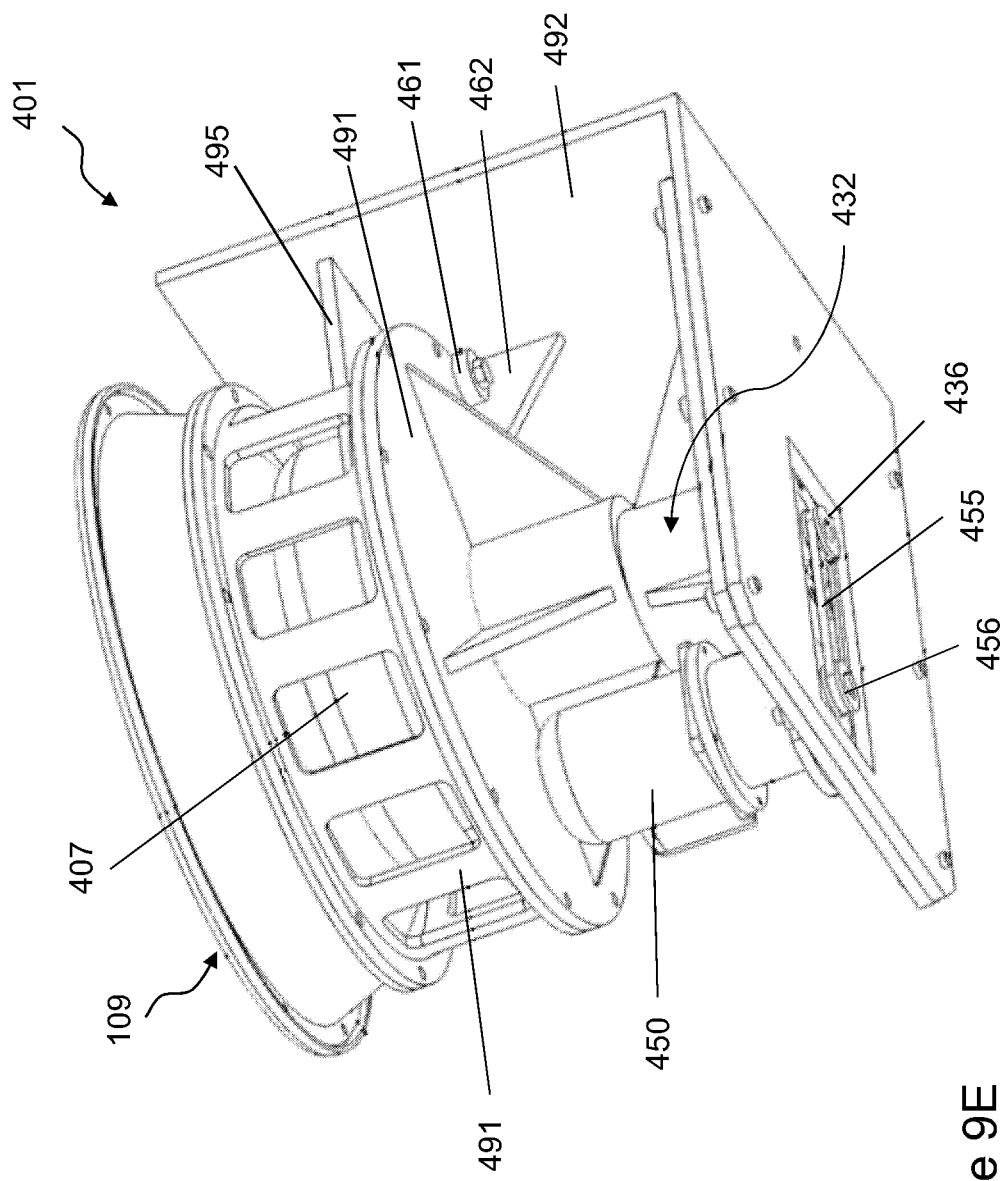
Figure 9G:
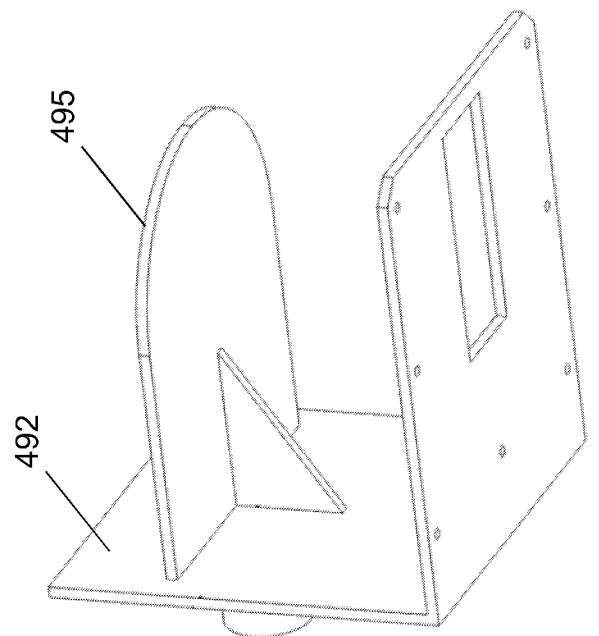
Figure 9F:
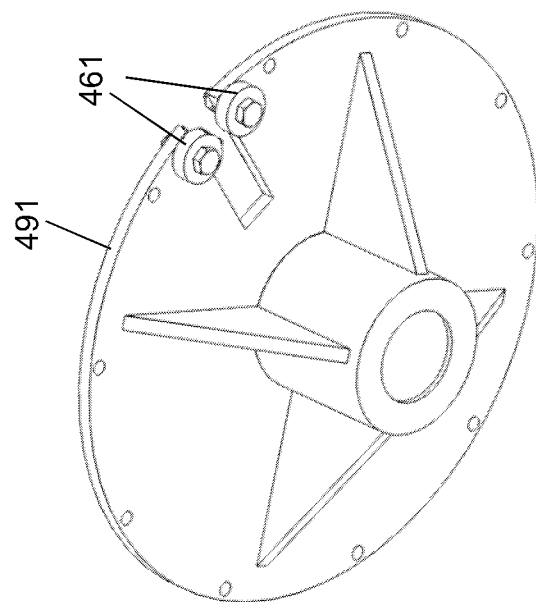

FIGS. 9C-9G display details of an exemplified mechanical implementation 401 of the automated cooking apparatus 400. Referring to FIG. 9C, the holder 491 has a top part in the shape of a ring which holds the cooking pan 109, and a lower part which is rigidly joined with the top of the sleeve 412 of the shaft 411. The shaft 411 and the shaft 431 (and connector 433) are one piece. The sleeve 432 of the shaft 431 is rigidly joined with the support frame 492. Bearings 318 are placed between the shaft 411 and the sleeve 412. The bearings 438 are placed between the shaft 431 and the sleeve 432. A motor 450 is mounted on the support frame 492 and drives the axial rotation of the shaft 431 through a belt 455 enveloping a belt wheel 436 on shaft 431 and a belt wheel 456 on the shaft of the motor 450 (FIG. 9E). The bearings 461 are used to loosely limit the movement of a vertical plate 462 which is a rigid part of the holder 491. In addition, a stove 407 (FIG. 9C) is mounted on an overhanging plate 495 which is rigidly fixed to the support frame 492 (FIG. 9G).

Figures 10A, 10B:
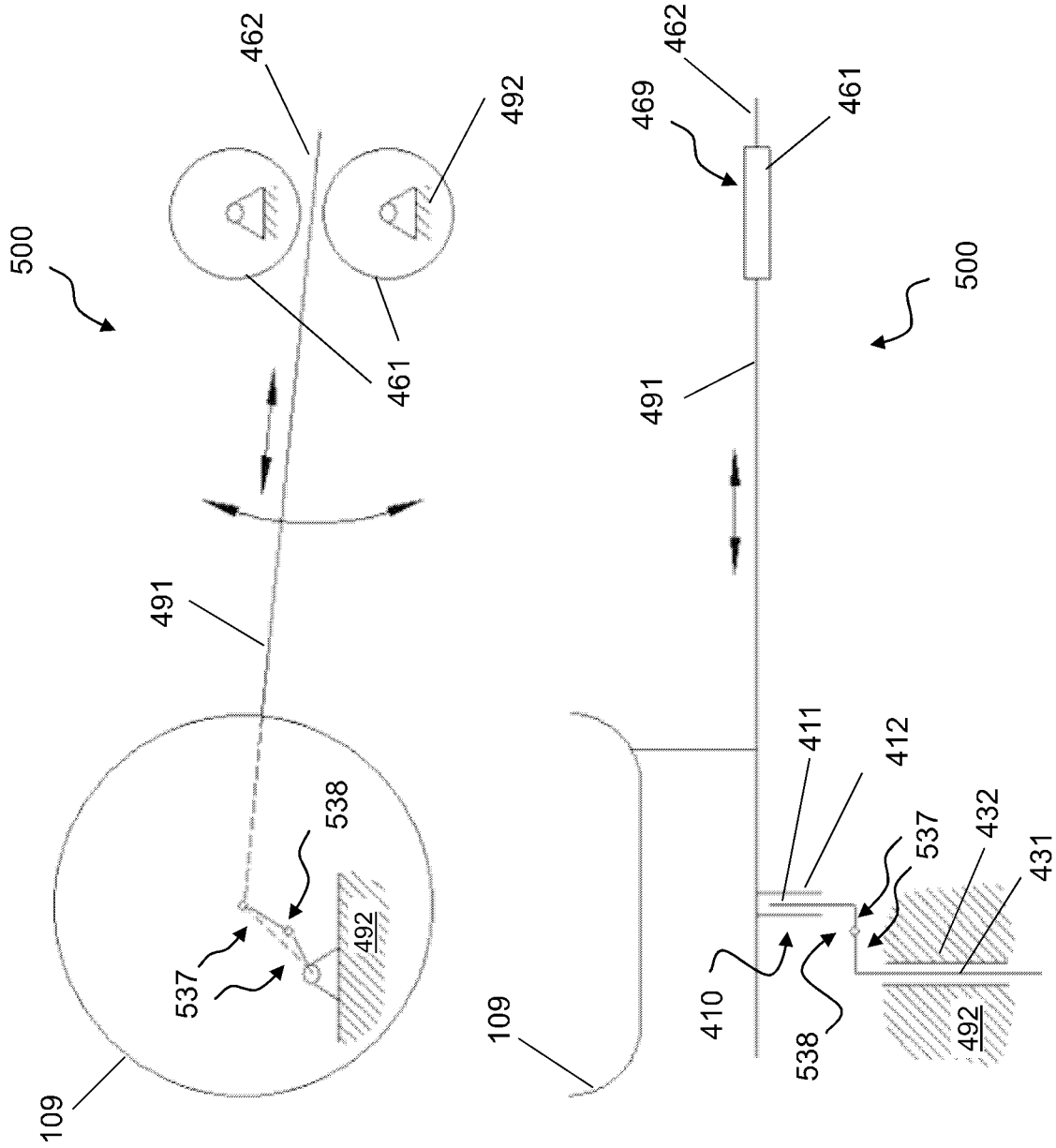
FIGS. 10A-10B respectively show top and side views of another automated cooking apparatus which includes mechanisms to produce controlled cyclic movements in a cooking pan.

In some embodiments, referring to FIGS. 10A and 10B, an automated cooking apparatus 500 includes similar components as automated cooking apparatus 400 (FIGS. 9A and 9B) except for the motion mechanism 439 includes an adjustable connector 537, instead of a rigid connector, which connects the shaft 411 and the shaft 431. The angle of the two segments of the adjustable connector 537 at a hinge joint 538 can be changed by a controlled rotating motor, and thus the distance between the center of the shaft 411 and the center of the shaft 431 can be controlled. In other words, the radius of the circular movement of the motion mechanism 439 can be controlled. An advantage of this design is that the amplitude of the cyclic movement of the cooking pan 109 can be varied based on the type of food ingredients being cooked and also based on time in the cooking process. Movements with smaller amplitudes can be used for food ingredients that are easily broken so the shape and appearance of the food ingredients can be preserved during cooking. For food ingredients that are not easily broken, they can be more vigorously stirred, mixed, and aerated by selecting high amplitude. Moreover, by reducing the distance between the centers of the shafts 411 and 431 to zero, it can bring the axis of the shaft 411 (which can coincide with the axis of the cooking pan 109) to a predetermined position no matter how many angular degrees the shaft 431 has rotated around its axis.

In the cooking apparatus 500 in FIG. 10A-10B, a computer together with drivers may be used to control the directions and speeds of the motor that produces a rotation of the shaft 431 (around its own axis) in the motion mechanism, and to control the motor powering the rotation of the connectors 537 around the hinge joint 538 as to adjust the radius of the circular movement of the shaft 411 produced by the motion mechanism. Both motors may rotate simultaneously, and the movement paths of a point of the shaft may not be a closed path. In fact, the axis of the shaft 411 can make a planar movement whose movement path can be an open curve.

For the present patent application, a point is said to move by a composition of oscillatory movements, if the X, Y and Z coordinates of the point (in a three dimensional orthonormal coordinate system, relative to a support frame), if moved, is moved in oscillation. The frequency of the sign change in the velocity of a coordinate of the point defines a frequency in the combination of oscillatory movements. A composition of oscillatory movements may have more than one frequency. Moreover, the magnitudes and frequencies in a composition of oscillations may be variable over time. The movement of a body is a composition of oscillatory movements, if any point marked on the body moves by a composition of oscillatory movements. In this sense, the motion mechanism in the cooking apparatus 500 produces a combination of oscillations in the shaft 411.

In some embodiments, the radius of circular movement of the motion mechanism described in FIGS. 10A-10B can be automatically adjusted using an exemplified mechanism 501, shown in FIGS. 10C-10E. The hinge joint 538 (of FIG. 10B) has a shaft 539 and a sleeve 540. A gear 581 is rigidly joined with the shaft 411 and the sleeve 540, and is concentric with the sleeve 540 and the shaft 539, so the gear 581 can rotate around the shaft 539. The shaft 411 has a hole so the sleeve 540 is positioned inside the hole. A plate 583 rigidly joins the shaft 539, the shaft 431, and the base of a motor 520. The motor 520 drives a gear 582 that is engaged with the gear 581, which rotates the gear 581 around the shaft 539. The shafts 411, 431 and 439, and the shaft of the motor 520 have parallel axes. The distance between the shaft 411 and the shaft 431, or equivalently, the radius of circular movement of the shaft 411 relative to the support frame 492 (FIGS. 10A and 10B), can thus be adjusted.

The mechanism 501 in FIG. 10C-E, can also be added to the apparatus in FIGS. 1, 7A-7B, 8A-8B to control the radius of circular movement of a shaft of a first turning pair by a motion mechanism, e.g., the distance between the axes of the shafts 111 and 131 in FIG. 1, the distance between the axes of 211 and 231 in FIGS. 7A-7B, or the distance between the axes of 311 and 331 in FIGS. 8A-8B; or the radius of circular movement of a second turning pair in a stabilization mechanism, e.g., the distance between the axes of the shafts 221 and 241 in FIGS. 7A-7B. An apparatus similar to 501 may be used to control the angle α in apparatus of 100B of FIG. 2, by requiring the shafts 411, 431, 439 and 521 to have axes passing through the center point 650.

Figure 11:
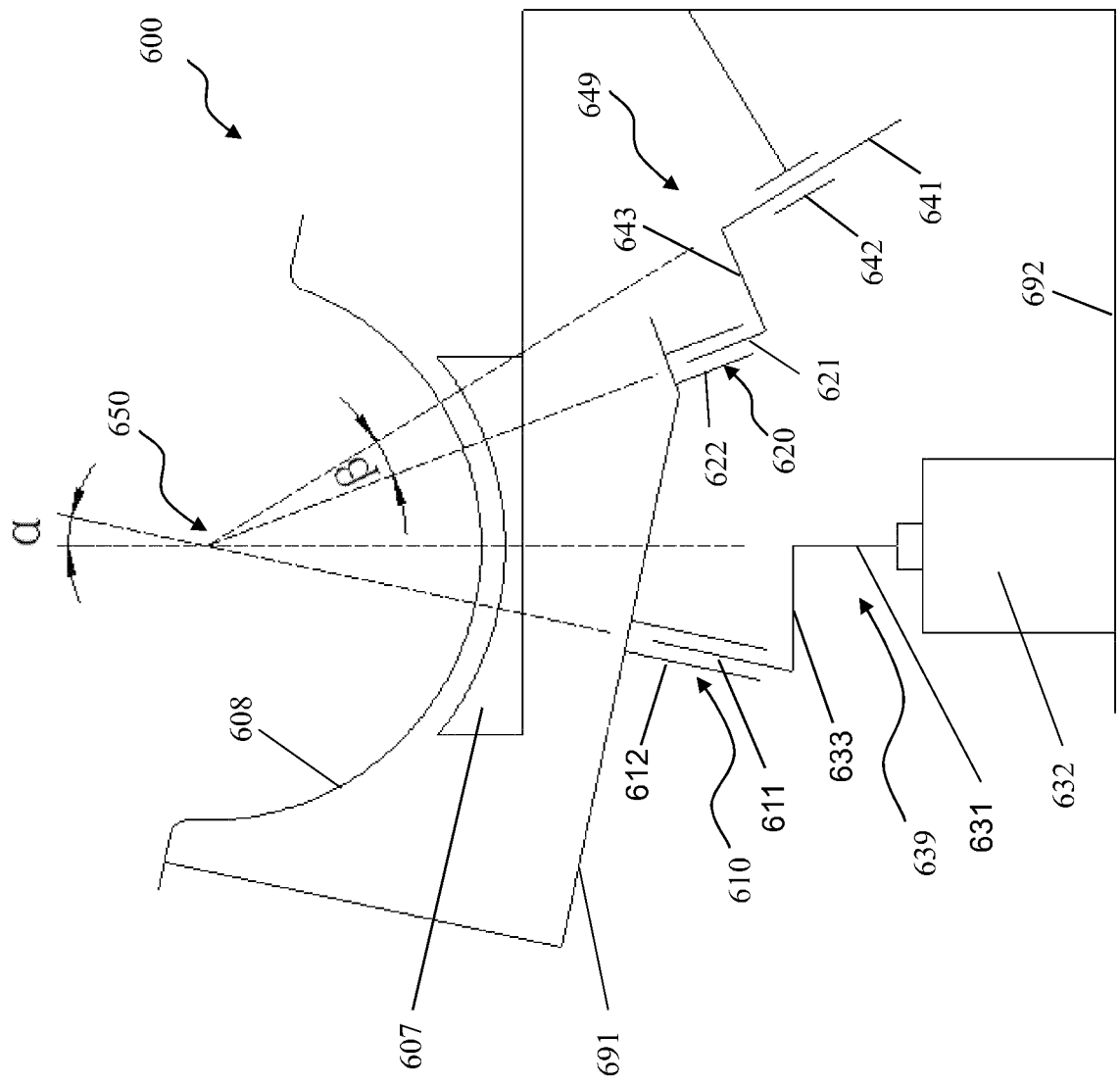
FIG. 11 shows an automated cooking apparatus in which a cooking pan is moved by a spherical mechanism.

In FIG. 11, an automated cooking apparatus 600 includes a cooking pan 608 of spherical shape mounted on a holder 691. A first turning pair 610, as a first kinematic pair, has a shaft 611 and a sleeve 612 as mating parts. The sleeve 612 is connected with the holder 691. A motion mechanism 639 includes a motor 632 mounted on a support frame 692 and a rigid connector 633 joining the shaft 631 of the motor 632 and the shaft 611. A stabilization mechanism 649 includes a turning pair 620 (as a second kinematic pair) with shaft 621 whose sleeve 622 is joined to the holder 691, a turning pair (a third kinematic pair) with a shaft 641 in a sleeve 642, and a rigid connector 643 joining the shafts 621 and 641. The sleeve 642 is mounted on the support frame 692. The motion mechanism 639 can produce a circular movement in the shaft 611. The stabilization mechanism 649 allows a rotation of the shaft 621 around the shaft 641. The axes of the shafts 611, 621, 631, 641 all intersect at the spherical center 650 of the spherical shaped cooking pan 608. The angle α between the axes of the shafts 611 and 631 is smaller than the angle β between the axes of the shafts 621 and 641. The shaft 631 can rotate continuously in one direction but the shaft 641 has to rotate back and forth by less than 180 degrees. Thus, the stabilization mechanism 649 can limit the movement of the shaft 621, hence constraining the holder and the cooking pan's self-rotation around the shaft 612. A stove 607 lies right below the cooking pan 608 and is mounted on the support frame 692. The angle between the axes of the shafts 611 and 631 is designed to be properly small. Then the cooking pan as a whole is displayed by a small distance and by a small inclination change. On the other hand, the rotation speed of the motor 632 can be properly large, as to produce a properly large acceleration in the movement of any point on the internal surface of the cooking pan.

Another apparatus can be built the same way as the apparatus 600 in FIG. 11 simply by letting α and β be equal to each other. Then both the shafts 631 and 641 can rotate continuously in one direction or in mutually opposite directions; and the rotation of the shaft 641 must be in strict coordination of the rotation of the shaft 631 so that the angle between the axes of the shafts 611 and 621 stays unchanged. In this case, the mechanism 649 in the apparatus 600 can also be powered as to rotate the shaft 641, and thus becomes a motion mechanism. At the same time, the turning pair 620 becomes a first kinematic pair. It should be further noted that a transmission or linkage mechanism can link both motion mechanisms so they may be driven by a same motor.

Figure 12:
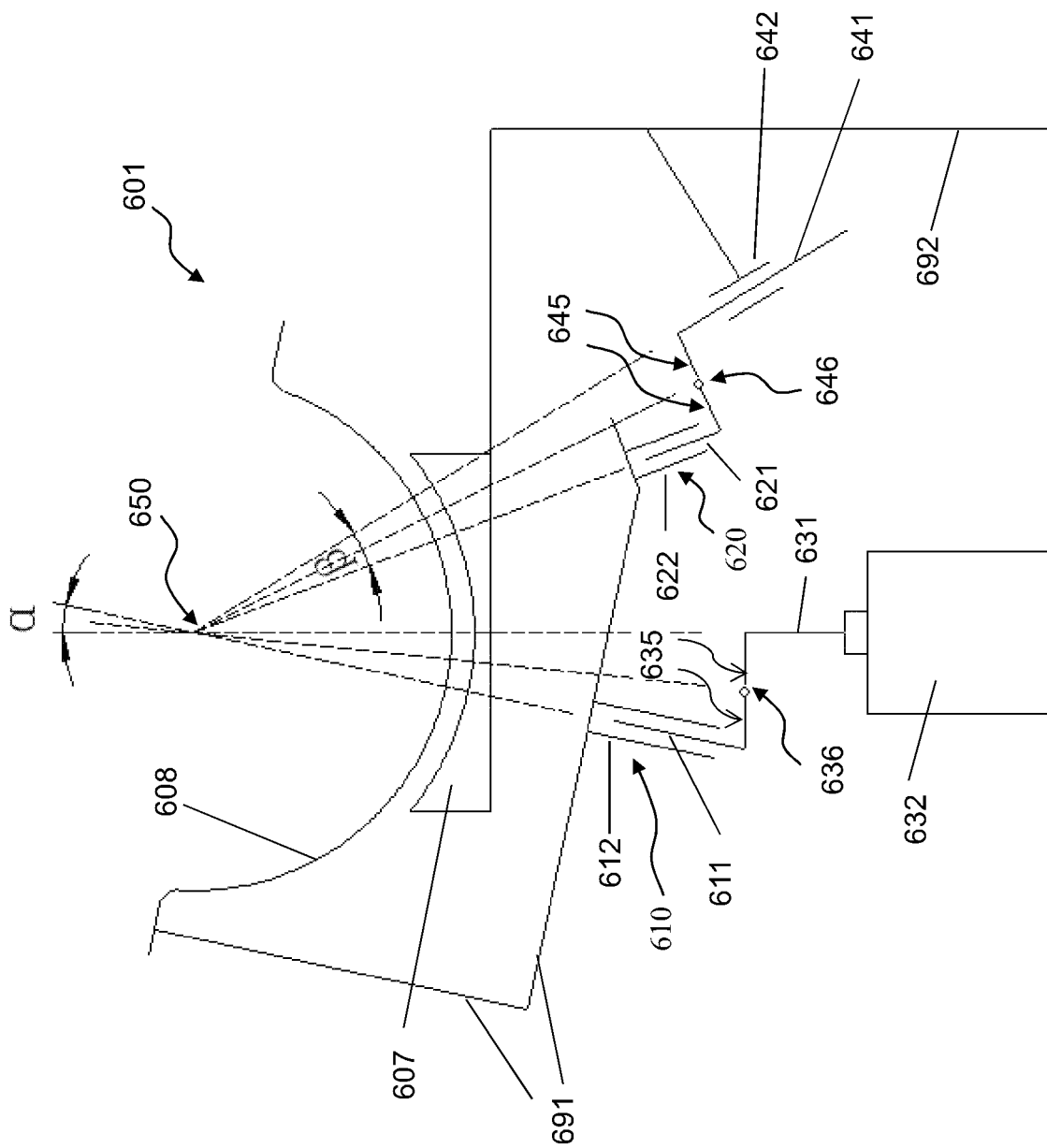
FIG. 12 shows another automated cooking apparatus in which a cooking pan is moved by a spherical mechanism.

FIG. 12 shows an automated cooking apparatus 601 similar to the apparatus 600 in FIG. 11. The angle α between the axes of the shafts 611 and 631 can be controlled by adjusting the angle of the two sides of connector 635 at a hinge joint 636. Similarly, the angle β between the axes of the shafts 621 and 641 can be adjusted by adjusting the angle of the two sides of connector 645 at a hinge joint 646. The axes of shafts 611, 621, 631 and 641, and the axes of hinge joints 636 and 646 all pass through the center 650. It should be noted that we may configure the cooking apparatus 600 so that the mating parts 611 and 612 of the first turning pair 610 are not rigidly connected to each other. Same remark applies to the apparatus of FIGS. 11 and 12.

In some embodiments, referring to FIGS. 13A-13B, an automated cooking apparatus 800 includes a cooking pan 109, a holder 891 which is connected to a cooking pan 109. A first turning pair (as a first kinematic pair) 810 includes a shaft 811 and a sleeve 812 as mating parts. The sleeve 812 is connected with the holder 891. A motion mechanism 839 includes a motor 832 mounted on a support frame 892 and a connector 833 that rigidly connects the shaft 831 of the motor 832 and the shaft 811. A stabilization mechanism consists of an elastic connector 820 connecting the holder 891 to the support frame 892, as to limit the self-rotation of the holder 891, and hence that of the cooking pan 109 around the shaft 811. The radius of circular movement of the motion mechanism 839 is designed to be properly small by adjusting the distance between the axes of the shafts 811 and 831. The cooking pan as a whole is displayed by a small distance and by a small inclination change. On the other hand, the rotation speed of the motor 832 can be properly large, as to produce a properly large acceleration in the movement of any point on the internal surface of the cooking pan. It should be noted that we may configure the cooking apparatus 800 so that the mating parts 811 and 812 of the first turning pair 810 are not rigidly connected to each other.

It should be noted that the elastic connector 820 in the cooking apparatus may be substituted by any non-rigid connector, such as a loose rope with ends tied to the holder 891 and the support frame 892, or a loose connector such as a chain with ends hooked to rings that are respectively mounted on the holder 891 and on the support frame 892.

Figure 14:
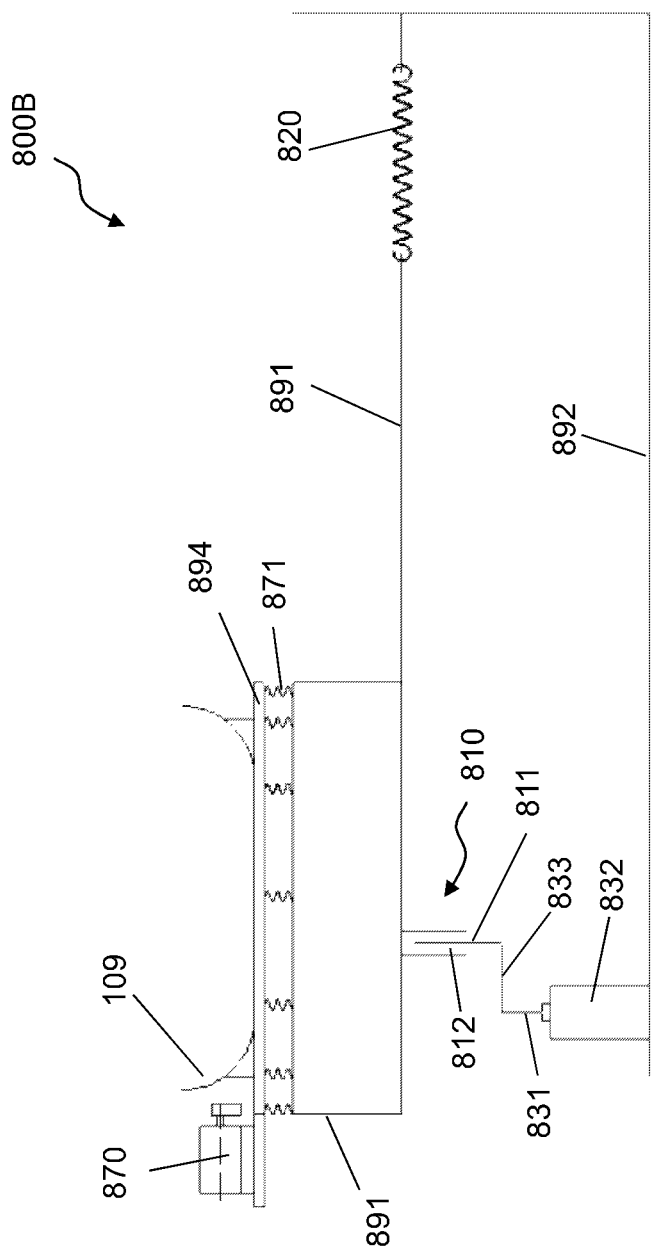
FIG. 14 shows another automated cooking apparatus including a mechanism for vibrating the cooking pan.

In some embodiments, FIG. 14 shows an automated cooking apparatus 800B similar to 800, with a further frame 894 carrying a cooking pan 109, and an elastic connection comprising springs 871 joining the frame 894 and the holder 891. A motion mechanism and stabilization mechanism identical to that in the automated cooking apparatus 800 moves the holder 891. A vibration mechanism 870 is mounted on the frame 894 to produce vibration in the cooking pan 109.

Figure 15A:
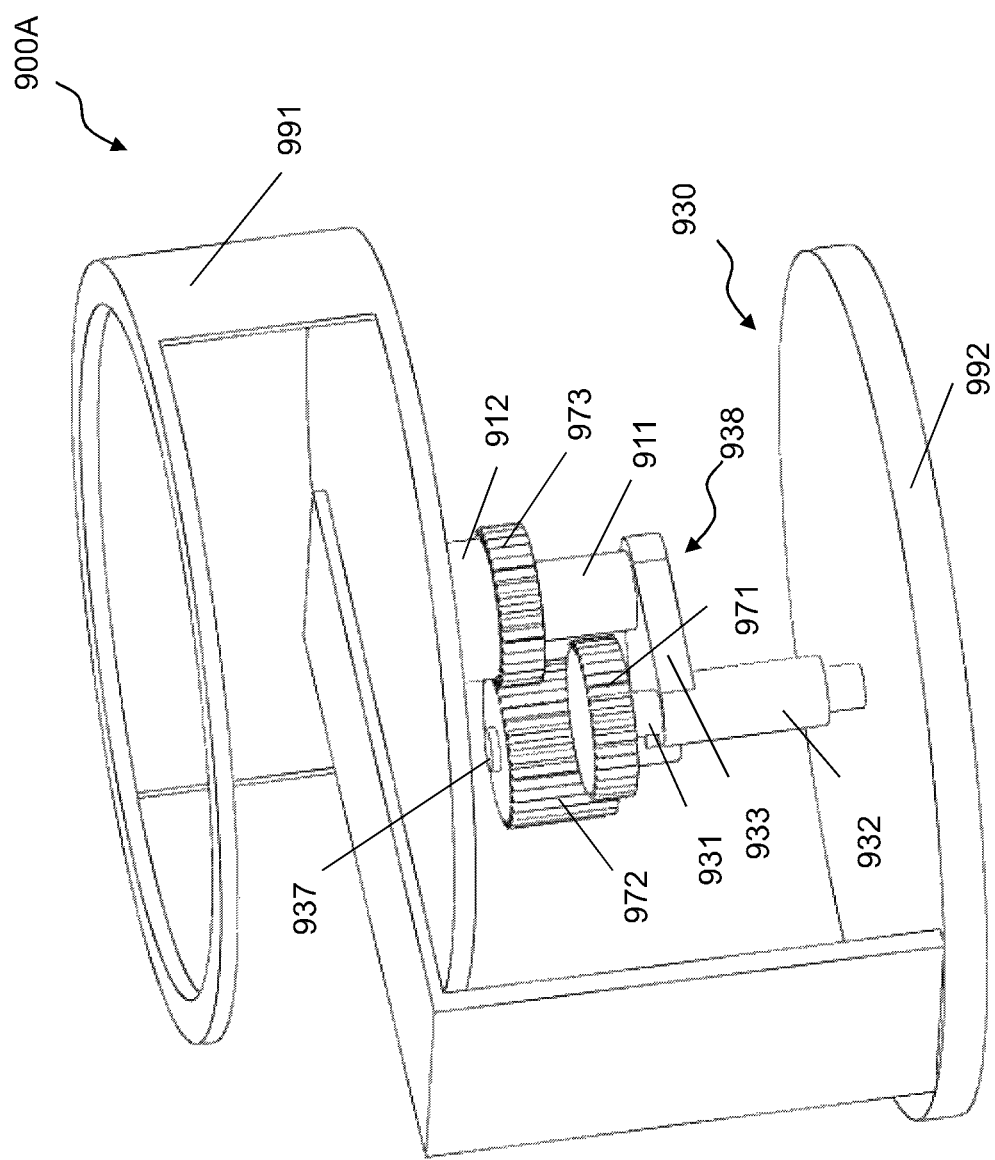
FIG. 15A shows an automated cooking apparatus that can produce circular movements with no self-rotation in a cooking pan.
Figure 15D:
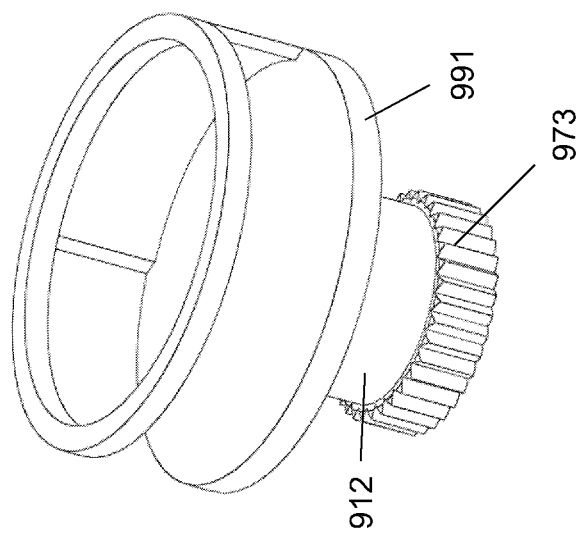
FIGS. 15B-15D are perspective views of components in the automated cooking apparatus shown in FIG. 15A.
Figure 15C:
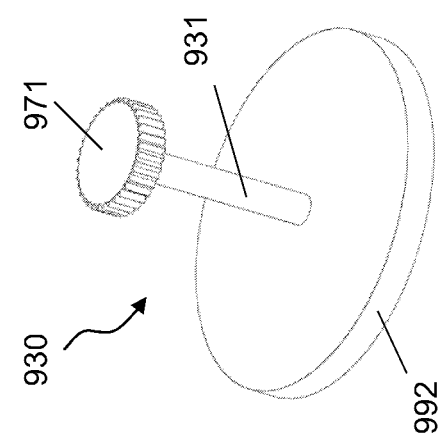
Figure 15B:
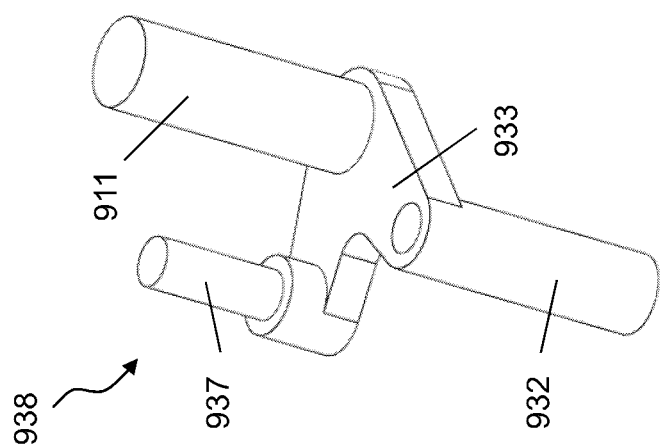

In some embodiments, FIGS. 15A-15D show an automated cooking apparatus 900A in which a cooking pan can be moved by a motion mechanism to make circular movement without any self-rotation relative to a support frame. A cooking pan (not shown) can be attached to and above a holder 991. A first turning pair, as a first kinematic pair, has a shaft 911 and a sleeve 912 as mating parts, with the sleeve 912 connected to the holder 991. The cooking pan usually has a central axis coinciding with the axis of the shaft 911 but this is not a requirement. A shaft 931 of another turning pair is rigidly connected with a gear 971 at top and is also rigidly connected to a support frame 992 at bottom (see FIG. 15C). The shaft 931 and the gear 971 are concentric. Referring to FIG. 15B, a rigid plate 933 rigidly connects the shaft 911 on the top side, the sleeve 932 of the shaft 931 on the bottom side, and a shaft 937 of a gear 972 on the top side. The gear 972 may rotate around the shaft 937. A third gear 973 is rigidly connected with, and concentric with sleeve 912. All shafts and gears have parallel axes; and the axes of the shafts 911, 931 and 937 have a same distance between each other. The gear 971 is engaged with the gear 972, which in its turn is engaged with gear 973, and all three gears have a same diameter, equal to the distance between the axis of the shaft 931 and the axis of the shaft 911. A motor (not shown) drives the rotation of the sleeve 932 (and hence of the plate 933 and the shaft 911) around the shaft 931. Thus, the shaft 911 can make a circular movement (around the shaft 931) relative to the support frame 992, moving the central axis of the cooking pan. As the gear 971 is rigidly joined with the support frame 992 via 931, the gear 972 and hence the gear 973 rotate simultaneously with the circular movement of the shaft 911 around the shaft 931, thus inducing a simultaneous relative rotation of the sleeve 912 around the shaft 911 (it should be noted again that the sleeve 912 is rigidly joined with the gear 973). By a careful analysis, the holder 991 and the cooking pan (not shown) have to have zero self-rotation relative to the support frame 992 at all times. Thus, the cooking pan makes a circular movement with no self-rotation. The distance between the axes of the shafts 911 and 931 can be designed to be properly small, so the cooking pan as a whole is displayed by a small distance and by a small inclination change. On the other hand, the rotation speed of the motor driving the axial rotation of the sleeve 932 can be properly large, as to produce a properly large acceleration in the movement of any point on the internal surface of the cooking pan. It should be noted that we may configure the cooking apparatus 900A so that the mating parts 911 and 912 of the first turning pair 910 are not rigidly connected to each other.

Figure 16:
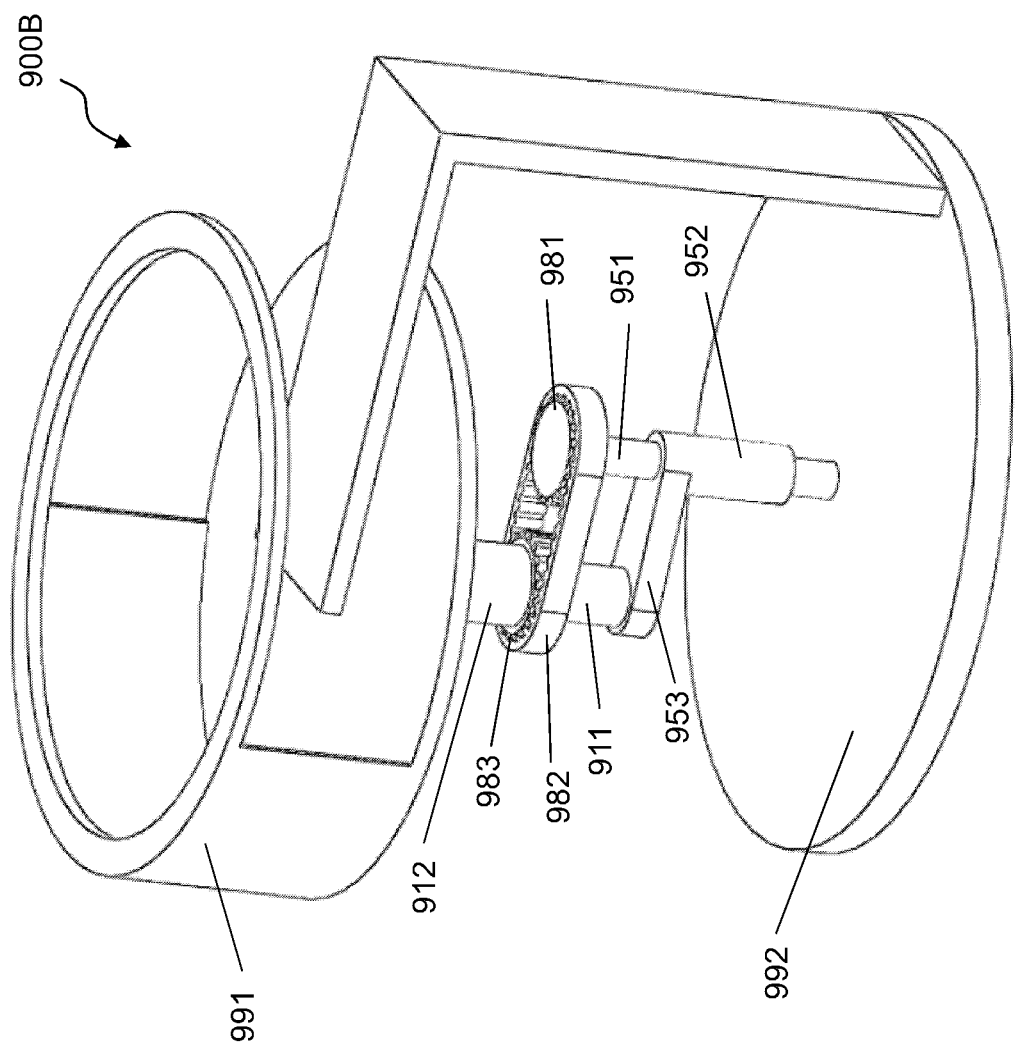
FIG. 16 shows an automated cooking apparatus similar to that in FIG. 15A.

In some embodiments, FIG. 16 shows an automated cooking apparatus 900B with the same function as 900A but with the gear transmission replaced by a belt transmission. A cooking pan (not shown) can be attached to and above a holder 991. A first turning pair (as a first kinematic pair) has a shaft 911 and a sleeve 912 as mating parts, with the sleeve 912 connected to the holder 991. The cooking pan usually has a central axis coinciding with the axis of the shaft 911 but this is not a requirement. A rigid connector 953 rigidly connects the shaft 911 with the sleeve 952 of a shaft 951 of a turning pair. The shaft 951 is mounted on a support frame 992. A belt wheel 983 is rigidly joined with and concentric with the sleeve 912. Another belt wheel 981 is rigidly joined with and concentric with the shaft 951. The belt wheels 981 and 983 are coplanar and have identical radius. A synchronous belt 982 envelopes the belt wheels 981 and 983. The shafts 911 and 951, and hence the belt wheels 983 and 981 have parallel axes. A motor (not shown) drives the rotation of the sleeve 952 (and hence of the connector 953 and the shaft 911) around the shaft 951. Thus, the shaft 911 can make a circular movement (around the shaft 951) relative to the support frame 992, moving an axis of the cooking pan. As the belt wheel 981 is rigidly joined with the support frame 992 via 951, the belt wheel 983 and hence the sleeve 912 rotate simultaneously with the circular movement of the shaft 911, thus inducing a simultaneous relative rotation of the sleeve 912 around the shaft 911. Under this mechanism, the holder 991 has to have no self-rotation relative to the support frame 992 during the circular movement. The distance between the axes of the shafts 911 and 951 can be designed to be properly small, so the cooking pan as a whole is displayed by a small distance and by a small inclination change. On the other hand, the rotation speed of the motor driving the axial rotation of the sleeve 952 can be properly large, as to produce a properly large acceleration in the movement of any point on the internal surface of the cooking pan. It should be noted that we may configure the cooking apparatus 900B so that the mating parts 911 and 912 of the first turning pair 910 are not rigidly connected to each other.

Figure 17A:
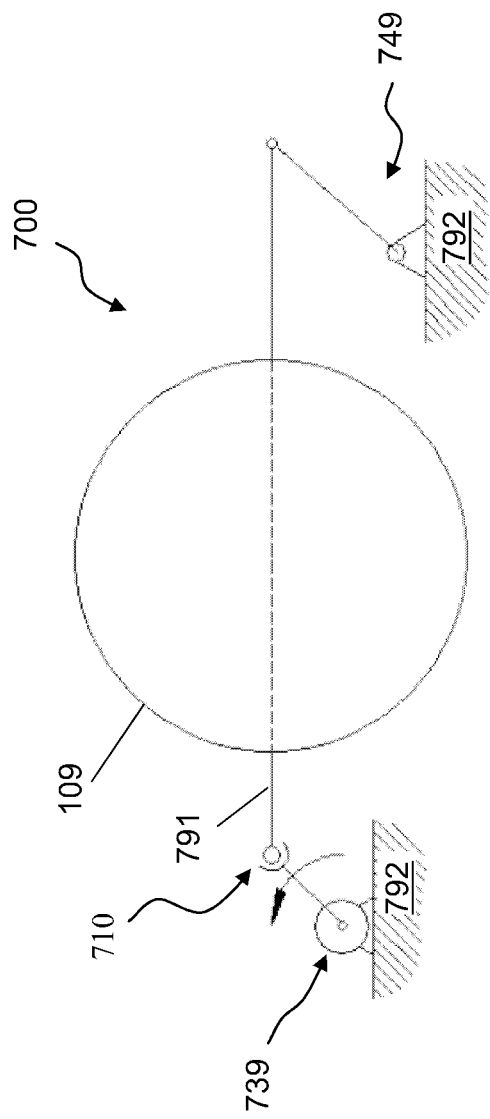
FIGS. 17A-17B respectively show top and side views of another automated cooking apparatus that can produce a cyclic movement in a cooking pan.
Figure 17B:
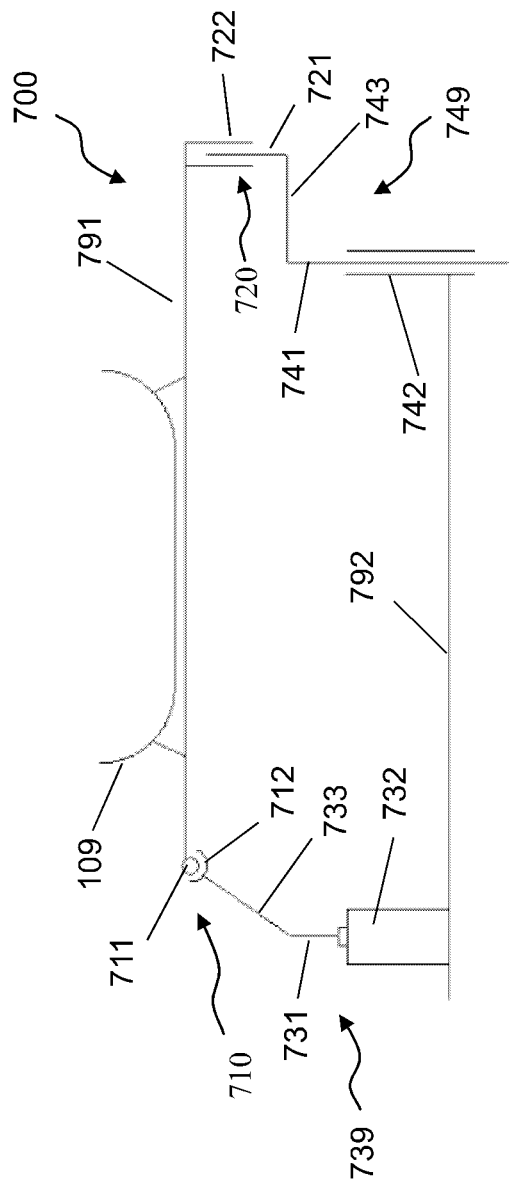

In some embodiments, referring to FIGS. 17A-17B, an automated cooking apparatus 700 includes a cooking pan 109, a holder 791 which carries the cooking pan 109. A universal turning pair (as a first kinematic pair) 710 has a ball 711 and a cap 712 as mating parts. The ball 711 is connected with the holder 791. A motion mechanism 739 includes a motor 732 mounted on the support frame 792 and a rigid connector 733 that connects the shaft 731 of the motor 732 and the sleeve 712. A stabilization mechanism 749 includes a turning pair (as a second kinematic pair) 720 with a shaft 721 whose sleeve 722 is connected with the holder 791, another turning pair (as a third kinematic pair) with a shaft 741 in a sleeve 742, and a connector 743 that rigidly connects the shafts 721 and 741. The sleeve 742 is mounted on the support frame 792. The distance from the center of the ball 711 to the axis of the shaft 731 is smaller than the distance between the axes of the shafts 721 and 741. The motion mechanism 739 can produce a circular movement in the cap 712. The stabilization mechanism 749 allows rotations of the shaft 721 around the shaft 741 in a circular movement. The movement produced by the apparatus 700 is substantially the same as the apparatus 200 in FIGS. 7A-7B. The distance between the center of the ball 711 and the axis of the shaft 731 can be designed to be properly small, so the cooking pan as a whole is displayed by a small distance and by a small inclination change. On the other hand, the rotation speed of the motor 732 can be properly large, as to produce a properly large acceleration in the movement of any point on the internal surface of the cooking pan. It should be noted that we may configure the cooking apparatus 700 so that the mating parts 711 and 712 of the universal turning pair 710 are not rigidly connected to each other.

Figure 18:
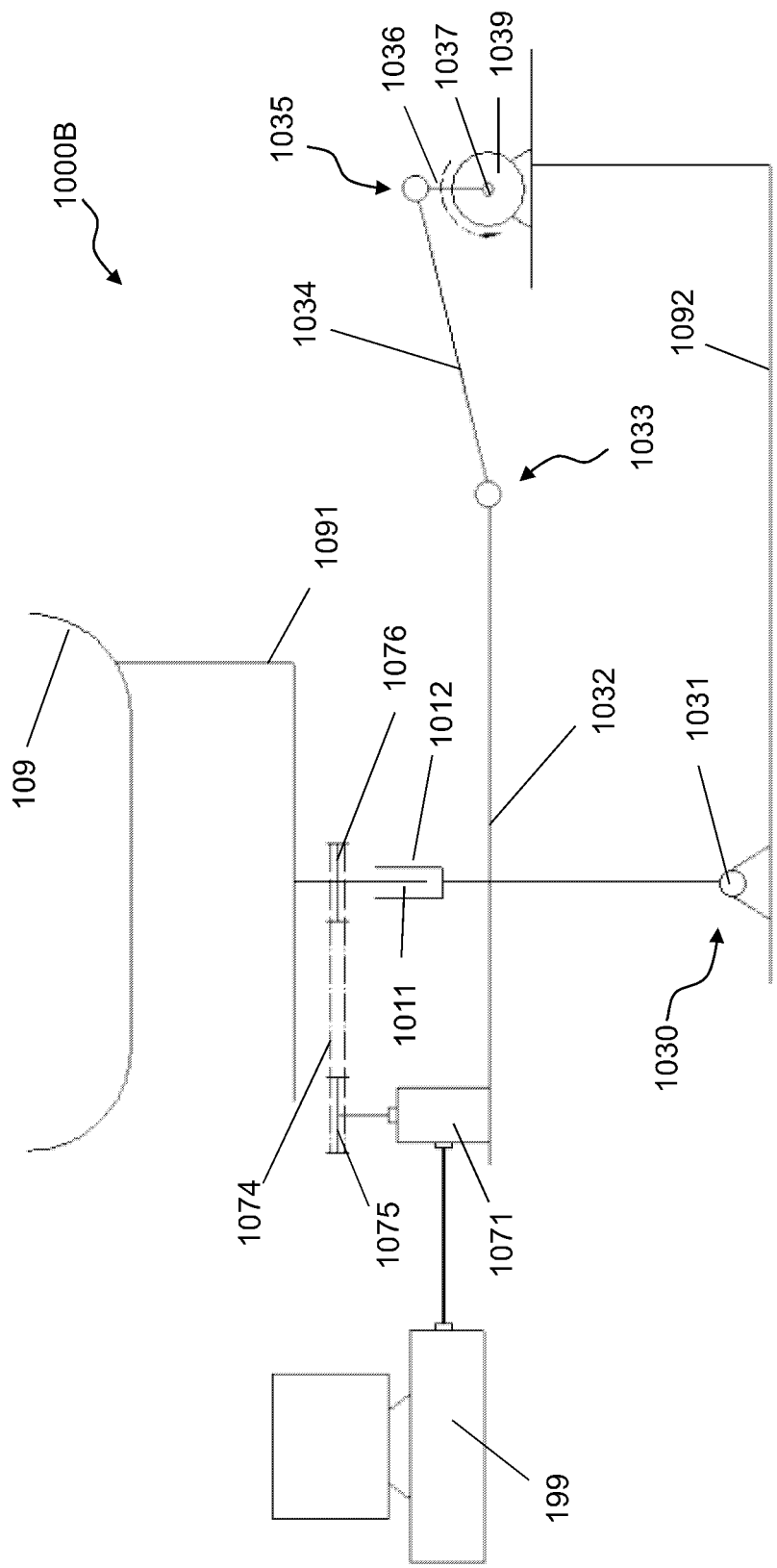
FIG. 18 shows a side view of an automated cooking apparatus that can produce a combination of oscillatory movements and a controlled self-rotation in a cooking pan.

In some embodiments, referring to FIG. 18, an automated cooking apparatus 1000B includes a holder 1091 that carries a cooking pan 109. A first turning pair (as a first kinematic pair) has a shaft 1011 and a sleeve 1012 as mating parts;

where the shaft 1011 is connected with the holder 1091, and the sleeve 1012 is rigidly connected with a frame 1032. A hinge joint 1030 connects the frame 1032 to a support frame 1092, so the frame 1032 is constrained to rotate around the joint. A turning pair 1033 consisting of a shaft and a sleeve connects the frame 1032 to one end of a first connector 1034. The other end of the first connector 1034 is connected with one end of a second connector 1036 via a turning pair 1035 consisting of a shaft and a sleeve. The other end of the second connector is rigidly joined by the shaft 1037 of a motor 1038. The turning pairs 1030, 1033, 1035 and the shaft 1037 have parallel axes; and the distance between the axes of the turning pair 1035 and the shaft 1037 is shorter than the distance between the axes of the turning pairs 1035 and 1033. As the motor rotates continuously, the turning pair 1035 makes a circular movement, resulting in an oscillatory rotation of the frame 1032 around the shaft 1031. A belt wheel 1076 is mounted on the shaft 1011 and has the same axis as the shaft 1011. A motor 1071, mounted on the frame 1032, rotates another belt wheel 1075 that is coplanar with the belt wheel 1076. A transmission belt 1074 envelopes around the belt wheels 1075 and 1076. A computer 199 controls the motor 1071 via a connector and also controls the motor 1039 via another connector (not shown in figure). Thus, the holder 1091 and the cooking pan 109 can be moved by a combination of a controlled oscillatory movement and a controlled self-rotation. The distance between the axes of the shafts 1035 and 1037 can be designed to be properly small. A point of the internal surface of the cooking pan intersected with the axis of the shaft 1011 may be a center point of the cooking pan. The center point is therefore displaced by a properly small distance and by a small inclination change. On the other hand, the rotation speed of the motor 1039 can be properly large, as to produce a properly large acceleration in the movement of any point on the internal surface of the cooking pan.

Usually the frequency of the self-rotation of the cooking pan around the shaft 1011 produced by the motor 1071 is much slower compared with the frequency of the oscillation produced by the motor 1039. The rotational oscillation produced by the motor 1039 can cause acceleration in the cooking pan for the purpose of stirring and mixing the food ingredients contained in the cooking pan. The movement directions of the rotational oscillations are constant (in time) relative to the support frame 1092 but are changing relative to the cooking pan due to the controlled self-rotation driven by the motor 1071. Thus, the food ingredients can be evenly stirred and mixed without accumulation along any particular direction. Moreover, the food ingredients are not accumulated in any particular area and thus have a balanced distribution in the cooking pan.

In some embodiments, referring to FIGS. 19A-19B, an automated cooking apparatus 1000C includes a holder 1091 which carries a cooking pan 109. A first turning pair (as a first kinematic pair) has a shaft 1011 and a sleeve 1012 as mating parts. The shaft 1011 is connected with the holder 1091; and the sleeve 1012 is rigidly connected with a frame 1042. A turning pair 1050 has a shaft 1051 and a sleeve 1052, where the sleeve 1052 is connected with the frame 1042 and the shaft 1051 is connected with a support frame 1094. The sleeve of a shaft 1043 in a turning pair is rigidly joined with the frame 1042. A first rigid connector 1044 connects the shaft 1043 to a shaft 1045 in another turning pair. A second rigid connector 1046 connects the sleeve of the shaft 1045 to the shaft 1047 of a motor 1049. A third rigid connector 1056 rigidly connects the frame of the motor 1049 to the shaft 1055 of a second motor 1054. The motor 1054 is mounted on the support frame 1094 and can drive and brake the rotation of the shaft 1055. All shafts 1051, 1043, 1045, 1047 and 1055 have parallel axes; and the distance between the axes of the shafts 1045 and 1047 is shorter than the distance between the axes of the shafts 1045 and 1043. A belt wheel 1076 is mounted on the shaft 1011 and is concentric with the shaft 1011. A motor 1071 mounted on the frame 1042 can rotate another belt wheel 1075 which is coplanar with the belt wheel 1076. A transmission belt 1074 envelopes around the belt wheels 1075 and 1076. As the motor 1049 rotates, the shaft 1045 makes a circular movement around the shaft 1047, which in turn drives the frame 1042 to oscillate around the shaft 1051, resulting in a rotational oscillation in the shaft 1011 and hence in the cooking pan 1010. The motor 1054 is used to position the motor 1049, as to adjust the amplitude of the oscillatory movement of the cooking pan. To achieve an oscillatory movement of fixed amplitude, the motor 1054 must be braked so the motor 1049 would stay still relative to the support frame 1094. The distance between the axes of the shafts 1045 and 1047 can be designed to be properly small. Except the controlled rotation around the sleeve 1012 produced by the motor 1071, the cooking pan as a whole is displayed by a small distance and by a small inclination change. On the other hand, the rotation speed of the motor 1049 can be properly large, as to produce a properly large acceleration in the movement of any point on the internal surface of the cooking pan.

It should be noted that in FIG. 19B, the shaft 1051 is visually positioned between the shaft 1011 and the shaft 1043. However, this is not a requirement.

In the cooking apparatus shown in FIG. 18 or 19A-19B, it is possible but not required for the axis of the shaft 1011 to be a central axis of the cooking pan in a geometric or other sense. It should be noted that we may configure the cooking apparatus 1000B or 1000C so that the mating parts 1011 and 1012 of the first turning pair are not rigidly connected to each other.

Figure 20:
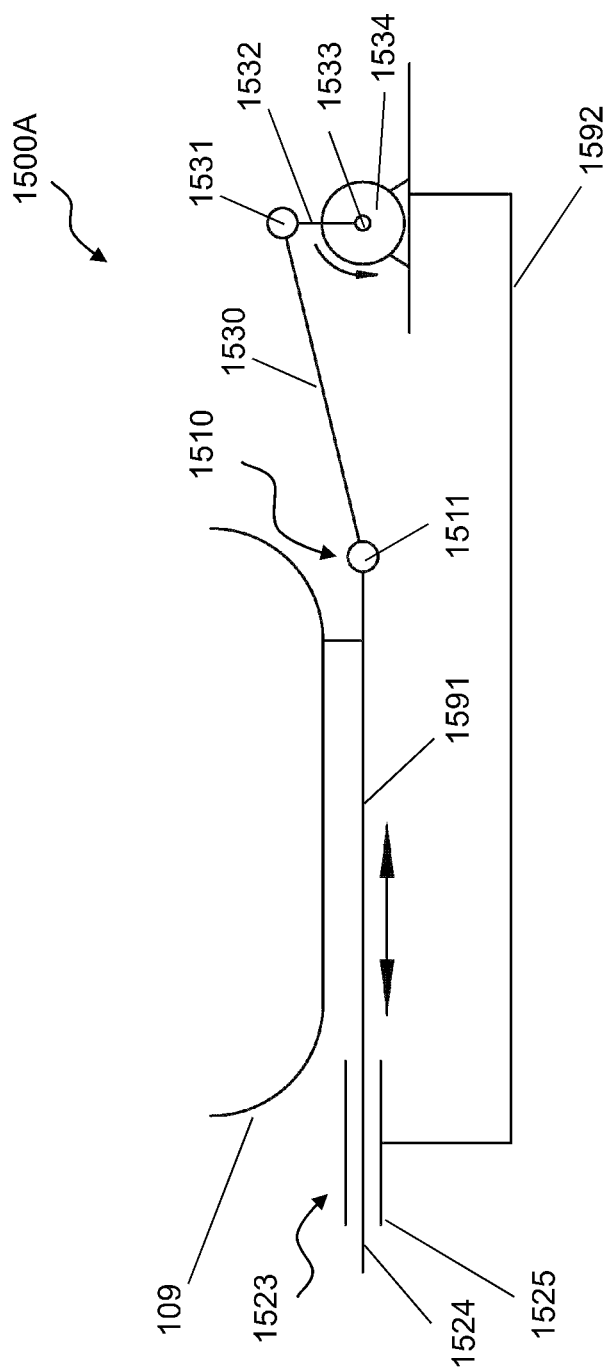
FIG. 20 shows a side view of an automated cooking apparatus that can produce linear oscillations in a cooking pan.

In some embodiments, referring to FIG. 20, a cooking apparatus 1500A includes a holder 1591 carrying a cooking pan 109. A first turning pair 1510 (as a first kinematic pair) with a shaft 1511 and a sleeve has the sleeve connected with the holder. A motion mechanism consists of a first rigid connector 1530 joining the shaft 1511 with a shaft 1531 of another turning pair, a second rigid connector joining the sleeve of the shaft 1531 with the shaft 1533 of a motor 1534. The motor 1534 is mounted on a support frame 1592. The shafts 1511, 1531 and 1533 have parallel axes; and the distance between the axes of the shafts 1531 and 1533 is shorter than the distance between the axes of the shafts 1531 and 1511. A stabilization mechanism consists of a sliding pair 1523 (as a second kinematic pair) with a sliding shaft 1524 and sleeve 1525, where the shaft 1523 is connected with the holder 1591, and the sleeve is rigidly connected with the support frame 1592. The axis of the sliding shaft 1524 is perpendicular to the axes of the shafts 1511, 1531 and 1533. The stabilization mechanism allows the holder 1591 to make a linear movement relative to the support frame 1592. The motor 1533 produces a circular movement in 1531 which oscillates the shaft 1511 together with the holder 1591 and the cooking pan 109. The distance between the axes of the shafts 1531 and 1533 can be designed to be properly small, so that the cooking pan as a whole is displayed by a small distance and by no inclination change. On the other hand, the rotation speed of the motor 1534 can be properly large, as to produce a properly large acceleration in the movement of any point on the internal surface of the cooking pan.

Figure 21:
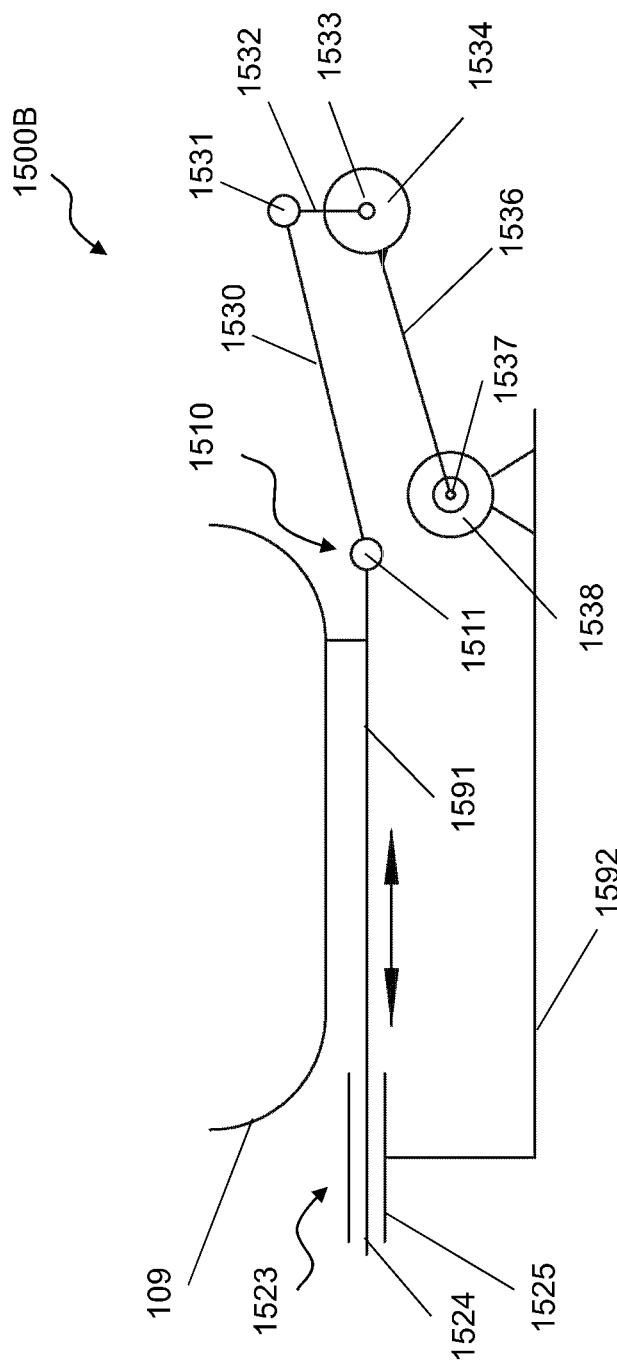
FIG. 21 shows a side view of an automated cooking apparatus that can produce linear oscillations in a cooking pan where amplitude of the oscillations can be adjusted.

In some embodiments, referring to FIG. 21, a cooking apparatus 1500B is built from the cooking apparatus 1500A by further adding an adjustment mechanism. The cooking apparatus 1500B includes a holder 1591 carrying a cooking pan 109. A first turning pair (as a first kinematic pair) 1510 with a shaft 1511 and a sleeve where the sleeve is connected with the holder. A motion mechanism consists of a first rigid connector 1530 joining the shaft 1511 with a shaft 1531 of another turning pair, a second rigid connector joining the sleeve of the shaft 1531 with the shaft 1533 of a motor 1534. A rigid connector 1536 connects the base of the motor 1534 with the shaft 1537 of a second motor 1538; where the motor 1538 is mounted on a support frame 1592. The shafts 1511, 1531, 1533 and 1537 have parallel axes; and the distance between the axes of the shafts 1531 and 1533 is shorter than the distance between the axes of the shafts 1531 and 1511. A computer (not shown in figure) controls both motors 1534 and 1538. The motor 1538 is capable of braking the shaft 1537 when needed. A stabilization mechanism consists of a sliding pair 1523 (as a second kinematic pair) with a sliding shaft 1524 and sleeve 1525, where the shaft 1524 is connected to the holder 1591, and the sleeve is connected with the support frame 1592. The stabilization mechanism allows the holder 1591 to make a linear movement relative to the support frame 1592. The axis of the sliding shaft 1523 is perpendicular to the axes of the shafts 1511, 1531 and 1533. In case the motor 1538 brakes the shaft 1537, a continuous movement of the motor 1534 produces a circular movement in the shaft 1531 which oscillates the shaft 1511 together with the holder 1591 and the cooking pan 109. The motor 1538 is used to adjust the position of the motor 1534 and thus adjust the angle between the axis of the sliding shaft 1524 and the plane (visually a line in FIG. 21) containing the axes of both shafts 1511 and 1533. The latter angle affects the amplitude of the oscillation of the shaft 1511 driven by the motor 1534. Thus, the motor 1538 can change the amplitude of the oscillations. The distance between the axes of the shafts 1531 and 1533 can be designed to be properly small, so that the cooking pan as a whole is displayed by a small distance and by no inclination change. On the other hand, the rotation speed of the motor 1534 can be properly large, as to produce a properly large acceleration in the movement of any point on the internal surface of the cooking pan. It should be noted that we may configure the cooking apparatus 1500A or 1500B so that the mating parts 1511 and 1512 of the first turning pair 1510 are not rigidly connected to each other.

Figure 22:
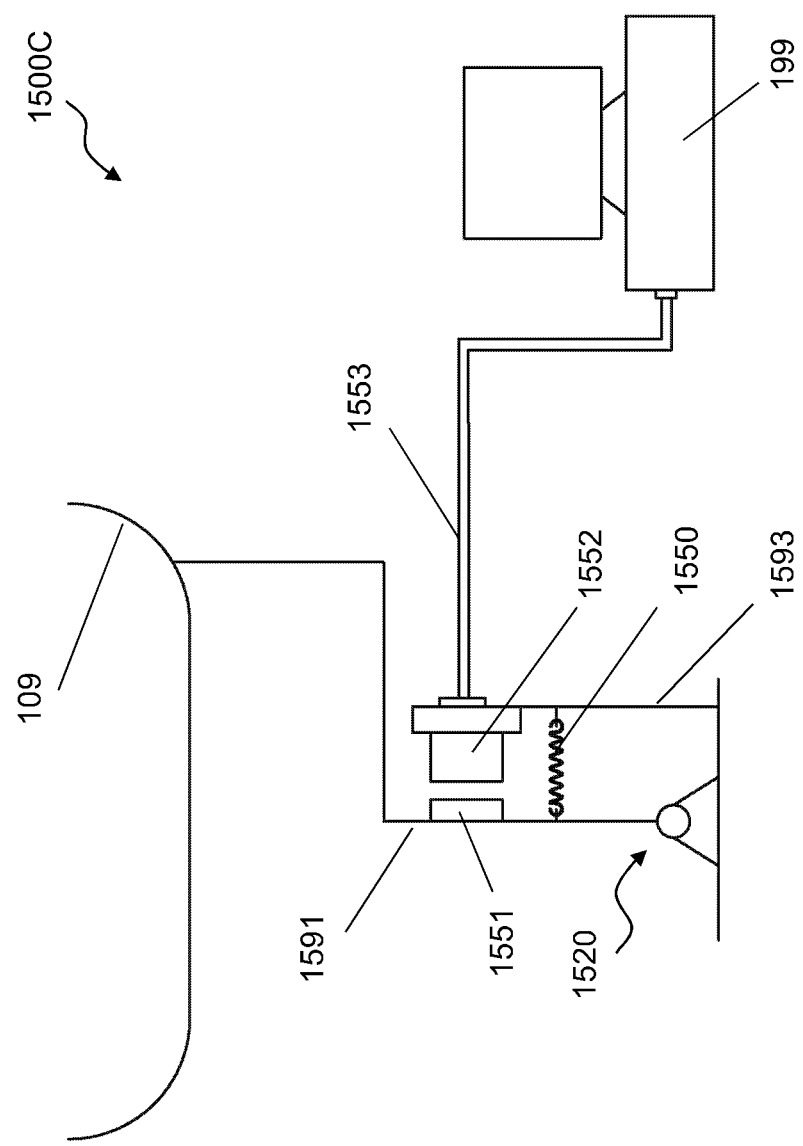
FIG. 22 shows a side view of an automated cooking apparatus that can produce rotational oscillations in a cooking pan.

In some embodiments, referring to FIG. 22, a cooking apparatus 1500C includes a holder 1591 carrying a cooking pan 109. A stabilization mechanism consists of a turning pair (as a second kinematic pair) 1520 with a shaft and a sleeve, wherein the shaft is rigidly connected with the holder 1591 and the sleeve is rigidly connected with a support frame 1593. The stabilization mechanism constrains the holder 1591 to rotate around the turning pair 1520. A motion mechanism consists of a spring 1550 joining the holder 1591 with the support frame 1593, an iron plate 1551 mounted on the holder 1591, and an electric magnet with a built-in driver 1552 mounted on the support frame 1993. The electric magnet 1552 applies a cyclic magnetic force on the iron plate 1551 to produce an oscillation in the iron plate. A computer 199 controls the driver of the electric magnet through a connector 1553 so that the magnitudes and frequencies of the oscillation can be adjusted. The magnitudes of the oscillation of the electric magnet 1552 can be properly small, so that the cooking pan as a whole is displayed by a properly small distance and by a small inclination change. The frequency of the oscillation can be properly large, as to produce a properly large acceleration in the movement of the internal surface of the cooking pan.

Figure 23A:
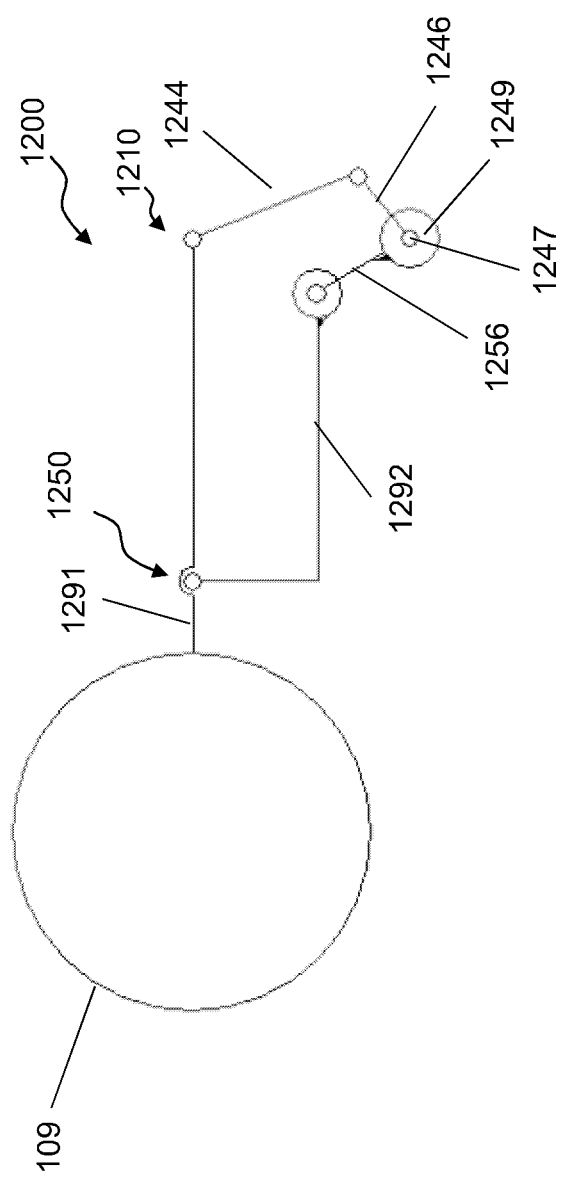
FIGS. 23A-23B respectively show top and side views of an automated cooking apparatus that can produce rotational oscillations in a cooking pan where amplitude of the oscillations can be adjusted.
Figure 23B:
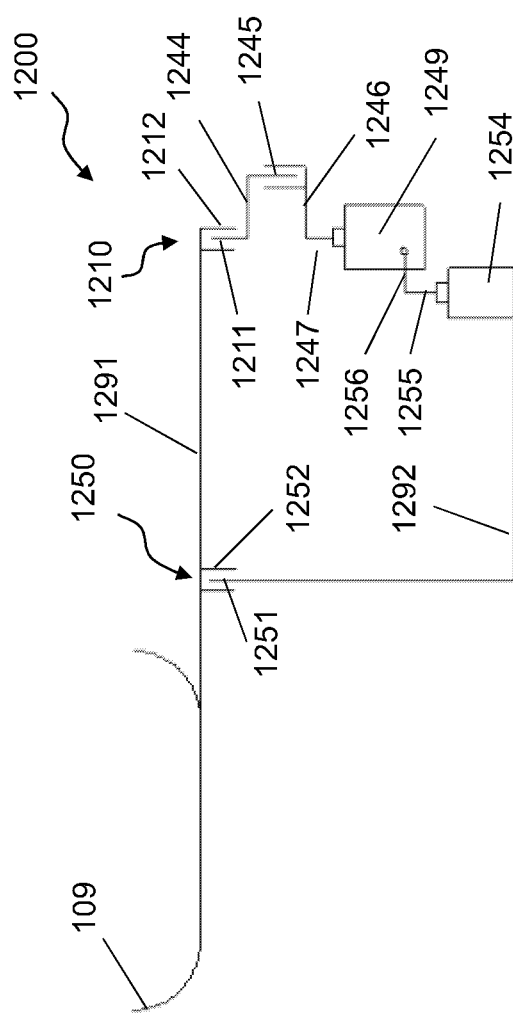

In some embodiments, referring to FIGS. 23A-23B, an automated cooking apparatus 1200 includes a holder 1291 which carries a cooking pan 109. A stabilization mechanism consists of a turning pair 1250 (as a second kinematic pair) with a shaft 1251 and a sleeve 1252, where the sleeve 1252 is connected to the holder 1291, and the shaft 1251 is connected with a support frame 1292. A first turning pair 1210 (as a first kinematic pair) consists of a shaft 1211 and a sleeve 1212 as mating parts. The sleeve 1212 is connected to the holder 1291. A motion mechanism consists of a first rigid connector 1244 connecting the shaft 1211 with a shaft 1245 in another turning pair, a second rigid connector 1246 connecting the sleeve of the shaft 1245 to the shaft 1247 of a motor 1249, a third rigid connector 1256 connecting the frame of the motor 1249 to the shaft 1255 of a second motor 1254. The motor 1254 is mounted on the support frame 1292. The motor 1254 can rotate the shaft 1255 and is also capable of braking the shaft 1255. All shafts 1251, 1211, 1245, 1247 and 1255 have substantially parallel axes, and the distance between the axes of the shafts 1245 and 1247 is shorter than the distance between the axes of the shafts 1245 and 1211. As the motor 1249 rotates, the shaft 1245 makes a circular movement around the shaft 1247; which in turn drives the holder 1291 to rotate back and forth around the shaft 1251, resulting in a rotational oscillation in the cooking pan 109. The motor 1254 is used to position the motor 1249, as to adjust the amplitude of the oscillatory movement produced by the motor 1249. To achieve an oscillatory movement of constant amplitude, the shaft 1255 must be applied a brake so the motor 1249 would stay still relative to the support frame 1292. The distance between the axes of the shafts 1245 and 1247 can be designed to be properly small, so that the cooking pan as a whole is displayed by a small distance and by a small inclination change during the movement. On the other hand, the rotation speed of the motor 1249 can be properly large, as to produce a properly large acceleration in the movement of any point on the internal surface of the cooking pan. It should be noted that we may configure the cooking apparatus 1200 so that the mating parts 1211 and 1212 of the first turning pair are not rigidly connected to each other.

In some embodiments, referring to FIGS. 24A-24B, a cooking apparatus 1100 includes a holder 1191 consisting of two heat insulating plates attached to a cooking pan 108. Two shafts 1111 of two first turning pairs (as first kinematic pairs) are aligned along a same axis. The shafts 1111 are rigidly connected to the holder 1191. A frame 1194 rigidly joins the sleeves of the shafts 1111 and the shafts 1121 of two turning pairs. The shafts 1121 have a same axis. The sleeves of the shafts 1121 are rigidly connected with a support frame 1192. An oscillation mechanism mounted on the frame 1194 may produce a rotational oscillation of the shafts 1111 around their axis, and another oscillation mechanism mounted on the support frame 1192 may produce a rotational oscillation of the shafts 1121 around their axis. The oscillations mechanisms can be powered by a pair of electric motors that are driven by drivers or controllers that produce some oscillatory electric currents for the motors, or by a pair of hydraulic, pneumatic, magnetic or other oscillators or vibrators (not shown in figure), and a computer (not shown in figure) can be used to control the magnitudes and frequencies of the oscillators. The magnitudes of the oscillations produced by both oscillation mechanisms can be designed to be properly small, so that the cooking pan as a whole is displayed by a small distance and by a small inclination change during the oscillatory movements. On the other hand, the frequencies of the oscillations can be properly large, as to produce properly fast accelerations in the internal surface of the cooking pan. It should be noted that in the special case when the shafts 1111 and 1121 intersect at a point, the cooking pan makes spherical movements. It should be noted that we may configure the cooking apparatus 1100 so that the mating parts 1111 and 1112 of each first turning pair are not rigidly connected to each other.

Figure 25A:
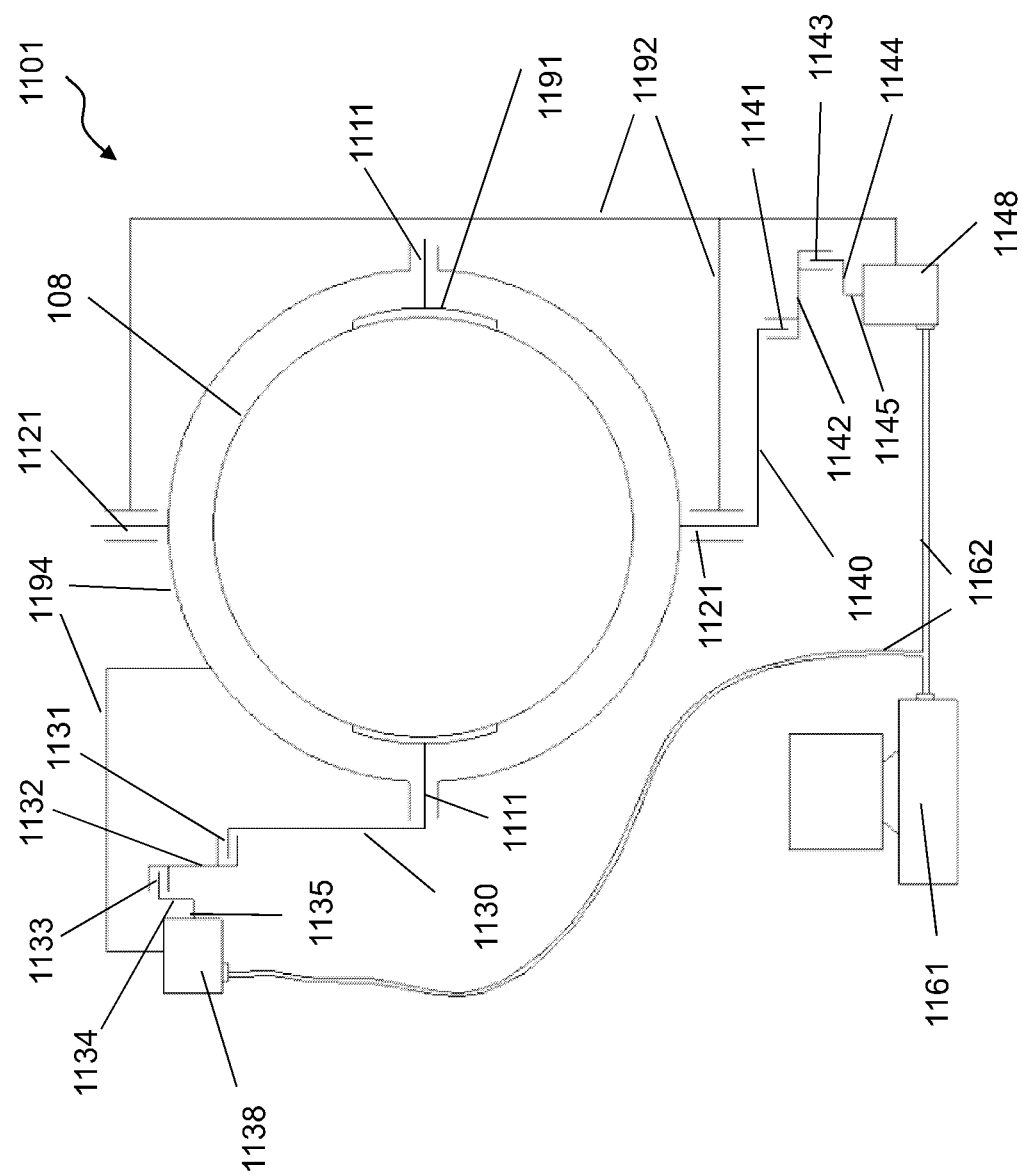
FIGS. 25A-25B respectively show top and aerial views of another automated cooking apparatus that can move the cooking pan by a composition of two oscillations.
Figure 25B:
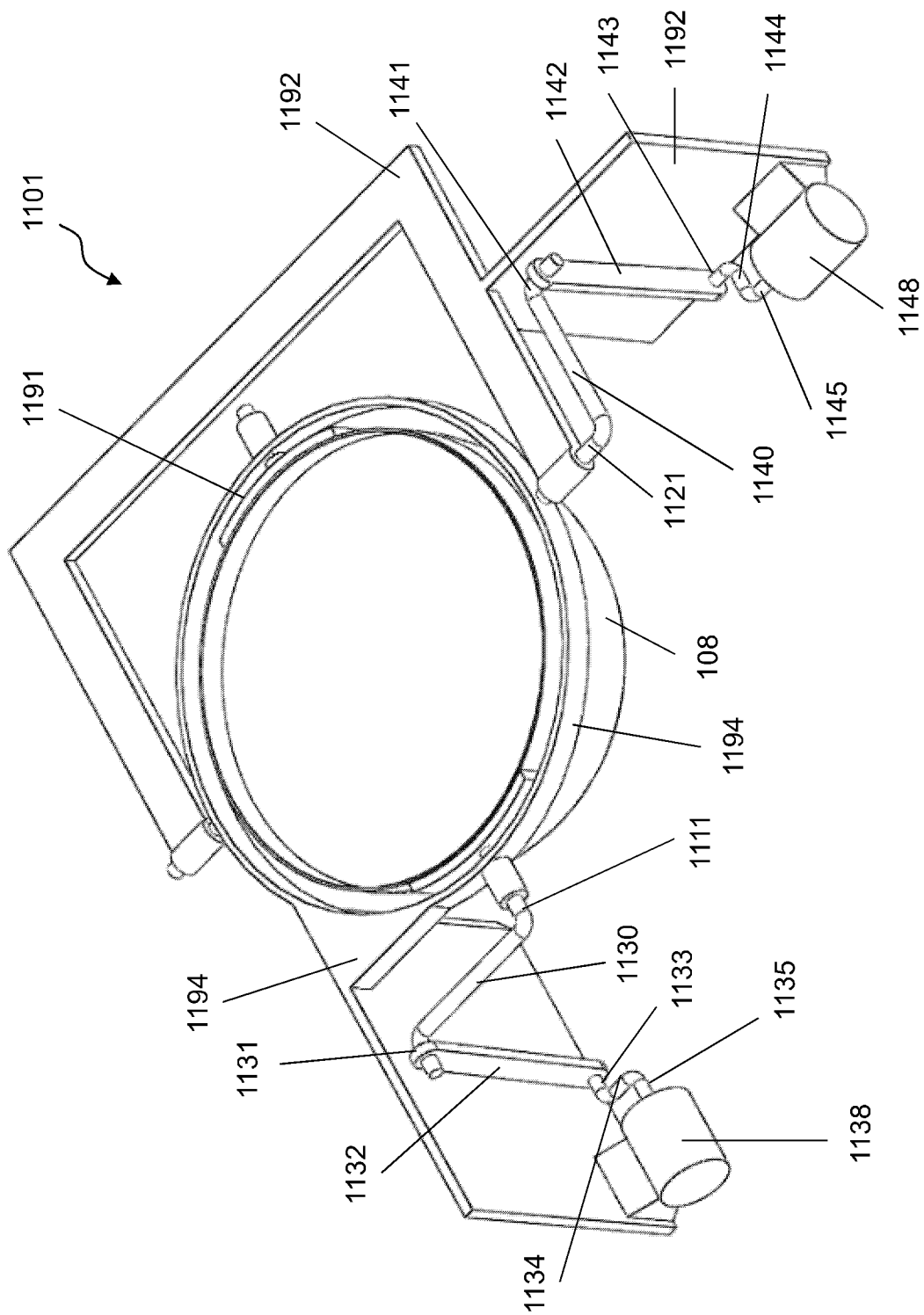

In some embodiments, FIGS. 25A-25B show a cooking apparatus 1101 that is built from the apparatus 1100 in FIGS. 24A-24B by further adding two crank-and-slider mechanisms as follows. One of the shafts 1111 is connected to a shaft 1131 of a turning pair through a first rigid connector 1130. A second rigid connector 1132 connects the sleeve of the shaft 1131 with the sleeve of a shaft 1133 in another turning pair. A third rigid connector 1134 joins the shaft 1133 with the shaft 1135 of a motor 1138. The motor 1138 is mounted on the frame 1194. The shafts 1111, 1131, 1133 and 1135 have parallel axes and the distance between the axes of the shafts 1133 and 1135 is shorter than the distance between the axes of the shafts 1133 and 1131. The continuous rotation by the motor 1138 results in a back-and-forth movement of the shaft 1131 around the shaft 1111, thus oscillating the cooking pan relative to the frame 1194. Similarly, a fourth rigid connector 1140 connects one of the shafts 1121 and another shaft 1141 of a turning pair. A fifth rigid connector 1142 connects the sleeve of the shaft 1141 with the sleeve of a shaft 1143 of another turning pair. A sixth rigid connector 1144 connects the shaft 1143 with the shaft 1145 of a motor 1148. The motor 1148 is mounted on the support frame 1192. The shafts 1121, 1141, 1143 and 1145 have parallel axes, and the distance between the axes of the shafts 1143 and 1145 is shorter than the distance between the shafts 1143 and 1141. The circular movement of the shaft 1143 around the shaft 1145 translates into a back-and-forth rotation of the shaft 1141 around the shaft 1121, thus oscillating the frame 1194 around the shaft 1121. A computer may control the motors 1138 and 1148. When both motors make continuous rotations, the cooking pan is moved by a composition of two rotational oscillations. The distance between the axes of the shafts 1133 and 1135 and the distance between the axes of the shafts 1143 and 1145 can both be designed to be properly small, so that the cooking pan as a whole is displayed by a small distance and by a small inclination change in the composition of oscillatory movements. On the other hand, the rotation speed of the motors 1138 and 1148 can be properly large, as to produce a properly large acceleration in the movement of any point on the internal surface of the cooking pan.

It should be noted that a motion mechanism in apparatus 1101 consists of: the turning pairs with shafts 1121, the frame 1194 which connects the sleeve of 1111 in the first turning pairs to the shafts 1121, the turning pairs with shafts 1141 and 1143, the rigid connectors 1140, 1142 and 1144, and the motor 1148 with the shaft 1145. The motion mechanism moves the sleeve of the first turning pair 1110 in a rotational oscillation. A powered mechanism consists of: the turning pairs with shafts 1131 and 1133, the connectors 1130, 1132 and 1134, and the motor 1138 with the shaft 1135. The powered mechanism produces a relative oscillatory movement between the shaft 1111 and the sleeves 1112 of the first turning pairs.

Figure 26:
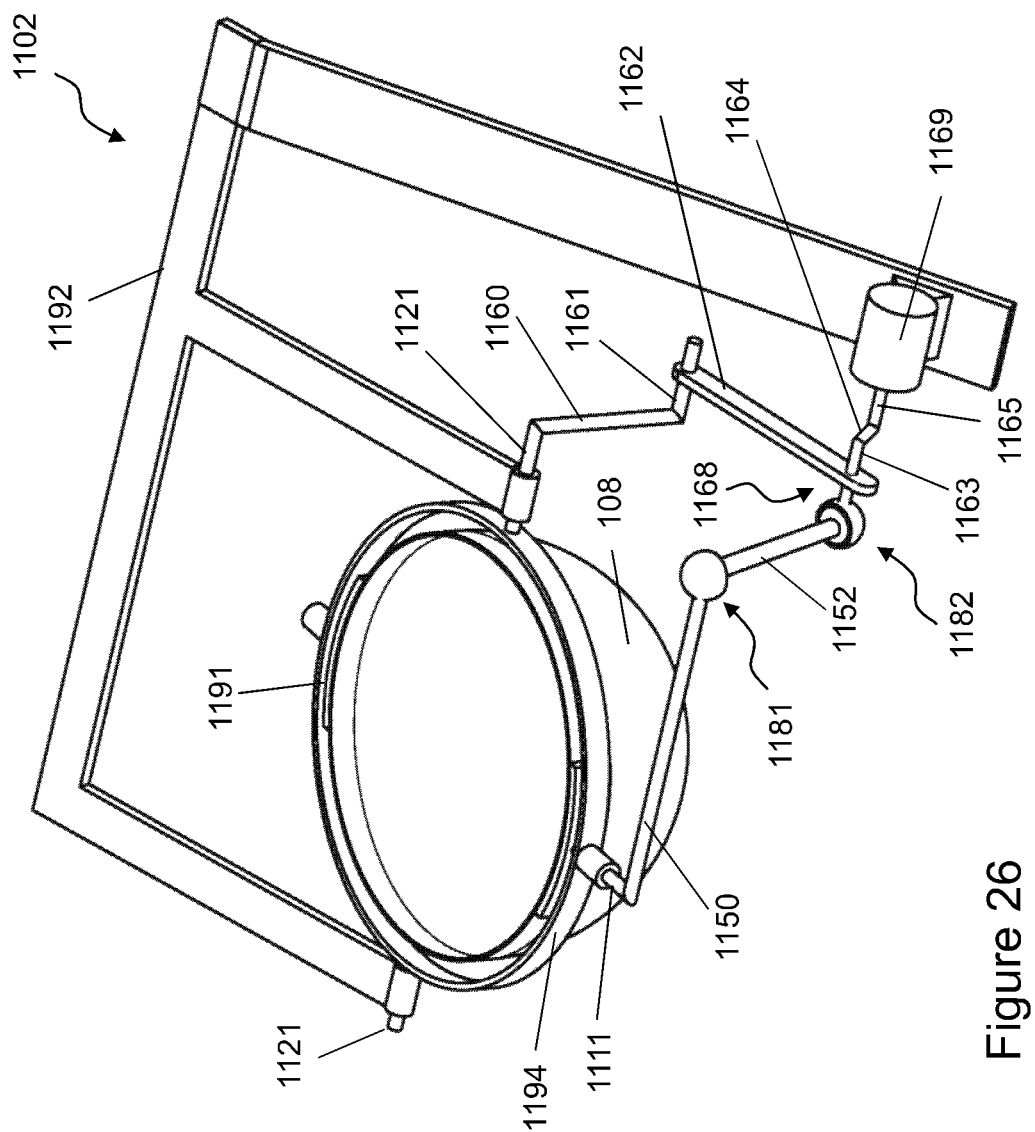
FIG. 26 shows an aerial view of an automated cooking apparatus of another automated cooking apparatus that can move the cooking pan by a composition of two oscillations; where the two oscillation mechanisms are mechanically linked.

In some embodiments, FIG. 26 shows a cooking apparatus 1102 that is built from the apparatus 1100 in FIGS. 24A-24B by adding two crank-and-slider mechanisms that are mechanically linked and driven by a same motor. In addition to the exposition in FIGS. 24A-24B, a rigid connector 1150 connects a shaft 1111 to a first mating part of a universal joint 1181. A second rigid connector 1152 connects the second mating part of the universal joint 1181 with a first mating part of another universal joint 1182. The second mating part of the universal joint 1182 is rigidly joined with a shaft 1163 of a turning pair 1168. The center of the universal shaft 1182 is on the axis of the shaft 1163. A third rigid connector 1164 connects the shaft 1163 to the shaft 1165 of a motor 1169. The motor 1169 is mounted on the support frame 1192. Similarly, a fourth rigid connector 1160 connects a shaft 1121 and a shaft 1161 of a turning pair. A fifth rigid connector 1162 connects the sleeve of the shaft 1161 with the sleeve of the shaft 1163 in the turning pair 1168. The shafts 1121, 1161, 1163 and 1165 have parallel axes, and the distance between the axes of the shafts 1163 and 1165 is shorter than either the distance between the centers of the universal joints 1181 and 1182 or the distance between the axes of the shafts 1163 and 1161. A computer may control the motor 1169. The motor 1169 can produce a circular movement in the shaft 1163, causing both the shafts 1150 and 1160 to respectively oscillate around the shafts 1111 and 1121. The cooking pan is thus moved by a composition of two rotational oscillations. The distance between the axes of the shafts 1163 and 1165 can be designed to be properly small, so that the cooking pan as a whole is displayed by a small distance and by a small inclination change in the oscillatory movements. On the other hand, the rotation speed of the motors 1169 can be properly large, as to produce a properly large acceleration in the movement of any point on the internal surface of the cooking pan.

Figure 27:
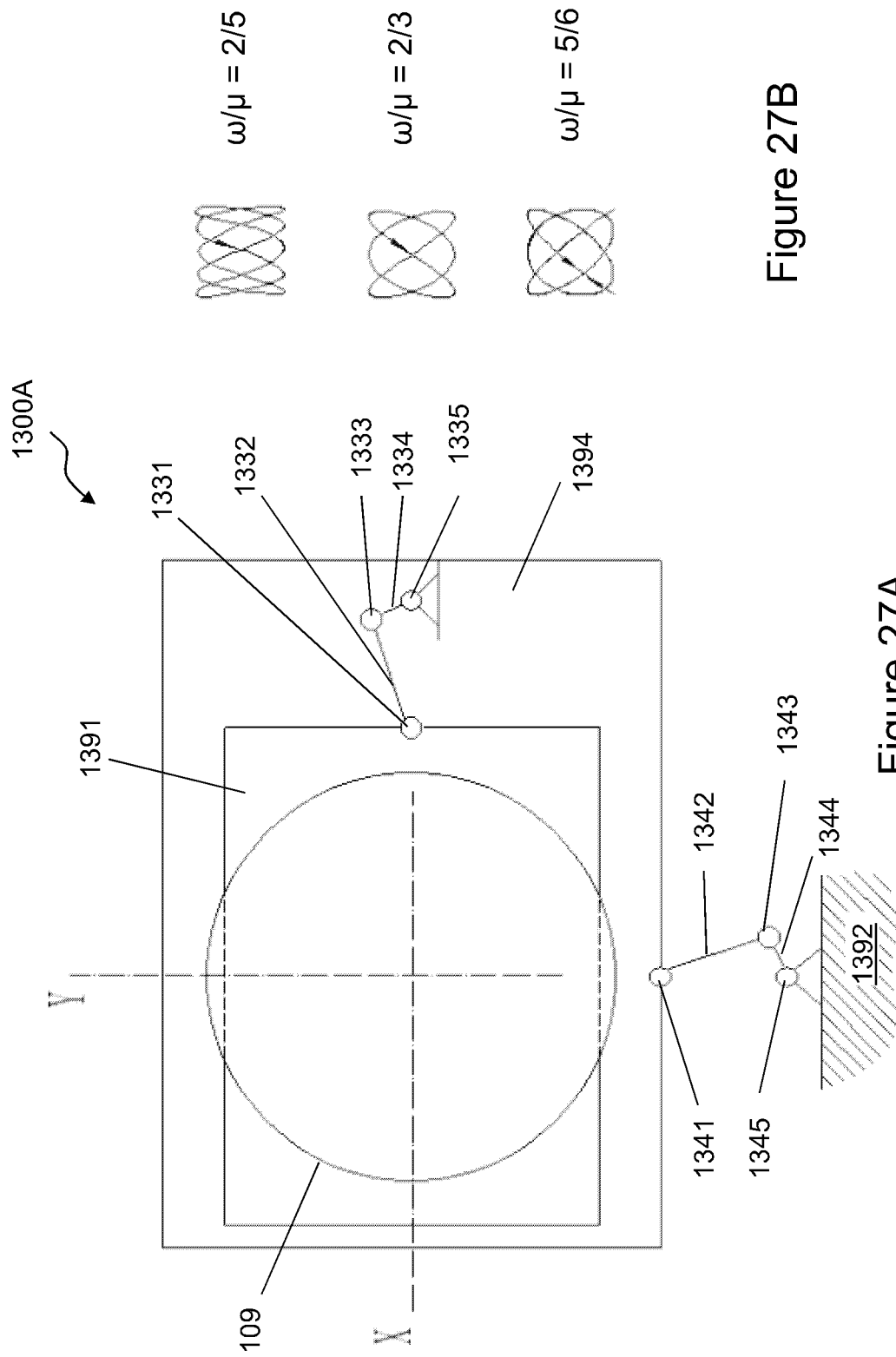
FIG. 27A shows a top view of an automated cooking apparatus that can produce a composition of two linear oscillations along X and Y axes in a cooking pan.
FIG. 27B shows exemplified movement paths for the cooking pan produced by the automated cooking apparatus in FIG. 27A.

Referring to FIG. 27A, an automated cooking apparatus 1300A includes a cooking pan 109 mounted on a holder 1391, which can slide on a frame 1394 along the X-axis via a sliding pair (as a first kinematic pair, not shown in figure) with two mating parts respectively connected to the holder 1191 and the frame 1394. The frame 1394 can slide on a support frame 1392 along Y-axis via another sliding pair. A turning pair has a shaft 1331 and a sleeve as mating part, with the sleeve rigidly connected to the holder 1991. A first crank-and-slider mechanism (a powered mechanism) is composed of a first rigid connector 1332 connecting the shaft 1331 and a shaft 1333 of another turning pair; and a second rigid connector 1334 connecting the sleeve of the shaft 1333 and the shaft 1335 of a first motor (not shown in figure) that is mounted on the frame 1394. In some implementations, the axes of the shafts 1331, 1333 and 1335 can be all parallel, and perpendicular to the X axis. The distance between the axes of the shafts 1333 and 1335 is shorter than the distance between the shafts 1333 and 1331. The rotation of the shaft 1335 by the first motor produces a circular movement of the shaft 1333 and hence a linear oscillation of the holder 1391 relative to the frame 1394, along the X-axis. A second crank-and-slider mechanism (a motion mechanism) is composed of a shaft 1341 of a turning pair whose sleeve is rigidly joined with the frame 1394; a rigid connector 1342 connecting the shaft 1341 and a shaft 1343 in another turning pair; and another rigid connector 1344 connecting the sleeve of the shaft 1343 and the shaft 1345 of a second motor (not shown in figure) that is mounted on the support frame 1392. The axes of the shafts 1341, 1343 and 1345 are all parallel, and perpendicular to the Y axis.

The distance between the axes of the shafts 1343 and 1345 is shorter than the distance between the shafts 1343 and 1341. The continuous rotation of the shaft 1345 by the second motor (in the motion mechanism) produces a circular movement of the shaft 1343 and hence a linear oscillation of the frame 1394 relative to the support frame 1392, along the Y-axis. Thus, the cooking pan is moved by a composition of two oscillations, respectively along the X and Y axes. It is also possible to mechanically link the rotations of both crank-and-slider mechanisms so they are driven by a same motor. The distance between the axes of the shafts 1333 and 1335 and the distance between the axes of the shafts 1343 and 1345 can both be designed to be properly small, so that the cooking pan as a whole is displayed by a small distance and by a small inclination change in the movement produced by the two oscillation mechanisms. On the other hand, the speeds of the above two motors can be properly large, as to produce a properly large acceleration in the movement of any point on the internal surface of the cooking pan.

The movement paths of a point on the cooking pan 1309 in the automated cooking apparatus 1300A relative to the support frame 1392 can be represented by the following equations: $X=A \cos(\omega t+n)+a$; $Y=B \sin(\mu t+\delta)+b$; where A is the distance between the axis of 1333 and the axis of 1335; and B is the distance between the axis of 1343 and the axis of 1345; $\omega$ and $\mu$ are respectively the frequencies of the rotation of shafts 1334 and 1344 around their sleeves. The frequencies $\omega$ and $\mu$ can be the same or different from each other. A computer (not shown in figure) may be configured to control the speeds of rotations of the motors and hence the frequencies ($\omega$, $\mu$) in the oscillatory movements along the X and the Y directions according to th the cooking needs. In the special case when the initial phases at time t=0 are both zero, then the initial displacements of X and Y are respectively A+a and b. Examples of such movement paths are displayed in FIG. 27B. Furthermore, if the ratio of the frequencies $\omega$ to $\mu$ can be represented by a constant fraction, the two-dimensional patterns for the movement path are referred to as Lissajous patterns (or Lissajous orbits, or Lissajous curves). It should be noted however that the presently disclosed automated cooking apparatus is not limited to a rational number for the ratio of the frequencies ($\omega$, $\mu$). Lissajous patterns include familiar patterns such as circles (A=B and $\omega=\mu$), ecliptics ($\omega=\mu$; A≠B).

The crank- and slider mechanisms in FIG. 27A may be replaced by other oscillation mechanisms, such as magnetic, hydraulic or pneumatic oscillators. It should be noted that we may configure the cooking apparatus 1300A so that the mating parts of the first kinematic (sliding) pair are not rigidly connected to each other.

Figure 28:
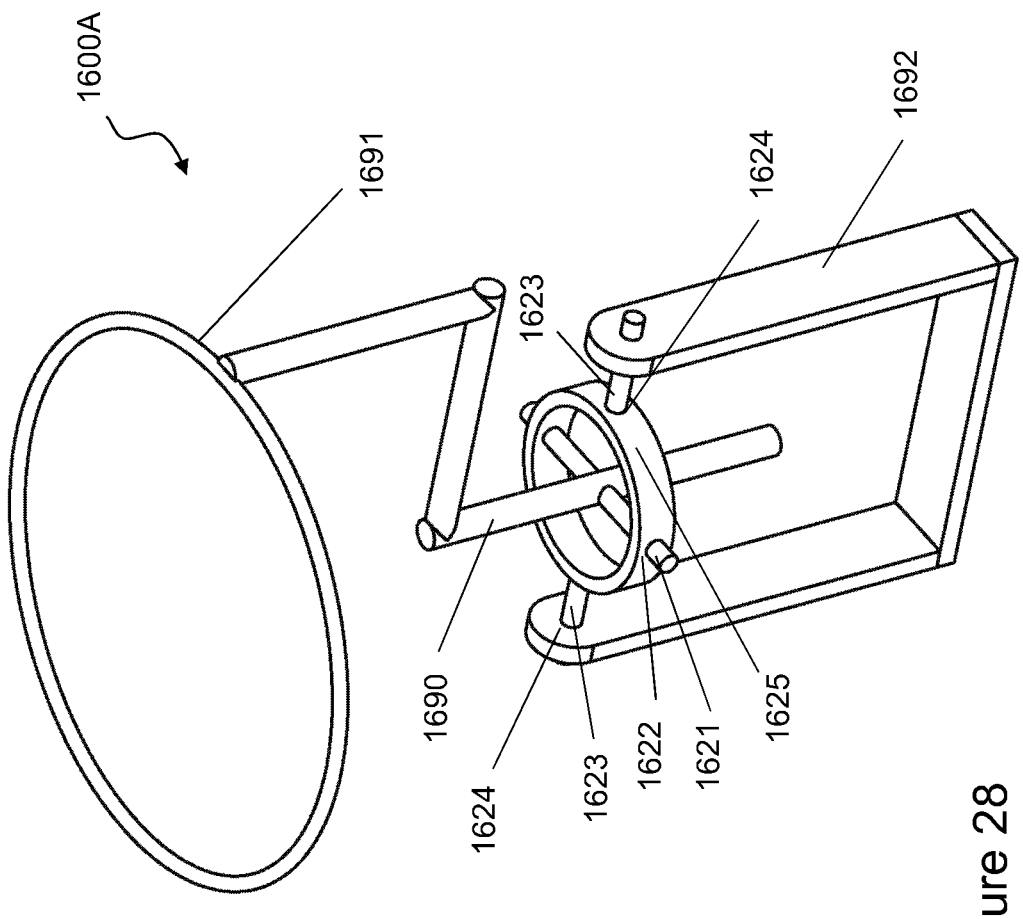
FIG. 28 shows an aerial view of a cooking apparatus 1600A with a stabilization mechanism which limits a cooking pan's movement.

In some embodiments, referring to FIG. 28, an automated cooking apparatus 1600A includes a holder 1691 carrying a cooking pan (not in figure) and a stabilization mechanism as follows. A shaft 1621 is rigidly joined with a shaft 1690 that is rigidly joined with the holder 1691. Two sections of the shaft 1621 are in two sleeves 1622, so the shaft 1621 and each of the two sleeves are mating parts of a turning pair (a second kinematic pair). A ring-shaped connector 1625 connects the sleeves 1622 with the two shafts 1623 of two turning pairs (third kinematic pairs). The shafts 1623 have a same axis. The sleeves 1624 of the shafts 1623 are rigidly joined with a support frame 1692. The shaft 1690 or alternatively the holder 1691 may be moved by a motion mechanism (not shown in figure).

Figure 29:
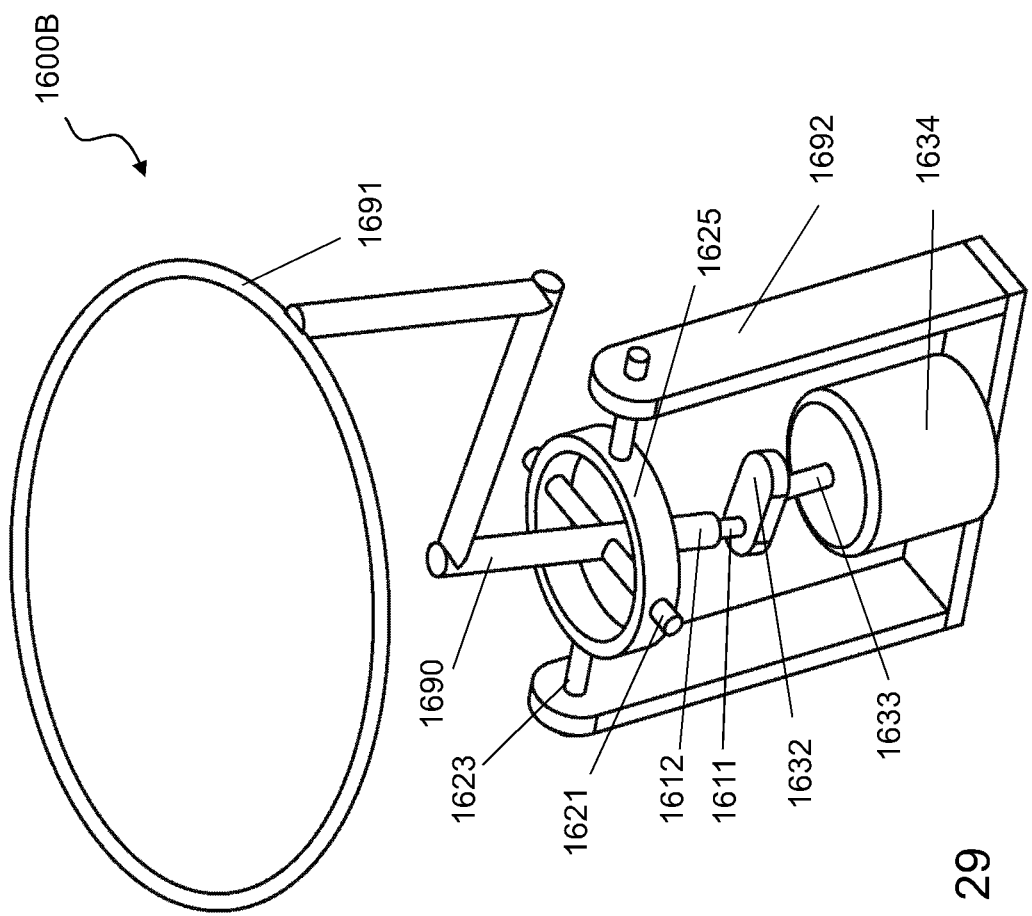
FIG. 29 shows an implementation of a cooking apparatus 1600B that can make a cyclic movement in a cooking pan.

In some embodiments, referring to FIG. 29, an automated cooking apparatus 1600B is built from the apparatus 1600A in FIG. 28, by further adding a motion mechanism as follows. The bottom part of the shaft 1690 is rigidly joined by the sleeve 1612 of a shaft 1611 in a turning pair. A connector 1632 rigidly connects the shaft 1611 with the shaft 1633 of a motor 1634. The motor 1634 is mounted on the support frame 1692. The shafts 1621, 1623, 1611 and 1633 are designed to intersect at a point. As the motor continuously rotate, the holder and the cooking pan can make a circular movement with constrained self-rotation. The angle between the axes of the shafts 1611 and 1633 can be designed to be properly small, so that the cooking pan as a whole is displayed by a small distance and by a small inclination change in the oscillatory movements. On the other hand, the rotation speed of the motors 1634 can be properly large, as to produce a properly large acceleration in the movement of any point on the internal surface of the cooking pan.

It should be noted that the mechanism 501 in FIG. 10C may be modified to adjust the amplitude (angle) of the circular movement.

Figure 30:
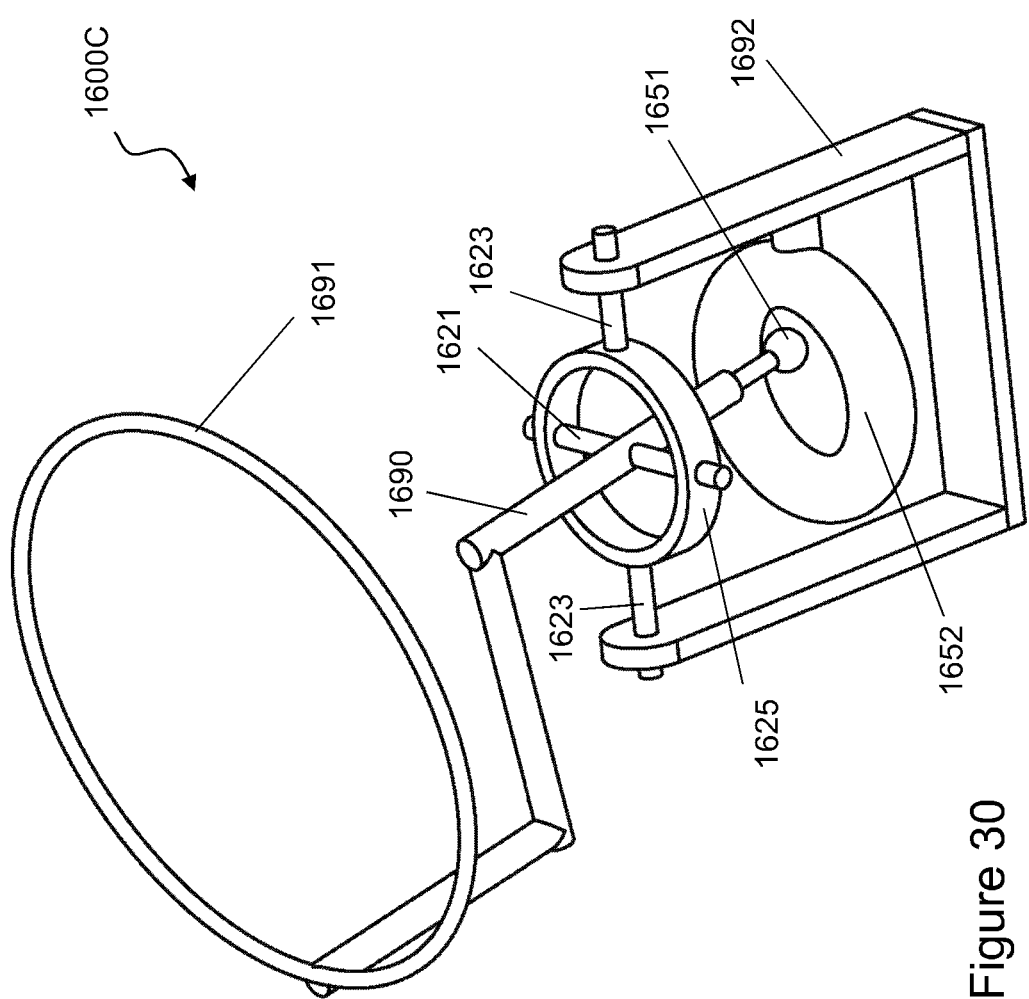
FIG. 30 shows an implementation of a cooking apparatus 1600C in which a controlled magnetic field can move a cooking pan.

In some embodiments, referring to FIG. 30, an automated cooking apparatus 1600C is built from the apparatus 1600A in FIG. 28, by further adding a motion mechanism as follows. A magnet 1651 is fixedly attached to the bottom end of the shaft 1690. A magnetic field generator 1652 is mounted on the support frame 1692 to drive the movement of the magnet. A computer (not in figure) controls the magnetic field generator 1652. As the magnetic field generated by the generator 1652 changes, the magnet 1651 is induced to move, thus moving the shaft 1690, the holder 1691 and the cooking pan together with it. The magnitudes of the movement of the magnet 1651 by the magnetic field generator 1652 can be designed to be properly small, so that the cooking pan as a whole is displayed by a small distance and by a small inclination change in the oscillatory movements. On the other hand, the speed of the movement of the magnet 1651 can be designed to be properly large, as to produce a properly large acceleration in the movement of any point on the internal surface of the cooking pan.

It should be noted that the magnet 1651 in apparatus 1600C may be substituted by an object or device that can be moved by a magnetic field. In particular, 1651 may be substituted by a second magnetic field generator. On the other hand, the pair 1651 and 1652 may be reversed, with the magnet 1651 joined with the support frame 1692, and the magnetic field generator 1652 joined with the shaft 1690.

It should also be noted that the magnetic field generator 1652 may consist of two or more wired electric magnets driven by separate magnetic drivers. Different magnetic drivers can produce cyclically changing magnetic fields in different electric magnets, with different directions and magnitudes, and different frequencies. A computer or other adjustment mechanism connected to the drivers may be used to dynamically adjust the directions, magnitudes and frequencies of the magnetic fields.

Figure 31:
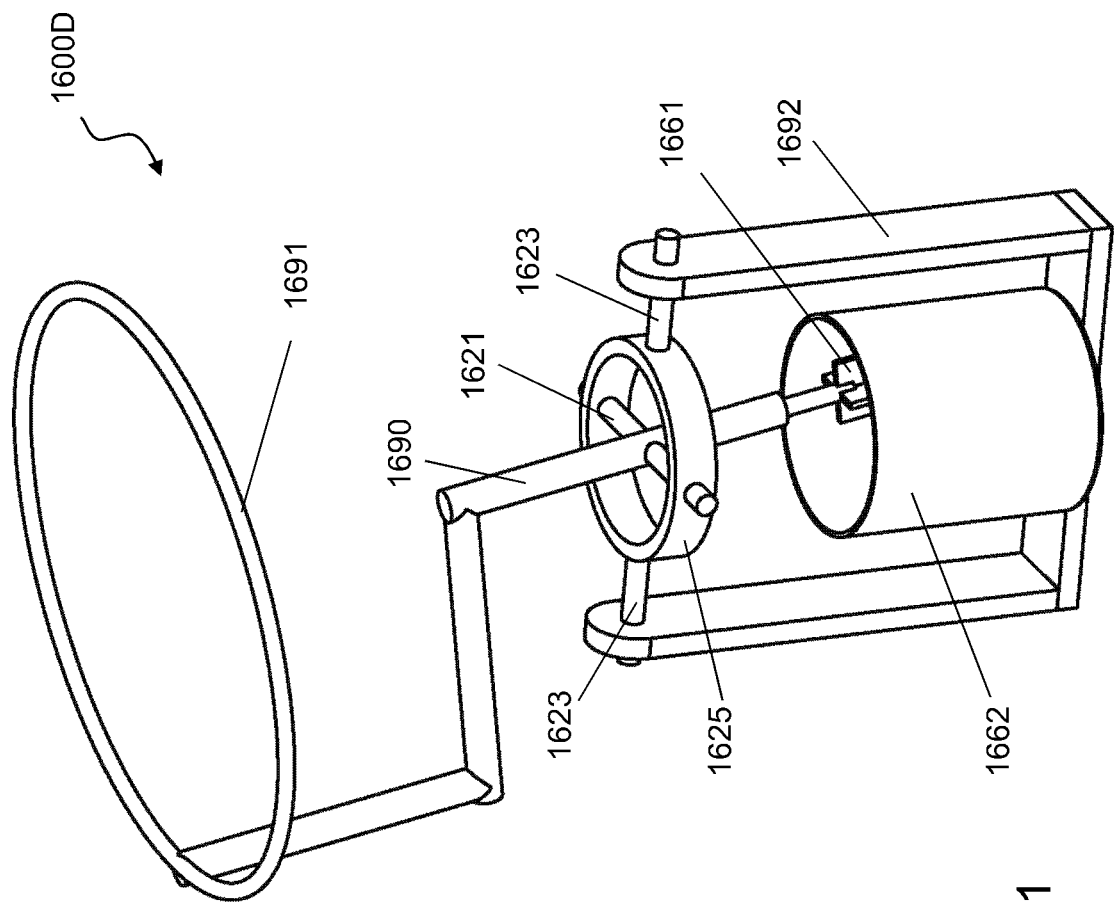
FIG. 31 shows an implementation of a cooking apparatus 1600D in which a controlled fluid flow can move a cooking pan.

In some embodiments, referring to FIG. 31, an automated cooking apparatus 1600D is built from the apparatus 1600A in FIG. 28, by further adding a motion mechanism as follows. A pedal 1661 is fixedly attached to the bottom end of the shaft 1690 and is immersed in a liquid in a container 1662. A mechanism (not shown in figure) produces a flow in the fluid, and thus moves the pedal 1661, the shaft 1690 and the holder 1691. The magnitudes of the movement of the pedal 1661 by the fluid flow can be designed to be properly small, so that the cooking pan as a whole is displayed by a small distance and by a small inclination change in the oscillatory movements. On the other hand, the speed of the movement of the pedal 1661 can be designed to be properly large, as to produce a properly large acceleration in the movement of any point on the internal surface of the cooking pan.

It should be noted that the mechanism producing a flow in the fluid may consist two or more sources of fluid flow. Examples of such a source includes: a rotating pedal immersed in the fluid and driven by a motor, or a mechanism that places cyclically changing pressures at a location in the fluid, or a cyclic blower of gas into the fluid, etc. Different controllers may be used to control the sources so the sources together can produce a combination of cyclic flows of different directions and magnitudes, and different frequencies in the fluid. A computer or other adjustment mechanism together with the controllers may be used to dynamically adjust the directions, magnitudes and frequencies in the sources of the fluid flows.

It should be noted that the pedal 1661 can also be moved by gas flow or other non-contact forces through a medium. In some implementations, the liquid container or gas chamber 1662 may be designed to have a cylindrical shape as to move the pedal in circular movement. A computer may be used to control the mechanisms or the sources that produce the fluid or gas flows.

Figures 32A, 32B:
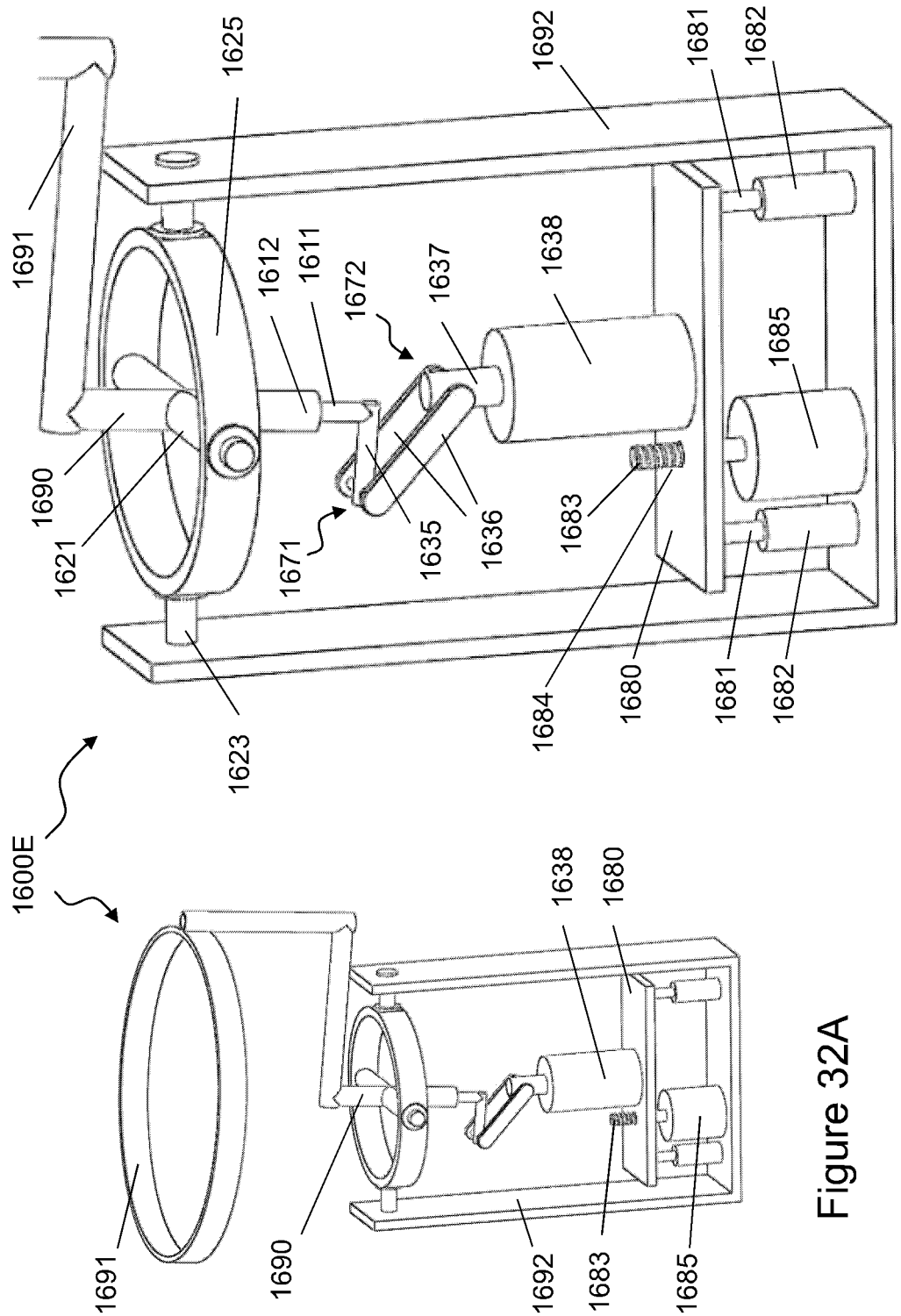
FIG. 32A shows an aerial view of an automated cooking apparatus that can make a circular movement in a cooking pan where the amplitude of the circular movement can be adjusted.
FIG. 32B displays details of a part of the cooking apparatus in FIG. 32A.

In some embodiments, referring to FIGS. 32A-32B, an automated cooking apparatus 1600E is built from the apparatus 1600A in FIG. 28, by further adding a motion mechanism as follows. A hinge joint with a shaft 1611 has a sleeve 1612 that is rigidly joined with the bottom part of the shaft 1690. Another shaft 1635 is rigidly joined with the shaft 1611. As in the figure, the axes of the shafts 1635 and 1611 may make an angle, but this is not a requirement. The other end of the shaft 1635 is joined to some ends of two rigid connectors 1636 by a hinge joint 1671 consisting of a shaft rigidly joined to the connectors 1636 and a sleeve rigidly joined to the shaft 1635. The other ends of the rigid connectors 1636 are rigidly joined to the shaft of a hinge joint 1672 whose sleeve is rigidly joined to the shaft 1637 of a motor 1638. The motor 1638 is mounted on a frame 1680. The axes of the shafts 1611, 1621, 1623 and 1637 are designed to meet at a point. The axes of the shafts 1611, 1635 and 1637 are designed to be coplanar, and the axes of the hinge joints 1671 and 1672 are designed to be perpendicular to the plane containing the axes of the shafts 1611, 1635 and 1637. As the motor 1638 rotates, the connectors 1636 and the shafts 1635 and 1611 make a circular movement around the axis of the shaft 1637, thus moving the shaft 1690 and the holder 1691 in a circular movement. On the other hand, the frame 1680 is connected to the support frame 1692 via some sliding pairs consisting of sliding shafts 1681 and sleeves 1682 where the sliding shafts 1681 are rigidly joined with the frame 1680 and the sleeves 1682 are rigidly joined with the support frame 1692. A two-way motor 1685 mounted on the support frame 1692 drives a helical-screw 1683 whose sleeve 1684 is rigidly joined with the frame 1680. The axes of the motors 1685, 1638 and the axes of the sliding shafts 1681 are parallel to each other. As the motor 1685 rotates the helical-screw 1683, the sleeve 1684, the frame 1680, the motor 1638 make a linear movement in a direction parallel to the axis of the shaft 1637 (or equivalently, the axes of the shafts 1681). This moves the shaft 1637 and the hinge joint 1672 along a direction parallel to the axis of the shaft 1637, and thus adjusts the angle between the axes of the shafts 1611 and 1637 via the connectors 1636 and the hinge joint 1671. The latter angle determines the amplitude of the circular movement of the shaft 1611, and hence that of the circular movements of the shaft 1690 and the holder 1691 produced by the motor 1638. In particular, the amplitude of the circular movement of the holder 1691 can be adjusted by the two-way motor 1685. The angle between the shafts 1611 and 1637 can be designed to be properly small, so that the cooking pan as a whole is displayed by a small distance and by a small inclination change in the circular movements. On the other hand, the rotation speed of the motor 1638 can be designed to be properly large, as to produce a properly large acceleration in the movement of any point on the internal surface of the cooking pan.

In some embodiments, referring to FIG. 33A-33B, an automated cooking apparatus 700B includes a holder 793 which carries a cooking pan 109. Three universal turning pairs (as first kinematic pairs) 715, 716 and 717 all have first mating parts rigidly connected to the holder, and second mating parts respectively joined to three iron plates 752, 762 and 772. Three elastic connectors 751, 761 and 771 connect the second mating parts of the turning pairs 715, 716 and 717 respectively to a support frame 794. Electric magnets 753, 763 and 773 are rigidly mounted on the support frame 794 and can move the iron plates 752, 762 and 763 respectively. Three magnetic drivers (not shown in figure) drive the electric magnets 753, 763 and 773 to produce controlled oscillations in the iron plates 752, 762 and 772. The movement directions of the three electric magnets are designed to be linearly independent, so the three oscillations produce a three-dimensional movement in the holder 793 together with the cooking pan 109. A computer or other adjustment mechanism together with the three magnetic drivers may be used to dynamically change the magnitudes and frequencies of the oscillations of the three electric magnets. The magnitudes of the oscillatory movements can be designed to be of proper size, so that the cooking pan as a whole is displayed by a proper distance and by a small inclination change in the oscillatory movements. On the other hand, the frequencies or speeds of the oscillations of the iron plates 752, 762 and 772 can be designed to be properly large, as to produce a properly large acceleration in the movement of any point on the internal surface of the cooking pan. It should be noted that we may configure the cooking apparatus 700B so that the mating parts of each universal turning pair 715, 716 or 717 are not rigidly connected to each other.

Figure 34:
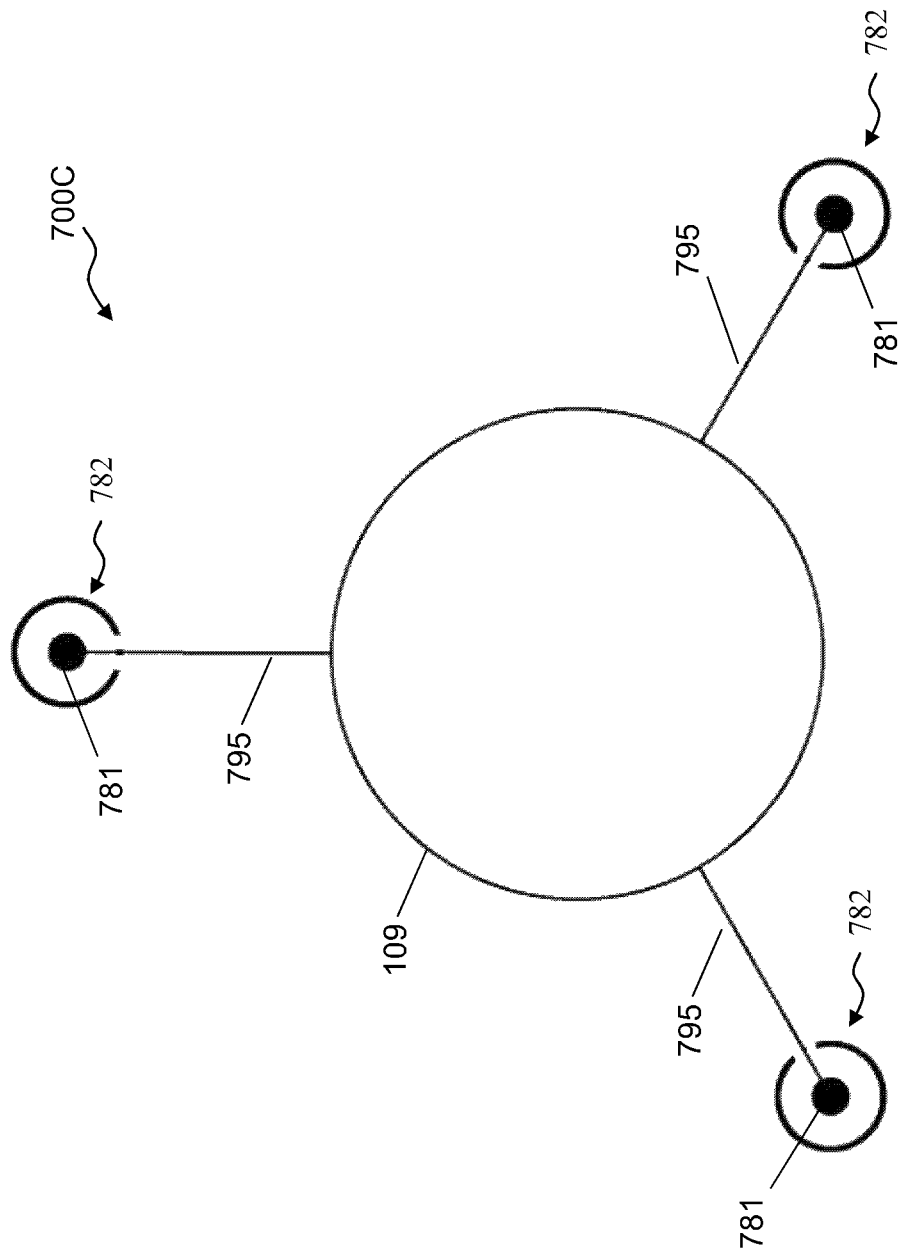
FIG. 34 shows an automated cooking apparatus in which three controlled magnetic fields can move a cooking pan.

In some embodiments, referring to FIG. 34, an automated cooking apparatus 700C includes a holder 795 which carries a cooking pan 109. Three magnets 781 are connected with the holder 795. Three magnetic field generators 782s are mounted on a support frame (not shown in figure) and can respectively move the magnets 781. The centers of the magnets 781, 782 and 783 are not positioned on a same line. Each magnetic field generator may consist one or more wired electric magnets which are driven by one or more drivers. Different drivers may drive the electric magnets to produce cyclic magnetic fields with different directions, magnitudes and frequencies. A computer (not shown in figure) or other adjustment mechanism together with the drivers may be used to dynamically change the directions, magnitudes and frequencies of the magnetic field generated by each electric magnet. The cooking pan is then moved by a composition of oscillatory movements. The magnitudes of the movements of the magnets 781 can be designed to be properly small, so that the cooking pan as a whole is displayed by a small distance and by a small inclination change in the composition of oscillatory movements. On the other hand, the speed of the movement of the magnets 781 can be designed to be properly large, as to produce a properly large acceleration in the movement of any point on the internal surface of the cooking pan.

It should be noted no stabilization mechanism is needed for the cooking apparatus 700C. Alternatively, another apparatus may be built from the cooking apparatus 700C by substituting one of the three magnetic field generators 782 by a permanent magnet. In this case, the other two magnetic field generators 782s can produce controlled movements in the cooking pan 109, while the permanent magnet substituting one of the 782s together with the respective magnet 781 may be used as a stabilization mechanism.

Figure 35:
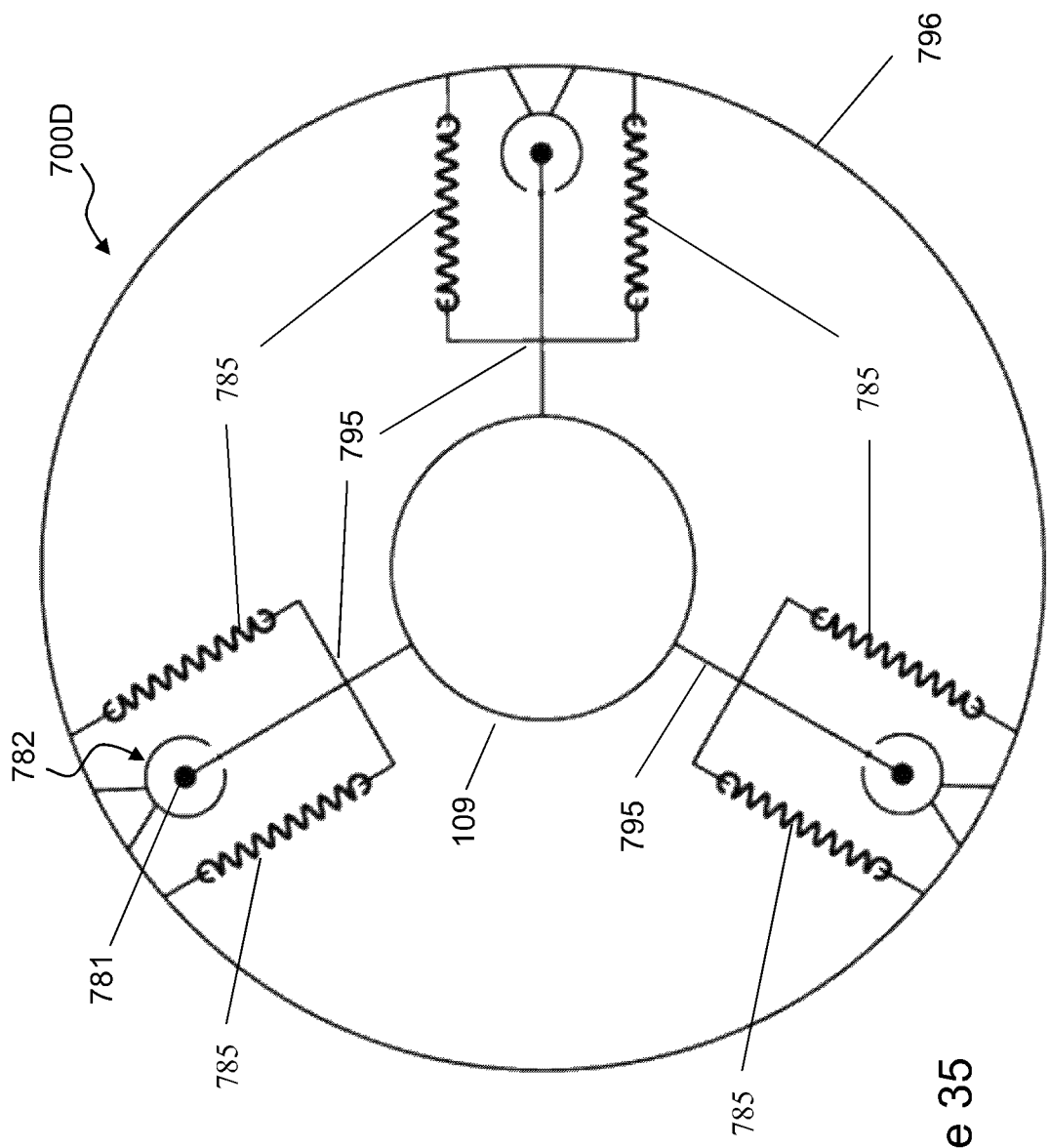
FIG. 35 shows another automated cooking apparatus in which some controlled magnetic fields can move a cooking pan.

In some embodiments, referring to FIG. 35, an automated cooking apparatus 700D is built from the apparatus 700C by further adding six elastic connectors 785 connecting the holder 795 to the support frame 796. The elastic connectors 785 are used to stabilize the cooking pan.

In some embodiments, referring to FIGS. 36A and 36B, an automated cooking apparatus 1300 includes a cooking pan 109 mounted on a holder 1391, which can slide on a frame 1394 along the X-axis via a sliding pair. The frame 1394 can slide on a support frame 1392 along Y-axis via another sliding pair. A two-way motor 1319 whose base is mounted on the frame 1394, produces a rotation in a helical-screw mechanism 1318 that translates the rotation into a translational movement of 1391 along the X-axis direction. The frame 1394, in its turn, is moved along the Y-axis direction relative to the support frame 1392, by a second helical-screw mechanism 1328, which is rotated by a two-way motor 1321 mounted on the support frame 1392. The cooking pan 109 can thus be moved by a composition of two linear oscillations, respectively along the X-axis and Y-axis. The motors 1311, 1321 are driven by drivers 1340 which produce oscillatory currents for the motors so the motors may rotate back and forth in oscillations. The drivers 1340 are controlled by a computer 1350 which adjusts the magnitudes and frequencies of the oscillations. It is possible to mechanically link the rotations of the helical-screw mechanisms 1318 and 1328 through a transmission mechanism, so they are driven by a same motor. The oscillations of the motors 1319 and 1329 are designed to be of proper size, so the cooking pan as a whole is moved by a proper displacement and no inclination change at all times. On the other hand, the speed of the movement of the oscillations can be designed to be properly large, as to produce a properly large acceleration in the movement of any point on the internal surface of the cooking pan.

Figure 37:
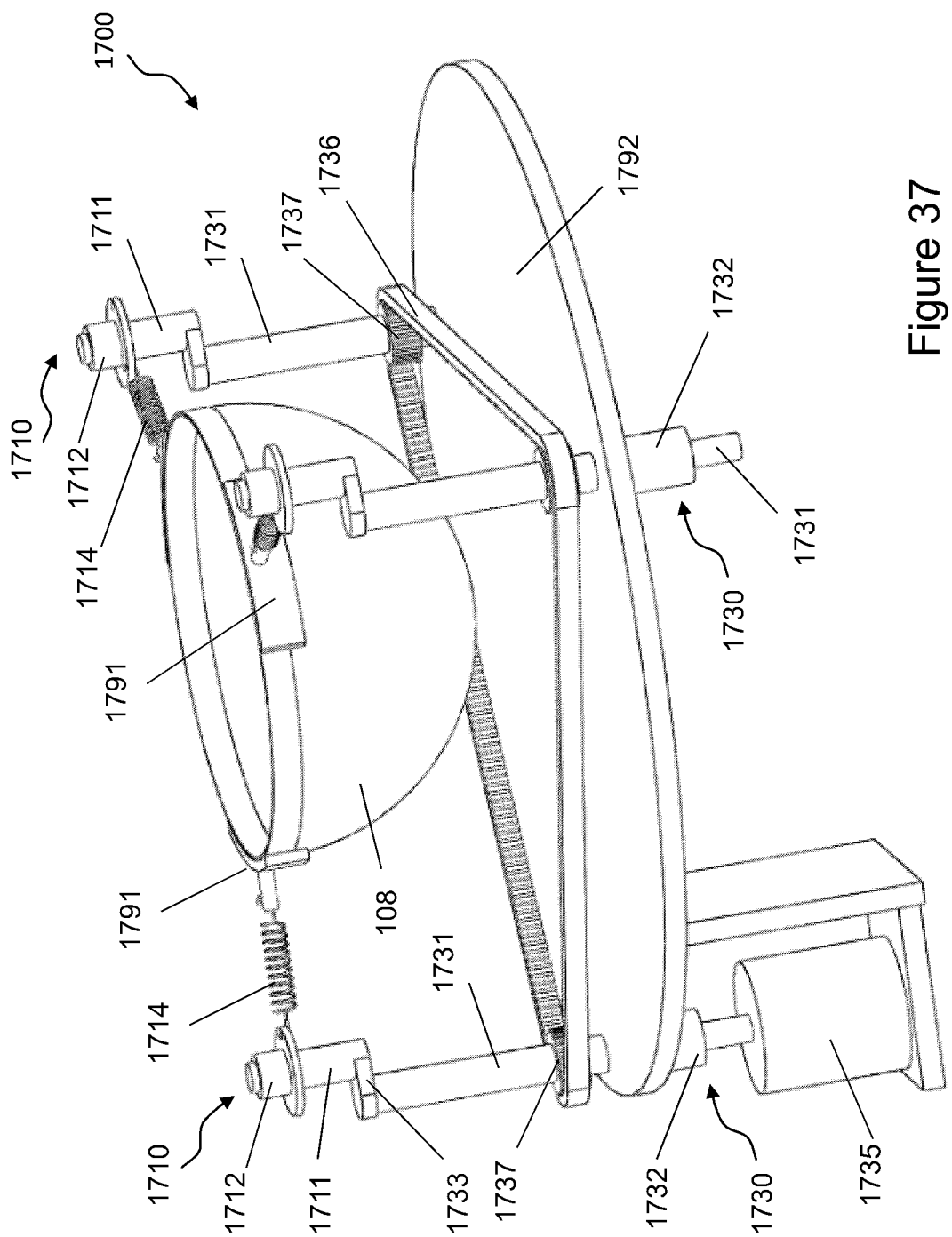
FIG. 37 shows an automated cooking apparatus in which can produce a combination of circular movement and vibrations in a cooking pan.

In some embodiments, referring to FIG. 37, an automated cooking apparatus 1700 includes a holder 1191 consisting of three heat insulating plates attached to a cooking pan 108. Three turning pairs 1710 (as first kinematic pairs) with shafts 1711 have their respective sleeves 1712 connected to the three plates of the holder 1791 by three elastic connectors 1714. Three turning pairs 1730 with shafts 1731 have their sleeves 1732 mounted on a support frame 1792. Three rigid connectors 1733 connect the three shafts 1711 respectively to the three shafts 1731. Three belt wheels 1737 are rigidly joined with the three shafts 1731 respectively. Each belt wheel 1737 is concentric with a shaft 1731 and all three belt wheels 1737 are coplanar and have the same diameter. The axes of the shafts 1711 and 1731 are all parallel. A synchronous belt 1736 envelops the three belt wheels 1737 so the three belt wheels can rotate synchronously. A motor 1735 mounted on the support frame 1792 drives the rotation of a shaft 1731 (any one of the three shafts 1731). As the motor 1735 rotates a shaft 1731, all three shafts 1731 are rotated synchronously via the synchronous belt 1736, resulting in synchronous circular movements in the three shafts 1711, and a circular movement in the cooking pan 108 in combination with vibrations caused by the elastic connectors 1714. The distance between the axis of a shaft 1711 and the respective shaft 1731 can be designed to be properly small, so that the cooking pan as a whole is displayed by a small distance and by a small inclination change at all times. On the other hand, the rotation speed of the motor 1735 can be designed to be properly large, as to produce a properly large acceleration in the movement of any point on the internal surface of the cooking pan. It should be noted that we may configure the cooking apparatus 1700 so that the mating parts 1711 and 1712 of each first turning pair 1710 are not rigidly connected to each other.

Figure 38A:
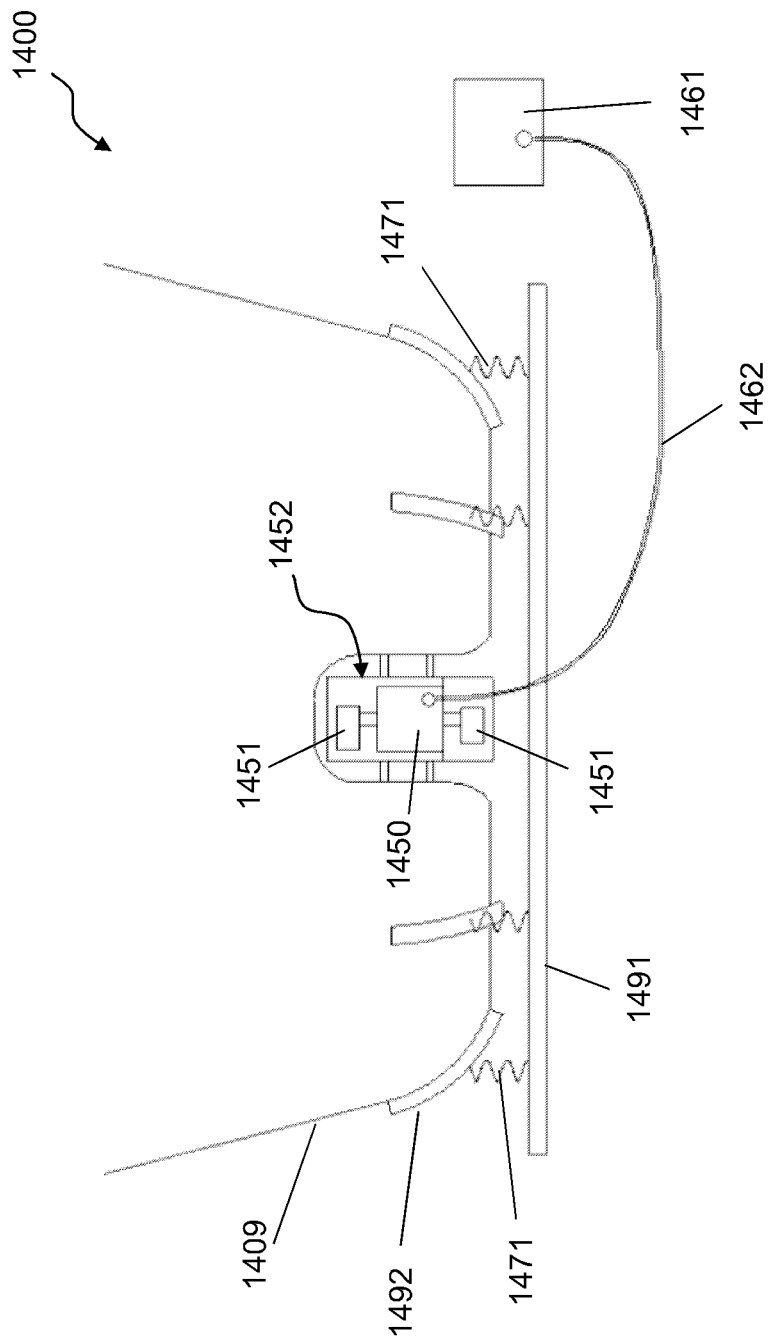
FIG. 38A illustrates an automated cooking apparatus comprising a rotary vibration mechanism near the center of the cooking pan.

FIG. 38A is a schematic side view of an automated cooking apparatus 1400 where a rotary vibration mechanism is built at the bottom center of a cooking pan. A rotationally symmetric cooking pan 1409 with a vertical axis is flexibly mounted on a support frame 1491 using springs 1471 and some heat insulating boards 1492. The support frame 1491 has a shape of a ring that is concentric with the cooking pan 1409. The external surface of the cooking pan 1409 has a cup-shaped recess at the center of its bottom. A vibration mechanism 1452 is mounted in the cup-shaped recess at the center of the cooking pan 1409. The vibration mechanism 1452 includes a motor 1450 rotating some eccentric blocks 1451, and a motor driver 1461 which drives the motor 1450 via a connector 1462; and a computer (not shown in figure) controls the motor driver. The motor 1450 can be a hydraulic motor, an air motor, an electric motor or other motor; and the motor driver can be a hydraulic pump, an air pump, an electric motor driver accordingly. When the motor 1450 rotates the unbalanced eccentric blocks 1451, a three-dimensional vibration pattern is produced in the cooking pan, thus stirring and mixing the food ingredients.

Figure 38B:
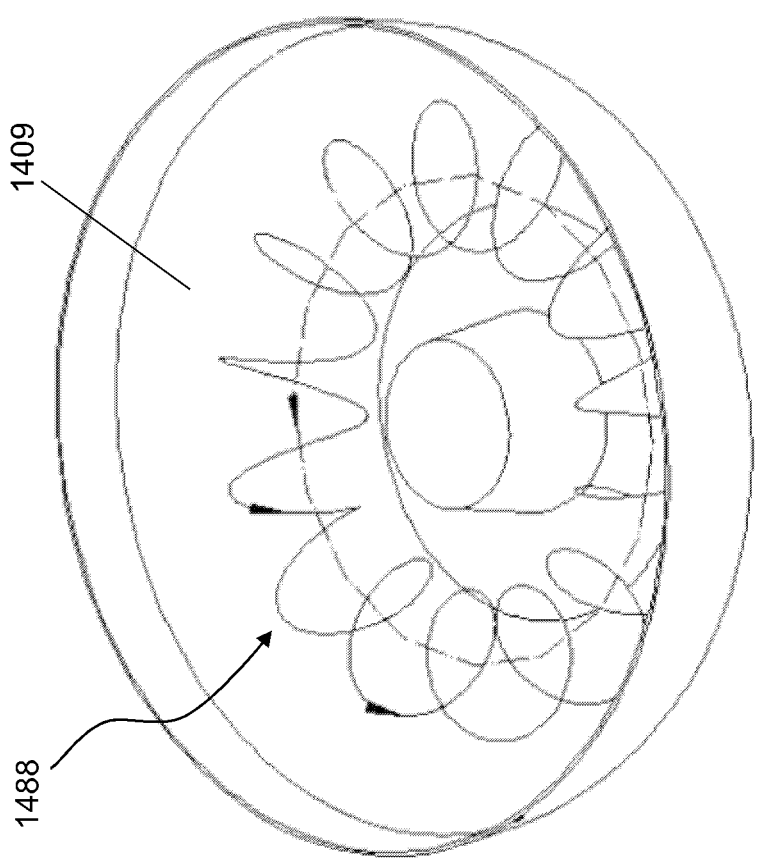
FIG. 38B displays exemplified movement paths of the food ingredients when the cooking pan is vibrated by the mechanisms in FIG. 36A.

FIG. 38B displays a helical pattern of an exemplified movement path 1488 in the food ingredients when the cooking pan is vibrated by the mechanism in FIG. 38A.

Figure 39:
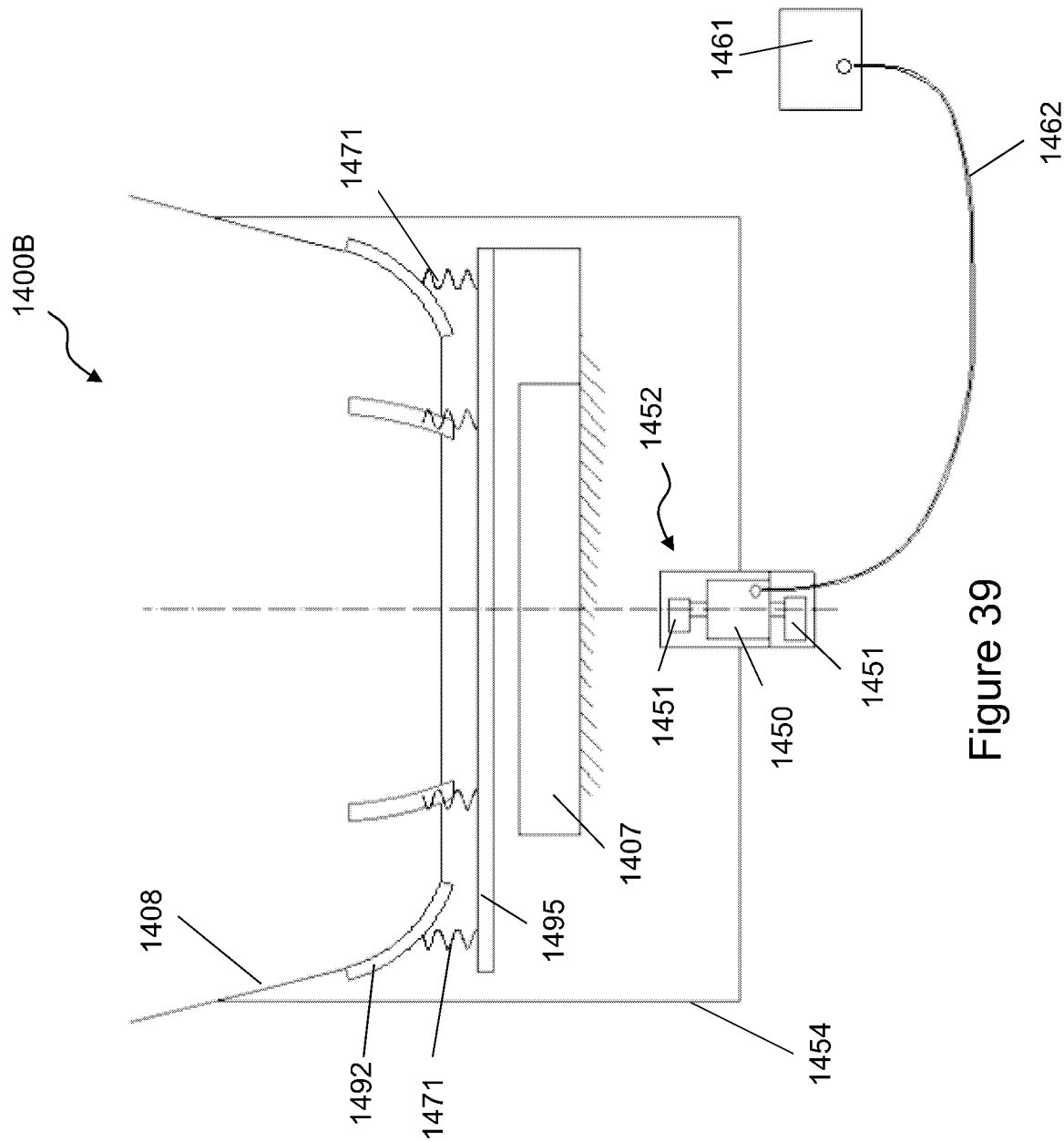
FIG. 39 shows an automated cooking apparatus with a rotary vibration mechanism similar to that in FIG. 38A.

FIG. 39B is a schematic side view of an automated cooking apparatus 1400B similar to the apparatus 1400. A cooking pan 1408 is flexibly mounted on a support frame 1495 using springs 1471 and some heat insulating boards 1492. The support frame 1495 has a top part in the shape of a ring that is concentric with the cooking pan 1409. A connector 1454 connects a vibration mechanism 1452 to the side wall of the cooking pan 1408. The vibration mechanism 1452 is positioned at below the center of the cooking pan, leaving a space between the vibration mechanism and the cooking pan so that a stove 1407 may be mounted on a bottom part of the support frame 1495, above the vibration mechanism. The vibration mechanism includes a motor 1450 rotating some eccentric blocks 1451, and a motor driver 1461 which drives the motor 1450 via a connector 1462. When the motor 1450 rotates the unbalanced eccentric blocks 1451, a three-dimensional vibration pattern is produced in the cooking pan, thus stirring and mixing the food ingredients.

Figures 40A, 40B:
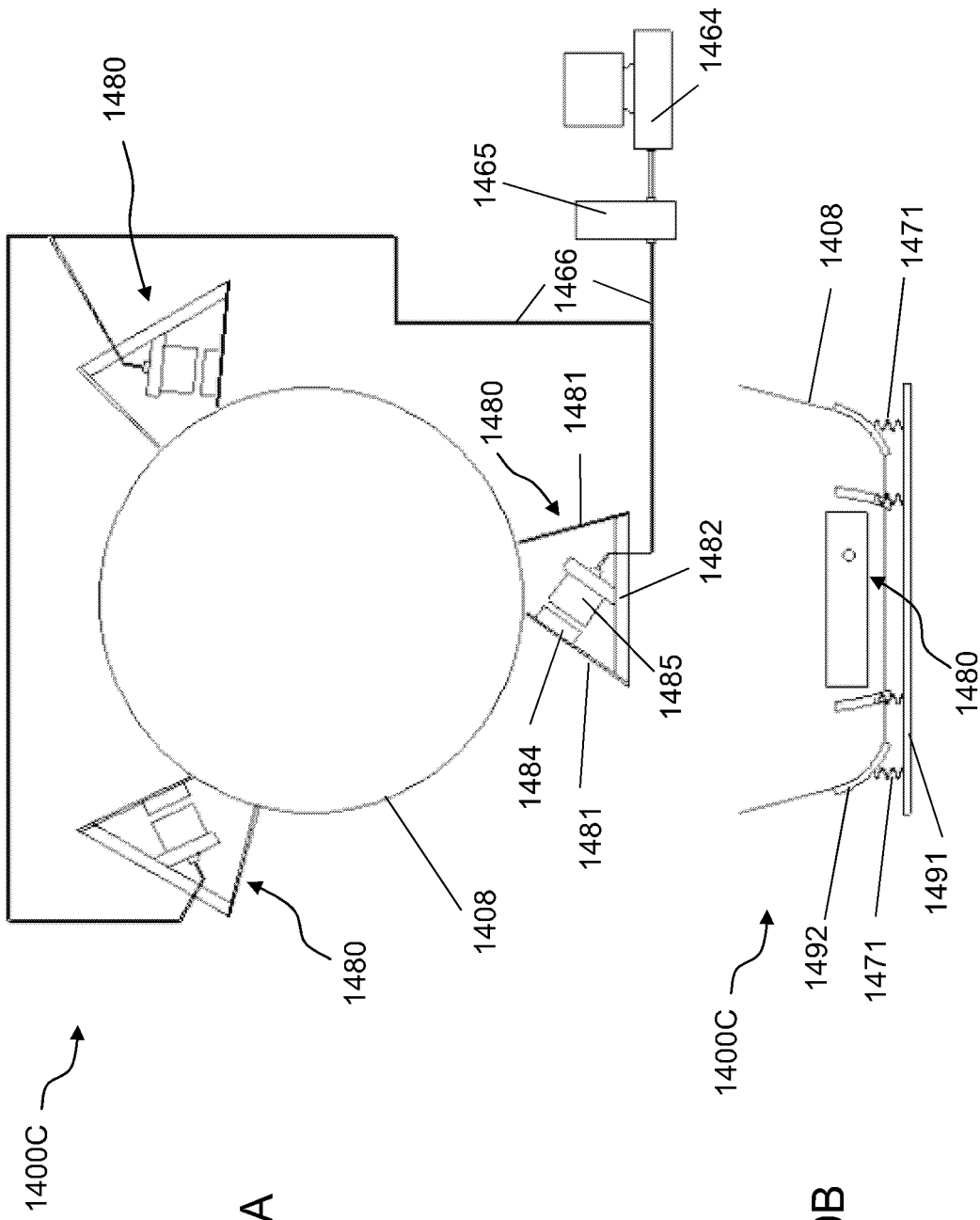
FIG. 40A-40B respectively show top and side views of an automated cooking apparatus comprising some vibration mechanisms mounted on the side wall of the cooking pan.

FIGS. 40A-40B respectively show a top and side view of an automated cooking apparatus 1400C in which a cooking pan 1408 is flexibly mounted on a support frame 1491 using springs 1471 and some heat insulating boards 1492. The support frame 1491 has a shape of a ring that is concentric with the cooking pan 1408. Some vibration mechanisms 1480 are mounted on the side of the cooking pan 1408. Each vibration mechanism 1480 includes elastic plates 1481 connecting the outer wall of the cooking pan with a frame 1482, an iron plate 1484 mounted on an elastic plate 1481, and an electric magnet 1485 mounted on the frame 1482. The electric magnet 1485 applies a variable force on the iron plate 1484 to produce an oscillation in the iron plate. The electric magnet is connected to a driver 1465 via a connector 1466. A computer 1464 is linked to the driver 1465. The vibration mechanisms 1480 can produce a three-dimensional vibration pattern in the cooking pan, thus stirring and mixing the food ingredients.

It should be noted that the magnetic vibration mechanisms 1480 may be replaced by other vibration mechanisms, such as electric, hydraulic, pneumatic mechanisms. The mechanisms in FIG. 39 and in FIGS. 40A-40B can produce movement paths of similar helical patterns for the food ingredients as the one displayed in FIG. 38B.

It should be noted that in each of the cooking apparatuses disclosed in FIGS. 1-9G, 11, 13A-13B, 15A-21, 23A-24B, 27A, 33A-33B, 37, the first mating part and the second mating part of the first kinematic pair (or of the first rotational mechanism) should not be rigidly connected to each other. When the respective motion mechanism induces a motion of said second mating part relative to the support component of the motion mechanism, there can be a relative motion between said first mating part and said second mating part.

It should be further noted that due to the cyclic or oscillatory nature of movements produced in support frames and the cooking pan in our disclosed cooking apparatus from FIG. 1 to FIG. 37, a degree of vibration of similar geometric pattern exists in presently disclosed automated cooking apparatus, thus producing helical or other regular movements in food ingredients, similar to the pattern in FIG. 38B. In addition, these movements have the additional effect of making and maintaining a consistent distribution of a balanced pattern in the food ingredients in the cooking pan, which is suitable for cooking. In case of a round cooking pan, the distribution pattern can be an almost rotationally symmetric around the vertical axis of the cooking pan. In particular, the food ingredients are not pushed to a particular side of the cooking pan.

It should be noted that although the cooking pan in the cooking apparatus of FIG. 1 is visually centered at the axis of the shaft 111 of the turning pair 110, this is not a requirement. In fact, the center of gravity of the cooking pan 109 may be positioned at some horizontal distance away from the axis of the shaft 111. This applies to the cooking apparatus disclosed in FIGS. 2A-2B, 3A-3B, 4, 5A, 6A, 8A-8B, 9A-9B, 10A-10B, 11, 12, 15A, 16, 17A-17B, 18, 19A-19B. Moreover, the holder, cooking pan and support frames can have different shapes, and the motion or stabilization mechanism is not required be positioned at a height that is lower than the cooking pan. This remark applies to all the cooking apparatus disclosed above.

More automated cooking apparatus may be built using similar methods. For example, a holder of a cooking pan may be joined with the first mating part of a curved sliding pair (as a first kinematic pair), and a motion mechanism can move the second mating part of the curved sliding pair by an oscillation relative to a support frame. A powered mechanism can drive a relative oscillation between the two mating parts of the curved sliding pair. The holder is thus moved by a combination of two oscillations.

In another example, a stabilization mechanism consists of a connector joining the first mating part of a planar pair (as a second kinematic pair) to a holder of a cooking pan, and another connector joining the second mating part of the planar pair. Two motion mechanisms using magnetic or other forces may produce a combination or two oscillations or other movements in the holder.

In another example, a stabilization mechanism consists of three or more elastic connectors connecting the holder of a cooking pan to a support frame. One or more motion mechanisms may move the holder.

For the present patent application, the term "displacement" of a moving point is the distance between the position of the moving point and its original position before it is moved by the motion mechanism. The positions of a point before and after it is moved can be relative to a support frame on which the automated cooking apparatus is mounted on. If the support frame is moved but the point is not moved with respect to the support frame, the displacement of the point relative to the support frame is zero.

In the above described automated cooking apparatus, the internal surface of the cooking pan has a center point that is displaced by a properly small displacement during the movement produced by the motion mechanism. Indeed, in many of the above automated cooking apparatus, each point of the internal surface of the cooking pan (which is intended to be in contact with food ingredients) is displaced by a properly small displacement. It is not easy to quantify what is a properly small displacement, as this may depend on the shape of cooking pan, the heater, the types of food ingredients, and styles of cooking. In any case, the center point on the internal surface of the cooking pan can be displaced by less than a half the diameter of the heating source at all times. Since the diameter of a heating source can be about one half of the diameter of the cooking pan, the center point on the internal surface of the cooking pan is required to be displaced by less than a quarter of the diameter of the cooking pan. An advantage of such a design, besides the benefits of mixing and stirring and distributing the food ingredients, is that the food ingredients may be heated by a same heater in case the heater is fixed to a support frame. (It is however not a requirement that the heater be fixed to a support frame during the cooking process.) Compared with our apparatus, the rotating cylinder used as a cooking pan has a larger displacement, almost equal to the diameter of cooking pan, and the heating area of the cooking pan must be much larger.

If the automated cooking apparatus has an adjustment mechanism to adjust the magnitude of the movements of the cooking pan produced by the motion mechanism, the displacement of a center point on the internal surface of the cooking pan (in the movement produced by the motion mechanism) can be adjusted between a lower bound and an upper bound. For such a cooking apparatus, there is no need to restrict the upper bound at all. It is only required for the lower bound to be designed small (or to be zero).

A feature of the above automated cooking apparatus is that, the speeds of movements of any point of the internal surface of the cooking pan (which is intended to be in contact with food ingredients) can be made properly large without increasing the total displacement of the cooking pan or the total displacement of the second mating part of the first kinematic pair. The directions of velocity vectors are changed frequently, thus producing some properly big accelerations in the internal surface of the cooking pan (more precisely, in the part of the internal surface of the cooking pan that can be in contact with the food ingredients in the stirring and mixing process) as to stir, mix and distribute the food ingredients contained in the cooking pan.

Another feature of the above automated cooking apparatus is that the points of the internal surface of the cooking pan that can be in contact with food ingredients during the stirring and mixing process are evenly moved. Except a possible phase difference, the magnitudes of the acceleration of a point on the internal surface of the cooking pan (that can be in contact with food ingredients during the mixing and stirring process) is comparable with the magnitude of the acceleration of any other point on the internal surface of the cooking pan (that can be in contact with food ingredients during mixing and stirring process). In particular, all points on the internal surface of the cooking pan are moved in the mixing and stirring process. Compared with our apparatus disclosed above, the traditional motion mechanism that rotates a cooking pan around a vertical axis of the cooking pan does not move the point of the cooking pan intersected with the vertical axis; nor can it move the points of the internal surface of the cooking pan evenly, as the points of the cooking pan near the rotation axis are barely moved.

Another feature of the above automated cooking apparatus js that the inclinations of any axis on the cooking pan is only displaced by a small angle. Again, it is not easy to quantify what is perceived to be a small angle, as it depends on the shape of the cooking pan, the heater, the food ingredients and the style of cooking. We estimate the inclination of any axis on the cooking pan is displaced by less than 60 degrees (in fact much, much less, or no inclination change at all in many applications), but in no case equal to or more than 90 degrees. Compared to our applications, the rolling cylinder used as a cooking pan can change the inclination of an axis by 180 degrees, turning the axis upside down.

For the present patent application, the inclination angle of an axis is the angle between the axis and the horizontal plane. In the apparatus disclosed in FIGS. 1, 3-10B, 13A-16, 18-19B, the axis of the first kinematic pair (also a turning pair) can be designed to be vertical, in which case the inclination angle of the axis is 90 degrees. In FIGS. 2, 11-12, the angle of inclination of the axis of the first kinematic pair (a turning pair) can be designed to be close to 90 degrees, although this is not a requirement. For the cooking apparatus in FIG. 17A-17B, the angle of inclination of the axis of the rotation of the first mating part (a ball) relative to the second mating part (a cap or sleeve) can be vertical, as the relative rotation is also constrained by the stabilization mechanism, In any case, if the axis of the first turning pair has an inclination angle larger than 45 degrees, then the inclination of any axis of the cooking pan is moved by less than 90 degrees.

It should be noted that support frame of the above disclosed automated cooking apparatus may be moved by a further motion mechanism, sometimes for purposes other than stirring, mixing and distributing the food ingredients.

For the present patent application, the phrase "cooking apparatus" can mean an apparatus for cooking with a heat source (including but not limited to: frying, steaming, boiling, roasting etc.), an apparatus for mixing salad, or an apparatus for mixing cooked food. In case of mixing of salad or cooked food, or boiling noodle or dumplings, or steaming, the cooking pan may be substituted by any container of food or food ingredients. For the purpose of present patent application, a cooking pan is a special case of a container of food or food ingredients. It should be noted that the holders in above described cooking apparatus can hold a container of food or food ingredients in different ways. For example, the container can be fixed to the holder by a mechanism (clamps, screws, etc.) or by a magnet. A holder can be formed by two or more pieces that are separately connected to the container. A holder can be made as a part of the container.

In some embodiments, the cooking pan is driven by a motion mechanism during cooking to conduct pre-designed movements (e.g. oscillations, cyclic, etc.) that are capable of changing moving directions, of no less than 90 degrees (usually 180 or 360 degrees) in a fraction of a second or less. (In fact, the speed of change in moving directions may be substantially higher, depending on types of food ingredients, styles of cooking or other factors.) The frequent changes of moving directions accompany accelerations in the cooking pan's motion. The friction between the internal surface of the accelerated cooking pan and the non-accelerated food ingredients, and the internal forces exerted on the food ingredients by each other, together with gravitational or other forces, can cause the food ingredients to stir, turn, flip, mix, or jump.

In some embodiments, the motion mechanism can be designed to frequently move in a loop, back and forth on a line, on a planar or spatial curve, or in a somewhat random locus. The movements of the cooking pan that are frequent and have relatively small amplitudes can replace the relatively less frequent and large amplitude stirring mechanisms using a spatula or like.

In one aspect, unlike some conventional automated cooking devices, it is not necessary for the disclosed cooking apparatus to directly mimic the motions of the spatula in traditional cooking. Instead, the disclosed cooking apparatus achieve better mixing and more uniform cooking of the food ingredients than manual cooking.

In some embodiments, the internal surface of the cooking pan (or other type of container of food or food ingredients) can be further structured as to effectively obstruct the food ingredients in motion for the purpose of more robust stirring and mixing. The internal surface of the cooking pan can be rugged, textured, bumped, or have one or more barriers built on or near it. Barriers can be constructed on the internal surfaces of cooking pans. The barriers can have different shapes and dimensions and constructed at different positions in the container. The barriers in the cooking pan can work in conjunction with the other features disclosed above in relation to FIGS. 1-40. Other details of the automated cooking system are disclosed in the commonly assigned pending U.S. patent application Ser. No. 13/490,523, titled "Cooking system capable of automated stirring and mixing of food ingredients", filed Jul. 18, 2012 by the same inventor, the disclosure of which is incorporated herein by reference.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the term cooking pan is used to generally refer to a device for containing food ingredients during cooking. Other words such as wok, cooking pot, cooking ware, etc. can also be used to describe the cooking device. The cooking is also not limited to any particular ethnic styles such as stir fry, and the cooking of Asian, Mexican, Middle Eastern, or European food. In addition, the barriers and cooking pan can be selected to best suit the types of food ingredients and style of cooking.

Furthermore, the movements of the cooking pan or cooking pan can have other configurations from the examples given above. For example, the radius of circular movements can vary depending on the types of food ingredients and style of cooking. Furthermore, the movements of any or all motors or mechanisms described above may be controlled by a programmed computer or controllers, according to the types of food.

What is claimed is:

1. An automated cooking apparatus, comprising:
   a cooking container configured to hold food or food ingredients;
   a first kinematic pair comprising a first mating part, a second mating part, wherein the motion of the first mating part relative to the second mating part is constrained;
   a motion mechanism comprising a support component and a motor, said motion mechanism being configured to produce a motion of the second mating part of the first kinematic pair relative to the support component;
   a computer;
   a mechanical connection configured to connect the first mating part of the first kinematic pair to the support component of the motion mechanism, said mechanical connection being configured to constrain or limit the motion of the first mating part of the first kinematic pair relative to the support component;
   wherein the first mating part of the first kinematic pair is configured to be connected to the cooking container;
   wherein the first mating part of the first kinematic pair and the second mating part of the first kinematic pair are configured to be not rigidly connected to each other;
   wherein the cooking container is configured to be moved as to stir, mix, or distribute the food or food ingredients held in the cooking container.

2. The automated cooking apparatus of claim 1, wherein the first kinematic pair comprises a sliding pair or a turning pair.

3. The automated cooking apparatus of claim 1, wherein the mechanical connection comprises a spring or an elastic connector.

4. The automated cooking apparatus of claim 1, wherein the mechanical connection comprises a stabilization mechanism comprising:
   a second kinematic pair comprising a first mating part, a second mating part, wherein the motion of the first mating part relative to the second mating part is constrained; and
   a connector configured to connect of the first mating part of the second kinematic pair to the first mating part of the first kinematic pair;
   wherein the second mating part of the second kinematic pair is configured to be connected to the support component of the motion mechanism;
   wherein the mechanical connection is configured to constrain the motion of the first mating part of the first kinematic pair relative to the second mating part of the first kinematic pair, while the motion mechanism moves the second mating part of the first kinematic pair.

5. The automated cooking apparatus of claim 1, wherein the mechanical connection comprises a stabilization mechanism comprising:
   a second kinematic pair comprising a first mating part, a second mating part, wherein the motion of the first mating part is constrained relative to the second mating part;
   a connector configured to connect the first mating part of the second kinematic pair to the first mating part of the first kinematic pair;
   a third kinematic pair comprising a first mating part, a second mating part, wherein the motion of the first mating part is constrained relative to the second mating part; and
   a connector configured to connect the first mating part of the third kinematic pair to the second mating part of the second kinematic pair;
   wherein the second mating part of the third kinematic pair is connected to the support component of the motion mechanism.

6. The automated cooking apparatus of claim 1, further comprising a heater configured to heat the cooking container.

7. An automated cooking apparatus, comprising:
   a cooking container configured to hold food or food ingredients;
   a first rotational mechanism comprising a first mating part, a second mating part, wherein the motion of the first mating part relative to the second mating part is constrained to be a rotation around an axis;
   a motion mechanism comprising a support component and a motor, said motion mechanism being configured to produce a motion of the second mating part of the first rotational mechanism relative to the support component;
   a computer;
   a mechanical connection configured to connect the first mating part of the first rotational mechanism to the support component of the motion mechanism, said mechanical connection being configured to constrain or limit the motion of the first mating part of the first rotational mechanism relative to the support component of the motion mechanism;
   wherein the first mating part of the first rotational mechanism is configured to be connected to the cooking container;
   wherein the first mating part of the first kinematic pair and the second mating part of the first kinematic pair are configured to be not rigidly connected to each other;
   wherein the cooking container is configured to be moved as to stir, mix or distribute the food or food ingredients held in the cooking container.

8. The automated cooking apparatus of claim 7, wherein the mechanical connection comprises a stabilization mechanism comprising:
   a kinematic pair comprising a first mating part, a second mating part, wherein the motion of the first mating part is constrained relative to the second mating part; and
   a connector configured to connect the first mating part of the kinematic pair to the first mating part of the first rotational mechanism;
   wherein the second mating part of the kinematic pair is configured to be connected to the support component of the motion mechanism.

9. The automated cooking apparatus of claim 7, wherein the motion mechanism is configured to produce a rotational movement of the second mating part of the rotational mechanism around an axis.

10. The automated cooking apparatus of claim 9, wherein the axis of rotation of the first rotational mechanism and the axis of rotation of the rotational movement produced by the motion mechanism are configured to be parallel to each other, wherein the distance between the axis of rotation of the first rotational mechanism and the axis of rotation of the rotational movement produced by the motion mechanism is configured to be either fixed, or dynamically adjustable under the control of the computer.

11. The automated cooking apparatus of claim 9, wherein the axis of rotation of the first rotational mechanism and the axis of rotation of the rotational movement produced by the motion mechanism are configured to be parallel to each other, wherein the distance between the axis of rotation of the first rotational mechanism and the axis of rotation of the rotational movement produced by the motion mechanism is configured to be properly small.

12. The automated cooking apparatus of claim 9, wherein the axis of rotation of the first rotational mechanism and the axis of rotation of the rotational movement produced by the motion mechanism are configured to intersect, wherein the angle between the axis of rotation of the first rotational mechanism and the axis of rotation of the rotational movement produced by the motion mechanism is configured to be either fixed, or dynamically adjustable under the control of the computer.

13. The automated cooking apparatus of claim 7, wherein the motion mechanism comprises:
   a second rotational mechanism comprising a first mating part, a second mating part, wherein the motion of the first mating part relative to the second mating part is constrained to be a rotation around an axis;
   a connector configured to connect the second mating part of the first rotational mechanism to the first mating part of the second rotational mechanism;
   a motorized mechanism configured to produce a rotation of the first mating part of the second rotational mechanism relative to the second mating part of the second rotational mechanism.

14. The automated cooking apparatus of claim 13, wherein the second rotational mechanism comprises a bearing configured to be placed between the first mating part and the second mating part of the second rotational mechanism.

15. The automated cooking apparatus of claim 13, wherein the second mating part of the first rotational mechanism comprises a first shaft, wherein the first mating part of the second rotational mechanism comprises a second shaft, wherein the first shaft and the second shaft are connected by a rigid or adjustable connector.

16. The automated cooking apparatus of claim 15, wherein the first shaft and the second shaft are configured to be connected by a rigid connector, wherein the first shaft, the second shaft and the rigid connector are configured to be made as a single piece.

17. The automated cooking apparatus of claim 7, wherein the first rotational mechanism comprises a bearing configured to be placed between the first mating part and the second mating part of the first rotational mechanism.

18. The automated cooking apparatus of claim 7, wherein the mechanical connection comprises a stabilization mechanism comprising:
   a second rotational mechanism comprising a first mating part, a second mating part, wherein the motion of the first mating part relative to the second mating part is constrained to be a rotation around an axis; and
   a connector configured to connect the first mating part of the second rotational mechanism to the first mating part of the first rotational mechanism;
   wherein the second mating part of the second rotational mechanism is configured to be connected to the support component of the motion mechanism.

19. The automated cooking apparatus of claim 7, wherein the mechanical connection comprises a stabilization mechanism comprising:
   a second rotational mechanism comprising a first mating part, a second mating part, wherein the motion of the first mating part relative to the second mating part is constrained to be a rotation around an axis;
   a connector configured to the first mating part of the second rotational mechanism to the first mating part of the first rotational mechanism;
   a third rotational mechanism comprising a first mating part, a second mating part, wherein the motion of the first mating part relative to the second mating part is constrained to be a rotation around an axis;
   a connector configured to connect the second mating part of the second rotational mechanism to the first mating part of the third rotational mechanism;
   wherein the second mating part of the third rotational mechanism is configured to be connected to the support component of the motion mechanism.

20. The automated cooking apparatus of claim 19, wherein the motion mechanism is configured to produce a rotational movement of the second mating part of the rotational mechanism around an axis, wherein the axis of rotation of the first rotational mechanism, the axis of rotation of the rotational movement produced by the motion mechanism, the axis of rotation of the second rotational mechanism and the axis of rotation of the third rotational mechanism are configured to be parallel.

21. The automated cooking apparatus of claim 19, wherein the motion mechanism is configured to produce a rotational movement of the second mating part of the rotational mechanism around an axis, wherein the axis of rotation of the first rotational mechanism, the axis of rotation of the rotational movement produced by the motion mechanism, the axis of rotation of the second rotational mechanism and the axis of rotation of the third rotational mechanism are configured to be intersect at a same point.

22. The automated cooking apparatus of claim 7, wherein the angle between the axis of rotation of the first rotational mechanism and the horizontal plane is more than 45 degrees.

23. The automated cooking apparatus of claim 7, wherein the axis of rotation of the first rotational mechanism is vertical or nearly vertical.

24. An automated cooking apparatus, comprising:
   a cooking container configured to hold food or food ingredients;
   a first kinematic pair comprising a first mating part, a second mating part, wherein the motion of the first mating part relative to the second mating part is configured to be constrained;
   a motion mechanism comprising a support component and a motor, said motion mechanism being configured to produce a motion of the second mating part of the first kinematic pair relative to the support component;
   a computer;
   a rigid or elastic connector configured to connect the first mating part of the first kinematic pair to the cooking container;
   a mechanical connection configured to connect said rigid or elastic connector to the support component of the motion mechanism, said mechanical connection being configured to constrain or limit the motion of the rigid or elastic connector relative to the support component of the motion mechanism;

wherein the first mating part of the first kinematic pair and the second mating part of the first kinematic pair are configured to be not rigidly connected to each other;

wherein the cooking container is configured to be moved as to stir, mix or distribute the food or food ingredients held in the cooking container.

\* \* \* \* \*